(12) United States Patent
Connell et al.

(10) Patent No.: US 11,766,822 B2
(45) Date of Patent: Sep. 26, 2023

(54) MICROSTRUCTURED SURFACE WITH INCREASED MICROORGANISM REMOVAL WHEN CLEANED, ARTICLES AND METHODS

(71) Applicant: 3M INNOVATIVE PROPERTIES COMPANY, St. Paul, MN (US)

(72) Inventors: Jodi L. Connell, St. Paul, MN (US); Raymond P. Johnston, Lake Elmo, MN (US); John J. Sullivan, Hudson, WI (US); Karl J. L. Geisler, St. Paul, MN (US); Vivian W. Jones, Woodbury, MN (US); Gordon A. Kuhnley, St. Paul, MN (US); Patrick G. Zimmerman, Mendota Heights, MN (US); Bradley W. Eaton, Woodbury, MN (US); Kurt J. Halverson, Lake Elmo, MN (US); Brian W. Lueck, Houlton, WI (US); Alexander C. Eldredge, Mahtomedi, MN (US); Hyacinth L. Lechuga, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/182,507

(22) Filed: Feb. 23, 2021

(65) Prior Publication Data

US 2021/0187819 A1    Jun. 24, 2021

Related U.S. Application Data

(63) Continuation-in-part of application No. PCT/IB2020/057840, filed on Aug. 20, 2020.
(Continued)

(51) Int. Cl.
*B29C 59/02* (2006.01)
*B08B 17/06* (2006.01)
(Continued)

(52) U.S. Cl.
CPC .......... *B29C 59/022* (2013.01); *B08B 17/065* (2013.01); *B29C 51/02* (2013.01);
(Continued)

(58) Field of Classification Search
CPC ....... B29C 51/02; B29C 59/022; B29C 51/14; B29C 2059/023; B29C 51/00;
(Continued)

(56) References Cited

U.S. PATENT DOCUMENTS 4,025,159 A  5/1977  Mcgrath
4,200,169 A  4/1980  MacDonald, III
(Continued)

FOREIGN PATENT DOCUMENTS

CA    3136427 A1    10/2020
CN    104609029 A    5/2015
(Continued)

OTHER PUBLICATIONS

International Search Report for PCT Application No. PCT/IB2022/051004, dated May 4, 2022, 5 pages.
(Continued)

*Primary Examiner* — Monica A Huson
(74) *Attorney, Agent, or Firm* — Carolyn A. Fischer

(57) ABSTRACT

Films and articles are described comprising a microstructured surface having an array of peak structures and adjacent valleys. For improved cleanability, the valleys preferably have a maximum width ranging from 10 microns to 250 microns and the peak structures have a side wall angle greater than 10 degrees. The peak structures may comprise two or more facets such as in the case of a linear array of
(Continued)

prisms or an array of cube-corners elements. The facets form continuous or semi-continuous surfaces in the same direction. The valleys typically lack intersecting walls. Also described are methods of making and methods of use. The microstructured surface of the article can be prepared by various microreplication techniques such as coating, injection molding, embossing, laser etching, extrusion, casting and curing a polymerizable resin; and bonding microstructured film to a surface or article with an adhesive.

30 Claims, 5 Drawing Sheets

Related U.S. Application Data

(60) Provisional application No. 63/142,688, filed on Jan. 28, 2021, provisional application No. 63/067,701, filed on Aug. 19, 2020, provisional application No. 63/027,412, filed on May 20, 2020, provisional application No. 62/889,088, filed on Aug. 20, 2019.

(51) Int. Cl.
*B29C 51/02* (2006.01)
*B29L 31/00* (2006.01)
*B29C 51/14* (2006.01)
*B32B 37/12* (2006.01)

(52) U.S. Cl.
CPC ........ *B29C 51/14* (2013.01); *B29C 2059/023* (2013.01); *B29L 2031/756* (2013.01); *B32B 37/12* (2013.01); *B32B 2307/754* (2013.01)

(58) Field of Classification Search
CPC . B08B 17/065; B32B 37/12; B32B 2307/754; B29L 2031/756; B29L 2007/008; B29L 2007/001; B29L 2031/30
See application file for complete search history.

(56) References Cited

U.S. PATENT DOCUMENTS

| | | | |
|---|---|---|---|
| 4,588,258 A | 5/1986 | Hoopman | |
| 4,770,270 A | 9/1988 | Grimm | |
| 4,775,219 A | 10/1988 | Appeldorn | |
| 4,852,684 A | 8/1989 | Packard | |
| 4,913,259 A | 4/1990 | Packard | |
| 5,111,904 A | 5/1992 | Packard | |
| 5,117,304 A | 5/1992 | Huang | |
| 5,175,030 A | 12/1992 | Lu | |
| 5,183,597 A | 2/1993 | Lu | |
| 5,296,277 A | 3/1994 | Wilson | |
| 5,324,471 A | 6/1994 | Packard | |
| 5,380,182 A | 1/1995 | Packard | |
| 5,449,865 A | 9/1995 | Desnick | |
| 5,623,010 A | 4/1997 | Groves | |
| 5,677,376 A | 10/1997 | Groves | |
| 6,194,024 B1 | 2/2001 | Arldt | |
| 6,294,249 B1 | 9/2001 | Hamer | |
| 6,318,867 B1 | 11/2001 | Bacon, Jr. | |
| 6,386,699 B1 | 5/2002 | Ylitalo | |
| 6,418,257 B1 | 7/2002 | Nath | |
| 6,420,622 B1 | 7/2002 | Johnston | |
| 6,447,537 B1 | 9/2002 | Hartman | |
| 6,772,686 B2 | 8/2004 | Van Wert | |
| 6,867,342 B2 | 3/2005 | Johnston | |
| 6,969,166 B2 | 11/2005 | Clark et al. | |
| 7,074,463 B2 | 7/2006 | Jones | |
| 7,140,812 B2 | 11/2006 | Bryan et al. | |
| 7,188,960 B2 | 3/2007 | Smith | |
| 7,223,364 B1 | 5/2007 | Johnston | |
| 7,309,519 B2 | 12/2007 | Scholz | |
| 7,328,638 B2 | 2/2008 | Gardiner et al. | |
| 7,350,442 B2 | 4/2008 | Ehnes et al. | |
| 7,879,419 B2 | 2/2011 | Stocq | |
| 7,879,746 B2 | 2/2011 | Klun | |
| 7,972,681 B2 | 7/2011 | Roys et al. | |
| 8,172,569 B2 | 5/2012 | Matty | |
| 8,888,333 B2 | 11/2014 | Yapel et al. | |
| 9,016,221 B2 | 4/2015 | Brennan | |
| 9,121,307 B2 | 9/2015 | Aizenberg | |
| 9,335,449 B2 | 5/2016 | Gaides | |
| 9,383,482 B2 | 7/2016 | Walker, Jr. et al. | |
| 9,527,336 B2 | 12/2016 | Mahli et al. | |
| 9,625,065 B2 | 4/2017 | Feldhahn | |
| 9,657,177 B1 | 5/2017 | Pringle | |
| 9,827,790 B1 | 11/2017 | Moore | |
| 10,155,670 B1 | 12/2018 | Happel | |
| 10,213,181 B2 | 2/2019 | Keller | |
| 10,398,406 B2 | 9/2019 | Keller | |
| D898,925 S | 10/2020 | Kelbie et al. | |
| 2001/0040731 A1 | 11/2001 | Chester, Jr. et al. | |
| 2002/0128578 A1 | 9/2002 | Johnston | |
| 2002/0192617 A1 | 12/2002 | Phan | |
| 2003/0008259 A1 | 1/2003 | Kuo | |
| 2003/0215628 A1 | 11/2003 | Ma | |
| 2003/0235677 A1 | 12/2003 | Hanschen | |
| 2004/0011268 A1 | 1/2004 | Jonsson | |
| 2004/0155150 A1 | 8/2004 | Krohmer | |
| 2005/0089539 A1 | 4/2005 | Scholz | |
| 2006/0051384 A1 | 3/2006 | Scholz | |
| 2006/0051385 A1 | 3/2006 | Scholz | |
| 2006/0052452 A1 | 3/2006 | Scholz | |
| 2006/0115782 A1 | 6/2006 | Li | |
| 2006/0199151 A1 | 9/2006 | Hurson | |
| 2007/0134784 A1 | 6/2007 | Halverson | |
| 2007/0298216 A1 | 12/2007 | Jing | |
| 2008/0044786 A1 | 2/2008 | Kalili | |
| 2008/0090010 A1 | 4/2008 | Zhang | |
| 2008/0138767 A1 | 6/2008 | Kuo | |
| 2009/0047477 A1 | 2/2009 | Roys et al. | |
| 2013/0125992 A1 | 5/2013 | Krautschick | |
| 2013/0216784 A1* | 8/2013 | Zhang | B08B 17/065 428/141 |
| 2013/0236697 A1 | 9/2013 | Walker, Jr. et al. | |
| 2014/0112921 A1 | 4/2014 | Ross | |
| 2015/0091217 A1 | 4/2015 | Araki | |
| 2015/0164067 A1 | 6/2015 | Cai et al. | |
| 2015/0320402 A1 | 11/2015 | Ryu | |
| 2016/0011441 A1* | 1/2016 | Schwartz | G02F 1/161 359/275 |
| 2016/0051195 A1 | 2/2016 | Pang et al. | |
| 2016/0103270 A1 | 4/2016 | Aronson et al. | |
| 2016/0296199 A1 | 10/2016 | Mukherjee et al. | |
| 2017/0045284 A1 | 2/2017 | Meuler | |
| 2017/0100332 A1 | 4/2017 | Tonkin | |
| 2017/0151424 A1 | 6/2017 | Ross | |
| 2017/0182194 A1 | 6/2017 | Shin | |
| 2018/0194910 A1 | 7/2018 | Nakahara | |
| 2018/0222173 A1* | 8/2018 | Mikami | C09J 7/38 |
| 2018/0354161 A1 | 12/2018 | Gu | |
| 2018/0355230 A1 | 12/2018 | Rasmussen et al. | |
| 2019/0200608 A1 | 7/2019 | Gifford et al. | |
| 2020/0297986 A1 | 9/2020 | Ross | |
| 2021/0187819 A1 | 6/2021 | Connell et al. | |

FOREIGN PATENT DOCUMENTS

| | | |
|---|---|---|
| CN | 105338815 A | 2/2016 |
| CN | 108358156 A | 8/2018 |
| CN | 110076938 A | 8/2019 |
| DE | 202013001393 | 5/2013 |
| DE | 102014105478 | 7/2015 |
| EP | 1247588 A2 | 10/2002 |
| EP | 2533912 | 12/2012 |
| EP | 2918263 A1 | 9/2015 |
| EP | 2563450 B1 | 7/2017 |
| EP | 2632613 B1 | 8/2017 |
| EP | 2563451 B1 | 11/2017 |
| EP | 3321063 A1 | 5/2018 |
| EP | 2978962 B1 | 7/2018 |
| EP | 3342577 A1 | 7/2018 |

(56) References Cited

FOREIGN PATENT DOCUMENTS

| | | |
|---|---|---|
| EP | 3542851 A1 | 9/2019 |
| EP | 3701920 A1 | 9/2020 |
| EP | 3708196 A1 | 9/2020 |
| EP | 3122867 B1 | 10/2020 |
| EP | 3307474 B1 | 1/2021 |
| EP | 3824942 A1 | 5/2021 |
| EP | 3390273 B1 | 9/2021 |
| EP | 3452129 B1 | 3/2022 |
| EP | 3557991 B1 | 7/2022 |
| GB | 2529517 | 1/2017 |
| KR | 102177173 B1 | 11/2020 |
| WO | WO 1998-015601 | 4/1998 |
| WO | WO 1998-029516 | 7/1998 |
| WO | WO 1999-003907 | 1/1999 |
| WO | 2000048037 A2 | 8/2000 |
| WO | WO 2004-000569 | 12/2003 |
| WO | WO 2007-070310 | 6/2007 |
| WO | WO 2009-032815 | 3/2009 |
| WO | 2009079275 A1 | 6/2009 |
| WO | WO 2009-152345 | 12/2009 |
| WO | 2011/094344 A1 | 8/2011 |
| WO | 2011/098266 A1 | 8/2011 |
| WO | 2011094344 A1 | 8/2011 |
| WO | WO 2011-150103 | 12/2011 |
| WO | 2012020332 A2 | 2/2012 |
| WO | 2012046149 A1 | 4/2012 |
| WO | WO 2012-058605 | 5/2012 |
| WO | 2012074814 A2 | 6/2012 |
| WO | WO 2012-082667 | 6/2012 |
| WO | WO 2012-083011 | 6/2012 |
| WO | WO 2012-158317 | 11/2012 |
| WO | WO 2013-003373 | 1/2013 |
| WO | 2014022631 A1 | 2/2014 |
| WO | 2014/209798 A1 | 12/2014 |
| WO | 2015073798 A2 | 5/2015 |
| WO | 2015153986 A1 | 10/2015 |
| WO | 2015156658 A1 | 10/2015 |
| WO | 2016019279 A1 | 2/2016 |
| WO | 2016022995 A2 | 2/2016 |
| WO | 2016094277 A1 | 6/2016 |
| WO | 2016099508 A1 | 6/2016 |
| WO | 2016105998 A1 | 6/2016 |
| WO | WO 2016-094277 | 6/2016 |
| WO | WO 2016-196914 | 12/2016 |
| WO | 2017004231 A1 | 1/2017 |
| WO | WO 2017-025128 | 2/2017 |
| WO | WO 2017-090661 | 6/2017 |
| WO | WO 2017-112468 | 6/2017 |
| WO | 2017142730 A1 | 8/2017 |
| WO | 2017209993 A1 | 12/2017 |
| WO | 2018037075 A1 | 3/2018 |
| WO | WO 2018-128092 | 7/2018 |
| WO | 2018152445 A1 | 8/2018 |
| WO | 2018162613 A1 | 9/2018 |
| WO | 2018197858 A1 | 11/2018 |
| WO | WO 2019-130198 | 7/2019 |
| WO | 2019186312 A1 | 10/2019 |
| WO | WO 2019-239286 | 12/2019 |
| WO | WO 2020-007589 | 1/2020 |
| WO | 2020026061 A1 | 2/2020 |
| WO | WO 2020-051167 | 3/2020 |
| WO | WO 2020-070589 | 4/2020 |
| WO | WO 2020-079555 | 4/2020 |
| WO | 2020106945 A1 | 5/2020 |
| WO | WO 2020-097319 | 5/2020 |
| WO | 2020115657 A1 | 6/2020 |
| WO | WO 2020-136557 | 7/2020 |
| WO | 2020201928 A1 | 10/2020 |
| WO | 2020211746 A1 | 10/2020 |
| WO | WO 2021-033151 | 2/2021 |
| WO | 2021097013 A1 | 5/2021 |
| WO | 2021/236429 A1 | 11/2021 |
| WO | 2021245494 A1 | 12/2021 |
| WO | 2022/123440 A1 | 6/2022 |
| WO | 2022180466 A1 | 9/2022 |

OTHER PUBLICATIONS

Heilig, "Technology of Microthermoforming of complex three-dimensional Parts with multiscale Features", Microsystem Technologies, Jan. 2011, vol. 17, pp. 593-600.

Imani, "Flexible Hierarchical Wraps Repel Drug-Resistant Gram-Negative and Positive Bacteria", ACS Nano, Jan. 2020, vol. 14, No. 1, pp. 454-465.

Mann, "Surface micropattern resists bacterial contamination transferred by healthcare practitioners", Journal of Microbiology & Experimentation, Dec. 2014, vol. 1, No. 5, pp. 179-184.

"Standard Test Method for Evaluation of Contact-Mediated Microbial Transference—WK67781", May 2019, 11 pages.

Technical Data Sheet: "G-10"A product of Laminated Plastics, 1 page.

Worgull, "Hot embossing and thermoforming of biodegradable three-dimensional wood structures", RSC Advances, 2013, vol. 3 pp. 20060-20064.

International Search Report for PCT International Application No. PCT/IB2020/057809, dated Nov. 18, 2020, 4 pages.

International Search Report for PCT International Application No. PCT/IB2020/057840, dated Nov. 11, 2020, 7 pages.

ASTMD3759/D3759M—05 Standard Test Method for Breaking Strength and Elongation of Pressure-Sensitive Tape, 2019, 7 pages.

Mann, "Surface micropattern limits bacterial contamination", Antimicrobial Resistance Infection Control, Sep. 2014, vol. 3, No. 28, 8 pages.

Partial International Search for PCT International Application No. PCT/IB2021/061410, dated Feb. 22, 2022, 15 pages.

PCT Application entitled, "Microstructured Surface and Articles with Lower Visibility of Scratches and Methods", PCT International Applicatioin No. PCT/IB2022/061717, International Filing Date: Dec. 2, 2022, 77 pages.

Technical Datasheet: "Dow Primacor 1410 Ethylene Acrylic Acid (EAA)", MatWeb [Online], (date unknown but believed to be prior to the date of the filing of the present application), [retrieved from internet on Jun. 6, 2022], URL <https://www.matweb.com/search/DataSheet.aspx?MatGUID=a6516809e4414a469e73382e2d7d35c0> 2 pages.

Technical Datsheet: "Overview of materials for Ethylene Vinyl Acetate Copolymer (EVA) Adhesive/Sealant Grade", MatWeb [Online], (date unknown but believed to be prior to the date of the filing of the present application), [retrieved from internet on Jun. 6, 2022], URL <https://matweb.com/search/DataSheet.aspx?MatGUID=0eeb0c7bf44349e39580d1d1ff302764>, 3 pages.

Technical Report, SYKORA, Extension Observations of 3M Print Wrap Film IJ280 and 3M Gloss Wrap Overlaminate 3M™ Gloss Wrap Overlaminate 8428G, 3M, Nov. 2020, 13 pages.

International Search Report for PCT International Application No. PCT/IB2021/061410, dated Apr. 12, 2022, 8 pages.

International Search Report for PCT International Application No. PCT/US2021/032368, dated Aug. 13, 2021, 5 pages.

* cited by examiner

US 11,766,822 B2

MICROSTRUCTURED SURFACE WITH INCREASED MICROORGANISM REMOVAL WHEN CLEANED, ARTICLES AND METHODS

CROSS REFERENCE TO RELATED APPLICATIONS

This application claims priority from U.S. Application No. 63/142,688, filed Jan. 28, 2021; and is a continuation-in-part of PCT Application No. PCT/IB2020/057840, filed Aug. 20, 2020; that claims priority from U.S. Application No. 63/067,701, filed Aug. 19, 2020; U.S. Application No. 63/027,412, filed May 20, 2020; and U.S. Application No. 62/889,088, filed Aug. 20, 2019; the disclosures of which are incorporated by reference in their entirety herein.

BACKGROUND

US2017/0100332 (abstract) describes an article that include a first plurality of spaced features. The spaced features are arranged in a plurality of groupings; the groupings of features include repeat units; the spaced features within a grouping are spaced apart at an average distance of about 1 nanometer to about 500 micrometers; each feature having a surface that is substantially parallel to a surface on a neighboring feature; each feature being separated from its neighboring feature; the groupings of features being arranged with respect to one another so as to define a tortuous pathway. The plurality of spaced features provide the article with an engineered roughness index of about 5 to about 20.

WO2013/003373 and WO 2012/058605 describe surfaces for resisting and reducing biofilm formation, particularly on medical articles. The surfaces include a plurality of microstructure features.

SUMMARY

Although articles with specific microstructure features are useful for reducing the initial formation of a biofilm, particularly for medical articles; in the case of other articles, such microstructured surfaces can be difficult to clean. This is surmised to be due at least in part to the bristles of a brush or fibers of a (e.g. nonwoven) wipe being larger than the space between microstructures. Surprisingly, it has been found that some types of microstuctured surfaces exhibit better microorganism (e.g. bacteria) removal when cleaned, even in comparison to smooth surfaces. Such microstructured surfaces have also been found to provide a reduction in microbial touch transfer.

In one embodiment, a film comprising a microstructured surface disposed on a planar base layer is described. The microstructured surface comprises an array of peak structures and adjacent valleys. The valleys preferably have a maximum width ranging from 10 microns to 250 microns. In some embodiments (e.g. for improved cleanability), the peak structures have a side wall angle greater than 10 degrees. The peak structures may comprise two or more facets such as in the case of a linear array of prisms or an array of cube-corners elements. In some embodiments, facets of the peak structures form an apex angle, typically ranging from about 20 to 120 degrees. The facets form continuous or semi-continuous surfaces in the same direction. The valleys typically lack intersecting walls. The film further comprises a pressure sensitive adhesive on the opposing surface of the film. In some embodiments, the pressure sensitive adhesive is removable.

In another embodiment, a method of providing an article having a surface with increased microorganism (e.g. bacteria) removal when cleaned is described comprising providing a microstructured surface, as described herein, on an article. The article is typically not a sterile implantable medical article. Rather, the microstructured surface typically comes in contact with people and/or animals as well as other contaminants (e.g. dirt). Some representative articles include for example surfaces or component of vehicles (e.g. automobile, bus, train, airplane, boat) as well as housings or cases of electronic devices. The microstructured surface of the article can be prepared by various microreplication techniques such as coating, injection molding, embossing, laser etching, extrusion, as well as casting and curing a polymerizable resin. In one embodiment, the microstuctured surface is provided on the article by providing a film with a microstructured surface as described herein and a pressure sensitive adhesive disposed on the opposing surface of the film; and bonding the film to a surface or article with the pressure sensitive adhesive.

In another embodiment, an article is described comprising a base member and a microstructured surface, as described herein, disposed on the base member. In one aspect, the article comprises a pressure sensitive adhesive layer disposed between the base member and microstructured surface.

In another embodiment, a method of making an article is described comprising: providing a base member comprising a microstructured surface as described herein wherein the peak structures comprise an organic polymeric material having a melt temperature greater than the base member; and thermoforming the base member into an article at a temperature below the melt temperature of the peak structures.

The microstructured surface provides a log 10 reduction of microorganism (e.g. bacteria) of at least 2, 3, 4, 5, 6, 7, or 8 after cleaning.

As also evidenced by the forthcoming examples, the microstructured surface provides a reduction in microorgansim touch transfer of at least 25, 30, 35, 40, 45, 50, 60, 70, 80, 90, 95, or 99% relative to the same unstructured (e.g. smooth) surface.

In favored embodiments, the same microstructured surface provides both a reduction of microorganism (e.g. bacteria) after cleaning and a reduction in microorgansim touch transfer. However, in other embodiments, it is surmised that the microstructured surface may provide a reduction in microorgansim touch transfer, yet not provide a reduction of microorganism (e.g. bacteria) after cleaning due to the dimensional features and/or angles of the peaks and valleys.

In another embodiment, a method of cleaning an article is described comprising providing an article comprising a microstructured surface as described herein and cleaning the microstructured surface. Regardless of whether the microstuctured surface is mechanically cleaned with a wipe or brush and/or cleaned by applying an antimicrobial solution to the microstructured surface, the microstructured surface provides improved removal of microorganism (e.g. bacteria) in comparison to planar surfaces.

DETAILED DESCRIPTION

Figure 1:
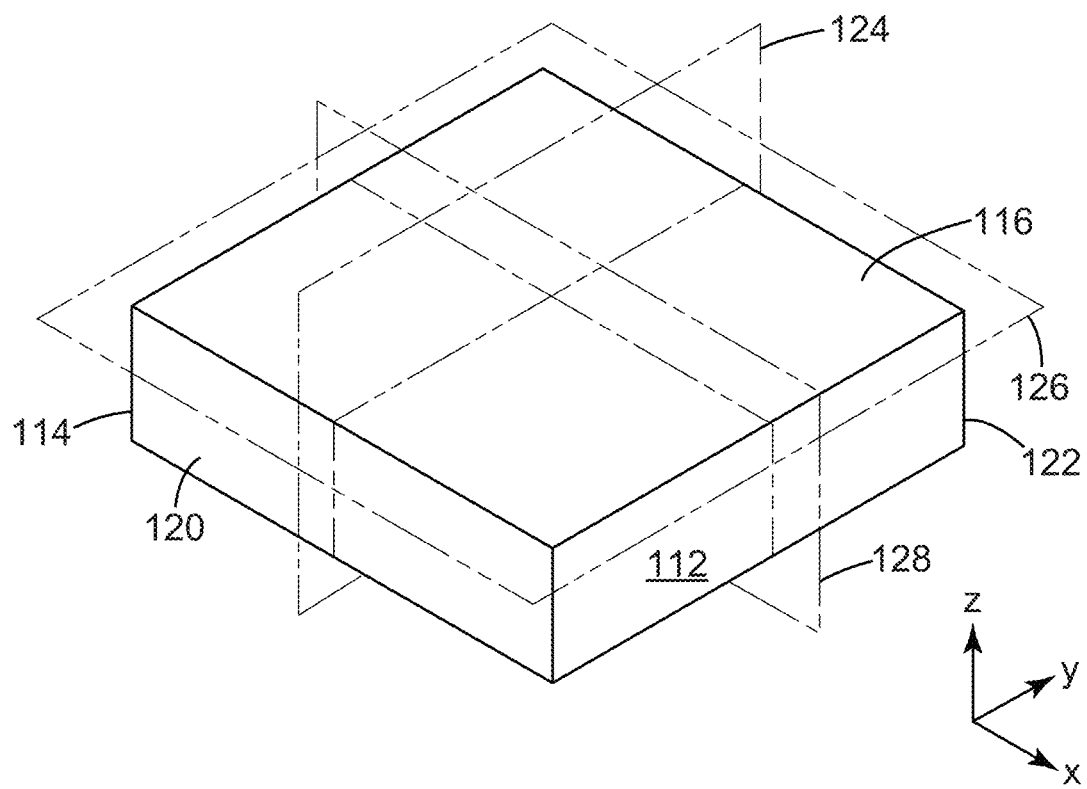
FIG. 1 is a perspective review of a Cartesian coordinate system of a surface that can be utilized to describe various microstructured surfaces.

With reference to FIG. 1, a microstructured surface can be characterized in three-dimensional space by superimposing a Cartesian coordinate system onto its structure. A first reference plane 124 is centered between major surfaces 112 and 114. First reference plane 124, referred to as the y-z plane, has the x-axis as its normal vector. A second reference plane 126, referred to as the x-y plane, extends substantially coplanar with surface 116 and has the z-axis as its normal vector. A third reference plane 128, referred to as the x-z plane, is centered between first end surface 120 and second end surface 122 and has the y-axis as its normal vector.

In some embodiments, the articles are three-dimensional on a macroscale. However, on a microscale (e.g. surface area that includes at least two adjacent microstructures with a valley or channel disposed between the microstructures) the base layer/base member can be considered planar with respect to the microstructures. The width and length of the microstructures are in the x-y plane and the height of the microstructures is in the z-direction. Further, the base layer is parallel to the x-y plane and orthogonal to the z-plane.

Figure 2:
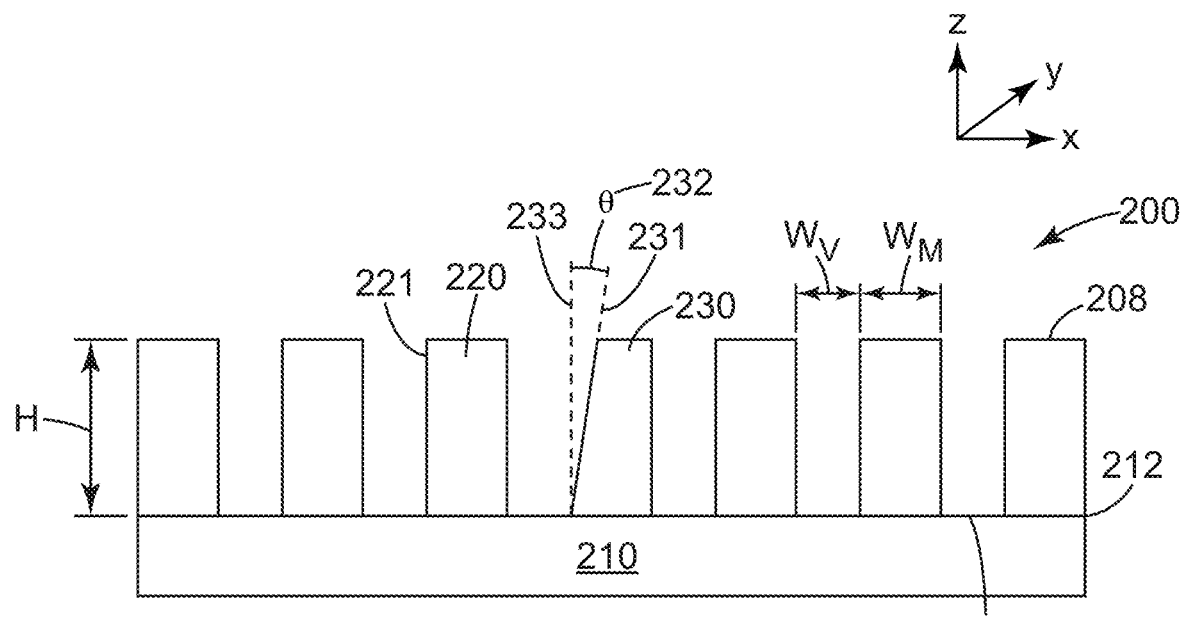
FIG. 2 is a cross-sectional view of a microstructured surface.

FIG. 2 is an illustrative cross-section of a microstructured surface 200. Such cross-section is representative of a plurality of discrete (e.g. post or rib) microstructures 220. The microstructures comprise a base 212 adjacent to an (e.g. engineered) planar surface 216 (surface 116 of FIG. 1 that is parallel to reference plane 126). Top (e.g. planar) surfaces 208 (parallel to surface 216 and reference plane 26 of FIG. 1) are spaced from the base 212 by the height ("H") of the microstructure. The side wall 221 of microstructure 220 is perpendicular to planar surface 216. When the side wall 221 is perpendicular to planar surface 216, the microstructure has a side wall angle of zero degrees. In the case of perpendicular side walls, of a peak microstructure are parallel to each other and parallel to adjacent microstructures having perpendicular side walls. Alternatively, microstructure 230 has side wall 231 that is angled rather than perpendicular relative to planar surface 216. The side wall angle 232 can be defined by the intersection of the side wall 231 and a reference plane 233 perpendicular to planar surface 216 (perpendicular to reference plane 126 and parallel to reference plane 128 of FIG. 1). In the case of privacy films, such as described in U.S. Pat. No. 9,335,449; the wall angle is typically less than 10, 9, 8, 7, 6, or 5 degrees. Since the channels of privacy film comprise light absorbing material, larger wall angle can decrease transmission. However, as described herein, wall angles approaching zero degrees are also more difficult to clean.

Presently described are microstructured surfaces comprising microstructures having side wall angles greater than 1, 2, 3, 4, 5, 6, 7, 8, 9, or 10 degrees. In some embodiments, the side wall angle is at least 11, 12, 13, 14, 15, 16, 17, 18, 19, or 20 degrees. In other embodiments, the side wall angle is at least 21, 22, 23, 24, 25, 26, 27, 28, 29, or 30 degrees. For example, in some embodiments, the microstructures are cube corner peak structures having a side wall angle of 30 degrees. In other embodiments, the side wall angle is at least 31, 32, 33, 34, 35, 36, 37, 38, 39, 40, 41, 42, 43, 44, or 45 degrees. For example, in some embodiments, the microstructures are prism structures having a side wall angle of 45 degrees. In other embodiments, the side wall angle is at least 46, 47, 48, 49, 50, 51, 52, 53, 54, 55, 56, 57, 58, 59, or 60 degrees. It is appreciated that the microstructured surface would be beneficial even when some of the side walls have lower side wall angles. For example, if half of the array of peak structures have side wall angles within the desired range, about half the benefit of improved microorganism (e.g. bacteria) removal may be obtained. Thus, in some embodiments, less than 50, 45, 40, 35, 30, 25, 20, 15, 10, 5 or 1% of the peak structures have side wall angles less than 10, 9, 8, 7, 6, 5, 4, 3, 2, or 1 degree. In some embodiments, less than 50, 45, 40, 35, 30, 25, 20, 15, 10, 5 or 1% of the peak structures have side wall angles less than 30, 25, 20, or 15 degrees. In some embodiments, less than 50, 45, 40, 35, 30, 25, 20, 15, 10, 5 or 1% of the peak structures have side wall angles less than 40, 35, or 30 degrees. Alternatively at least 50, 60, 70, 80, 90, 95 or 99% of the peak structures have a sufficiently large side wall angle, as described above.

As described for example in WO 2013/003373, microstructures having a cross-sectional dimension no greater than 5 microns are believed to substantially interfere with the settlement and adhesion of target bacteria most responsible for HAIs or other biofouling problems such an increased drag, reduced heat transfer, filtration fouling etc. With reference to FIG. 2, the cross-sectional width of the microstructure ("$W_M$") as depicted in this figure, is less than or equal to the cross-sectional width of the channel or valley ("$W_V$") between adjacent microstructures. Thus, as depicted (in this linear prism embodiment), when the cross-section width of the microstructure ($W_M$) is no greater than 5 microns, the cross-sectional width of the channel or valley ($W_V$) between microstructures is also no greater than 5 microns. When the microstructures on either side of a valley have a side wall angel of zero, such as depicted by microstructure 220 of FIG. 2, the channel or valley defined by the side walls has the same width ($W_V$) adjacent the top surface 208 as adjacent the bottom surface 212. When the microstructure has a side wall angle of greater than zero, such as depicted by the line 231 of microstructure 230, the valley typically has a greater (e.g. maximum) width adjacent the top surface 208 as compared to the width of the channel or valley adjacent the bottom surface 212.

It has been found that when the side wall angle is too small, and/or the maximum width of the valley is too small, and/or the microstructured surface comprises an excess amount of flat surface area the microstructured surface is more difficult to clean (e.g. microorganisms and dirt).

Presently described are microstructured surfaces comprising microstructures wherein the maximum width of the valleys is at least 1, 2, 3, or 4 microns and more typically greater than 5, 6, 7, 8, 9, or 10 microns ranging up to 250 microns. In some embodiments, the maximum width of the valleys is at least 11, 12, 13, 14, 15, 16, 17, 18, 19, 20, 21, 22, 23, 24, or 25 microns. In some embodiments, the maximum width of the valleys is at least 30, 35, 40, 45, or 50 microns. In some embodiments, the maximum width of the valleys is greater than 50 microns. In some embodiments, the maximum width of the valleys is at least 55, 60, 65, 70, 75, 85, 85, 90, 95 or 100 microns. In some embodiments, the maximum width of the valleys is at least 125, 150, 175, 200, 225, or 250 microns. Larger valley widths may better accommodate the removal of dirt. In some embodiments, the maximum width of the valleys is no greater than 1000, 950, 900, 850, 800, 750, 700, 650, 600, 550, 500, 450, 400, 350, 300, 250, 225, 200, 175, 150, 125, 100, 75, or 50 microns. In some embodiments, the maximum width of the valleys is no greater than 45, 40, 35, 30, 25, 20, or 15 microns. It is appreciated that the microstructured surface would be beneficial even when some of the valleys are less than the maximum width. For example, if half of the total number of valleys of the microstructured surface are within the desired range, about half the benefit may be obtained. Thus, in some embodiments, less than 50, 45, 40, 35, 30, 25, 20, 15, 10, 5 or 1% of the valleys have a maximum width of less than 10, 9, 8, 7, 6, or 5 microns. Alternatively at least 50, 60, 70, 80, 90, 95 or 99% of the valleys have a maximum width, as described above.

In typical embodiments, the maximum width of the microstructures falls within the same ranges as described for the valleys. In other embodiments, the width of the valleys can be greater than the width of the microstructures. Thus, in some favored embodiments, the microstructured surface is typically substantially free of microstructures having a width less than 5, 4, 3, 2, or 1 micron, inclusive of nanostructures having a width less than 1 micron. Some examples of microstructured surfaces that further comprise nanostructures are described in previously cited WO 2012/058605. Nanostructures typically comprise at least one or two dimensions that do not exceed 1 micron (e.g. width and height) and typically one or two dimensions that are less than 1 micron. In some embodiments, all the dimensions of the nanostructures do not exceed 1 micron or are less than 1 micron.

By substantially free, it is meant that there are none of such microstructures present or that some may be present provided that the presence thereof does not detract from the (e.g. cleanability) properties as will subsequently described. Thus, the microstructured surface or microstructures thereof may further comprise nanostructures provided that the microstructured surface provides the technical effects described herein.

The microstructured surface may be present on a second microstructured surface provided the surface provides the technical effect described herein. The second microstructured surface typically have larger microstructures (e.g. having a greater valley width and/or height).

The microstructured surface may be present on a macrostructured surface provided the surface provides the technical effect described herein. A macrostructured surface is typically visible without magnification by a microscope. A macrostructured surface has at least two dimensions (e.g. length and width) of at least 1 mm. In some embodiments, the average width of a macrostructure is at least 2, 3, 4, 5, 6, 7, 8, 9, or 10 mm. In some embodiments, the average length of a macrostructure can be in the same range as the average width or can be significantly greater than the width. For example, when the macrostructure is a wood-grain macrostructure as commonly found on a door, the length of the macrostructure can extend the entire length of the (e.g. door) article. The height of the macrostructure is typically less than the width. In some embodiments, the height is less than 5, 4, 3, 2, 1, or 0.5 mm.

Although smaller structures including nanostructures can prevent biofilm formation, the presence of a significant number of smaller valleys and/or valleys with insufficient side wall angles can impede cleanability including dirt removal. Further, microstructured surfaces with larger microstructures and valleys can typically be manufactured at a faster rate. Thus, in typical embodiments, each of the dimensions of the microstructures is at least 1, 2, 3, 4, 5, 6, 7, 8, 9, 10, 11, 12, 13, 14, or 15 microns or greater than 15 microns as previously described. Further, in some favored embodiments, none of the dimensions of at least 50, 60, 70, 80, 90, 95 or 99% microstructures are less than 15, 14, 13, 12, 11, 10, 9, 8, 7, 6, 5, 4, 3, 2, or 1 micron.

Figure 9:
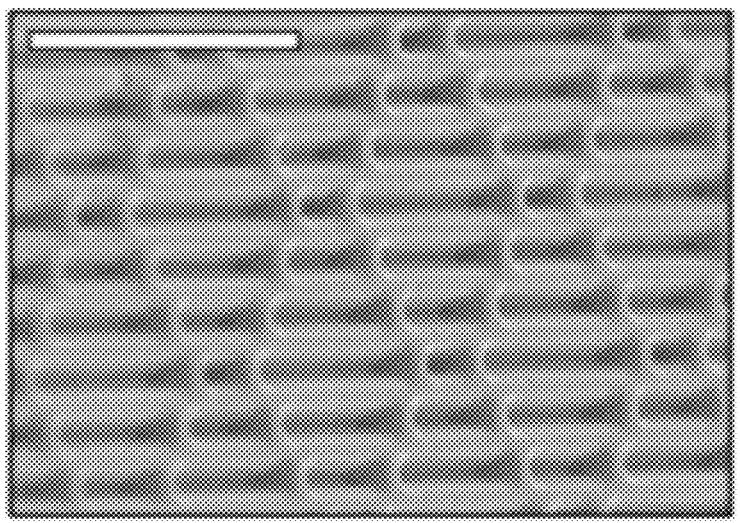
FIG. 9 is an electron micrograph of a comparative microstructured surface wherein the scale bar represents 20 microns.

FIG. 9 depicts a comparative microstructured surface having discontinuous valleys. Such surface has also been described as having groupings of features arranged with respect to one another as to define a tortuous pathway. Rather, the valleys are intersected by walls forming an array of individual cells, each cell surrounded by walls. Some of the cells are about 3 microns in length; whereas other cells are about 11 microns in length.

In contrast, the valleys of the microstructured surfaces described are substantially free of intersecting side walls or other obstructions to the valley. By substantially free, it is meant that there are no side walls or other obstructions present within the valleys or that some may be present provided that the presence thereof does not detract from the cleanability properties as subsequently described. The valleys are typically continuous in at least one direction. This can facilitate the flow of a cleaning solution through the valley. Thus, the arrangement of peaks typically does not define a tortuous pathway.

The height of the peaks is within the same range as the maximum width of the valleys as previously described. In some embodiments, the peak structures typically have a height (H) ranging from 1 to 125 microns. In some embodiments, the height of the microstructures is at least 2, 3, 4, or 5 microns. In some embodiments, the height of the microstructures is at least 6, 7, 8, 9 or 10 microns. In some embodiments, the height of the microstructures no greater than 100, 90, 80, 70, 60, or 50 microns. In some embodiments, the height of the microstructures is no greater than 45, 40, 35, 30 or 25 microns. In some embodiments, the height of the microstructures is no greater than 24, 23, 22, 21, 20, 19, 18, 17, 16, 15, 14, 13, 12, 11, or 10 microns. In typical embodiments, the height of the valley or channel is within the same range as just described for the peak structures. In some embodiments, the peak structures and valleys have the same height. In other embodiments, the peak structures can vary in height. For example, the microstructured surface may be disposed on a macrostructured or microstructured surface, rather than a planar surface.

The aspect ratio of the valley is the height of the valley (which can be the same as the peak height of the microstructure) divided by the maximum width of the valley. In some embodiment the aspect ratio of the valley is at least 0.1, 0.15, 0.2, or 0.25. In some embodiments, the aspect ratio of the valley is no greater than 1, 0.9, 0.8, 0.7, 0.6 or 0.5. Thus, in some embodiments, the height of the valley is typically no greater than the maximum width of the valley, and more typically less than the maximum width of the valley.

The base of each microstructure may comprise various cross-sectional shapes including but not limited to paraellograms with optionally rounded corners, rectangles, squares, circles, half-circles, half-ellipses, triangles trapezoids, other polygons (e.g. pentagons, hexagons, octagons, etc. and combinations thereof.

The presently described microstructured surface does not prevent microorgansims (e.g. bacteria such as *Streptococcus mutans, Staphyloccus aureus, Psueodomonas aeruginosa* or Phi6 Bacteriophage) from being present on the microstructured surface or in other words does not prevent biofilm from forming. As evidenced by the forthcoming examples, both smooth, planar surfaces and the microstructured surfaces described herein had about the same amount of microorganism (e.g. bacteria) present; i.e. in excess of 80 colony forming units, prior to cleaning. Thus, the presently described microstuctured surface would not be expected to be of benefit for sterile implantable medical devices.

However, as also evidenced by the forthcoming examples, the presently described microstructured surface is easier to clean, providing a low amount of microorganism (e.g. bacteria) present after cleaning. Without intending to be bound by theory, scanning electron microscopy images suggest that large continuous biofilms typically form on a smooth surface. However, even though the peaks and valleys are much larger than the microorganism (e.g. bacteria), the biofilm is interrupted by the microstructured surface. In some embodiments, the biofilm (before cleaning) is present as discontinuous aggregate and small groups of cells on the microstructured surface, rather than a continuous biofilm. After cleaning, biofilm aggregates in small patches cover the smooth surface. However, the microstructured surface was observed to have only small groups of cells and individual cells after cleaning. In favored embodiments, the microstructured surface provided a log 10 reduction of microorganism (e.g. bacteria such as *Streptococcus mutans, Staphyloccus aureus, Psueodomonas aeruginosa*, or Phi6 Bacteriophage) of at least 2, 3, 4, 5, 6, 7 or 8 after cleaning. In some embodiments, the microstructured surface had a mean log 10 of recovered colony forming units of microorganism of less than 6, 5, 4, or 3 after cleaning for a highly contaminated surface as prepared according to the test methods. Typical surfaces would often have a lower initial contamination and thus would be expected to have even less recovered colony forming units after cleaning. The test methods for these properties are described in the examples.

In some embodiments, the microstructured surface can prevent an aqueous or (e.g. isopropanol) alcohol-based cleaning solution from beading up as compared to a smooth surface comprised of the same polymeric (e.g. thermoplastic, thermoset, or polymerized resin) material. When a cleaning solution beads up or in other words dewets, the disinfectant agent may not be in contact with a microorganism for a sufficient duration of time to kill the microorganism. However, it has been found that at least 50, 60, 70, 80, or 90% of the microstructured surface can comprise cleaning solution 1, 2, and 3 minutes after applying the cleaning solution to the microstructured surface (according to the test method described in the examples).

In some embodiments, the microstructured surface provides a reduction in microorganism (e.g. bacteria such as *Streptococcus mutans, Staphyloccus aureus, Psueodomonas aeruginosa*, or Phi6 Bacteriophage) touch transfer. The reduction is microorganism touch transfer can be at least 25, 30, 35, 40, 45, 50, 60, 70, 80, 90, 95, or 99% in comparison to the same smooth (e.g. unstructured) surface. The test methods for this property is described in the examples.

In one embodiment, the microstructured surface may have the same surface as a brightness enhancing film. As described for example in U.S. Pat. No. 7,074,463, backlit liquid crystal displays generally include a brightness enhancing film positioned between a diffuser and a liquid crystal display panel. The brightness enhancing film collimates light thereby increasing the brightness of the liquid crystal display panel and also allowing the power of the light source to be reduced.

Thus, brightness enhancing films have been utilized as an internal component of an illuminated display devices (e.g. cell phone, computer) that are not exposed to microorganisms (e.g. bacteria) or dirt.

Figure 3:
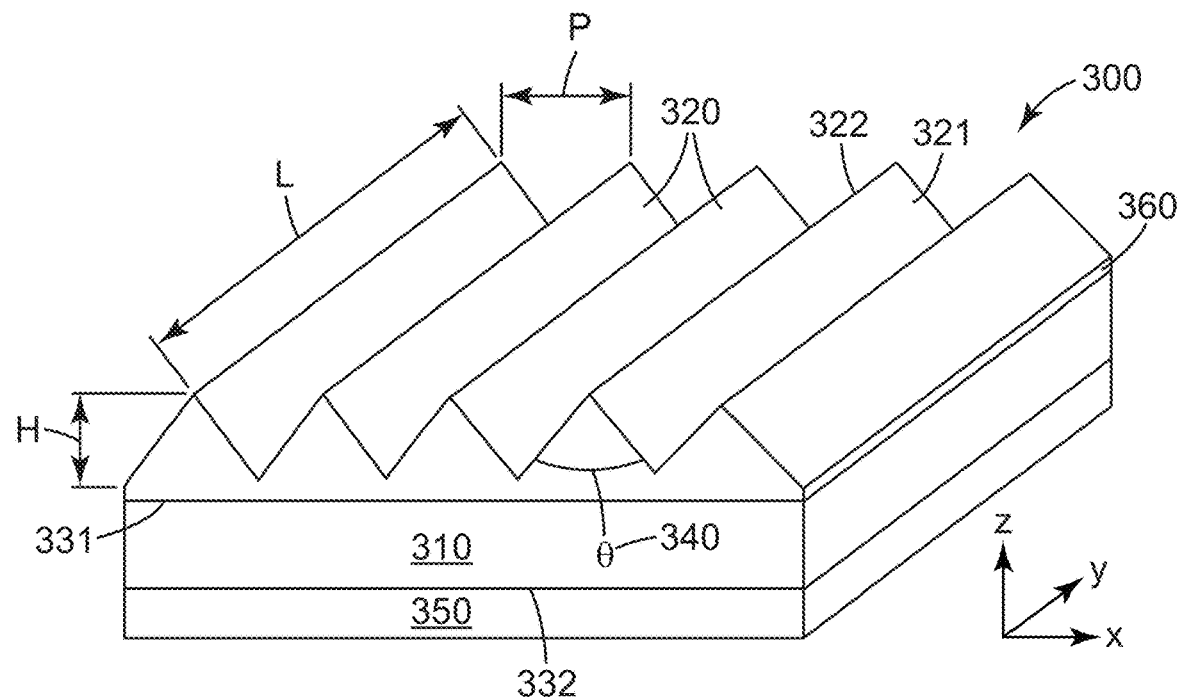
FIG. 3 is a perspective view of a microstructured surface comprising a linear array of prisms.
Figure 6:
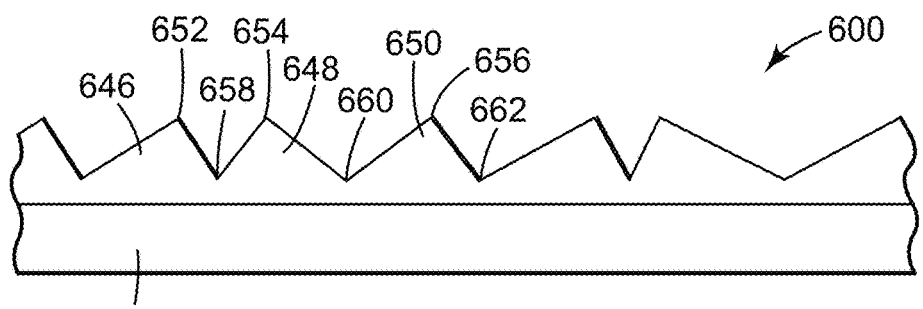
FIG. 6 is a cross-sectional view of peak structures with various apex angles.
Figure 7:
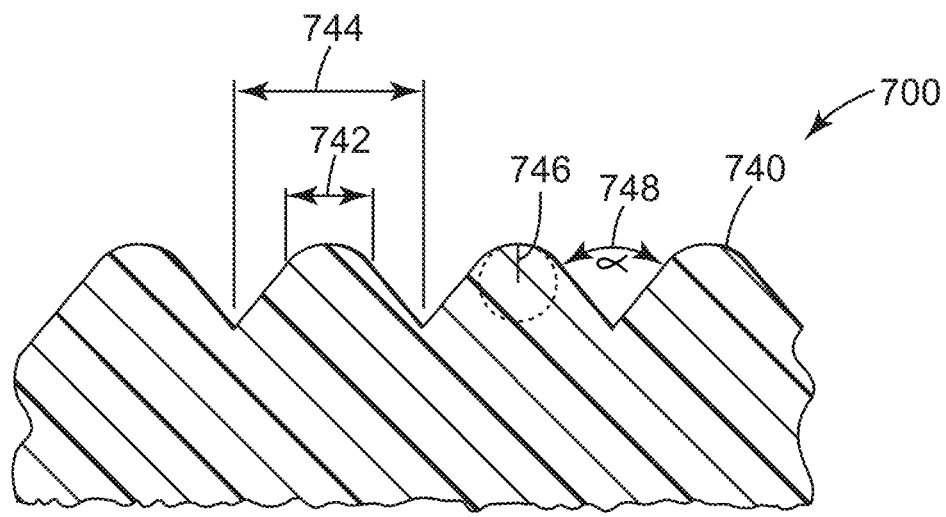
FIG. 7 is a cross-sectional view of peak structures with a rounded apexes.
Figure 8:
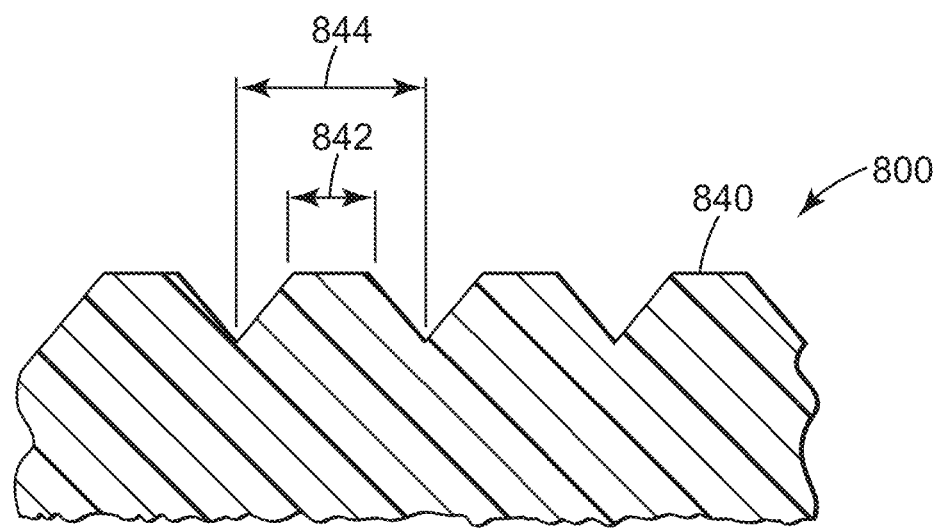
FIG. 8 is a cross-sectional view of peak structures with planar apexes.

With reference to FIG. 3, in one embodiment, the microstructured surface 300 comprises a linear array of regular right prisms 320. Each prism has a first facet 321 and a second facet 322. The prisms are typically formed on a (e.g. preformed polymeric film) base member 310 that has a first planar surface 331 (parallel to reference plane 126) on which the prisms are formed and a second surface 332 that is substantially flat or planar and opposite first surface. By right prisms it is meant that the apex angle θ, 340, is typically about 90°. However, this angle can range from 70° to 120° and may range from 80° to 100°. In some embodiments, the apex angle can be greater than 60, 65, 70, 75, 80, or 85°. In some embodiments, the apex angle can be less than 150, 145, 140, 135, 130, 125, 120, 110, or 100°. These apexes can be sharp (as shown), rounded (as shown in FIG. 7) or truncated (as shown in FIG. 8). In some embodiments, the included angle of the valley is in the same range as the apex angle. The spacing between (e.g. prism) peaks may be characterized as pitch ("P"). In this embodiment, the pitch is also equal to the maximum width of the valley. Thus, the pitch is greater than 1, 2, 3, 4, 5, 6, 7, 8, 9, or 10 microns ranging up to 250 microns, as previously described. The length ("L") of the (e.g. prim) microstructures is typically the largest dimension and can span the entire dimension of the microstructured surface, film or article. The prism facets need not be identical and the prisms may be tilted with respect to each other, as shown in FIG. 6.

Figure 4C:
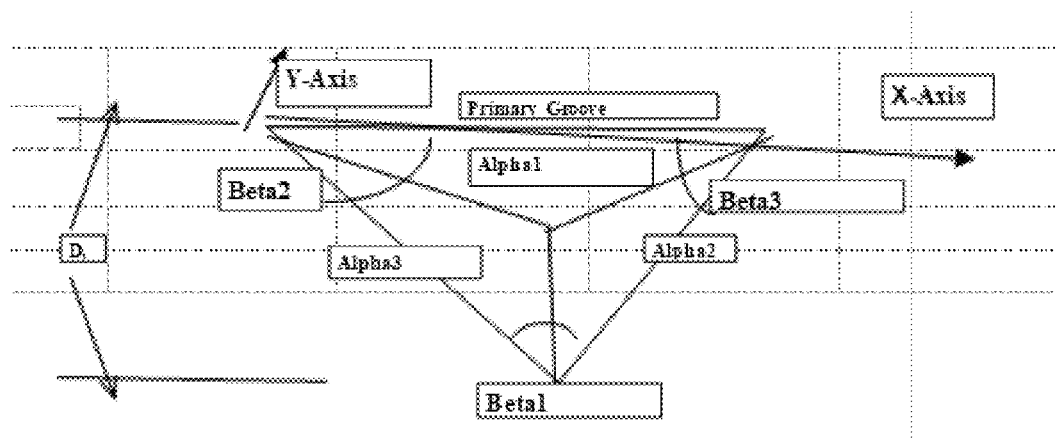
FIG. 4C is a perspective view illustrating the dimensions and angles of a cube corner element.
Figure 4A:
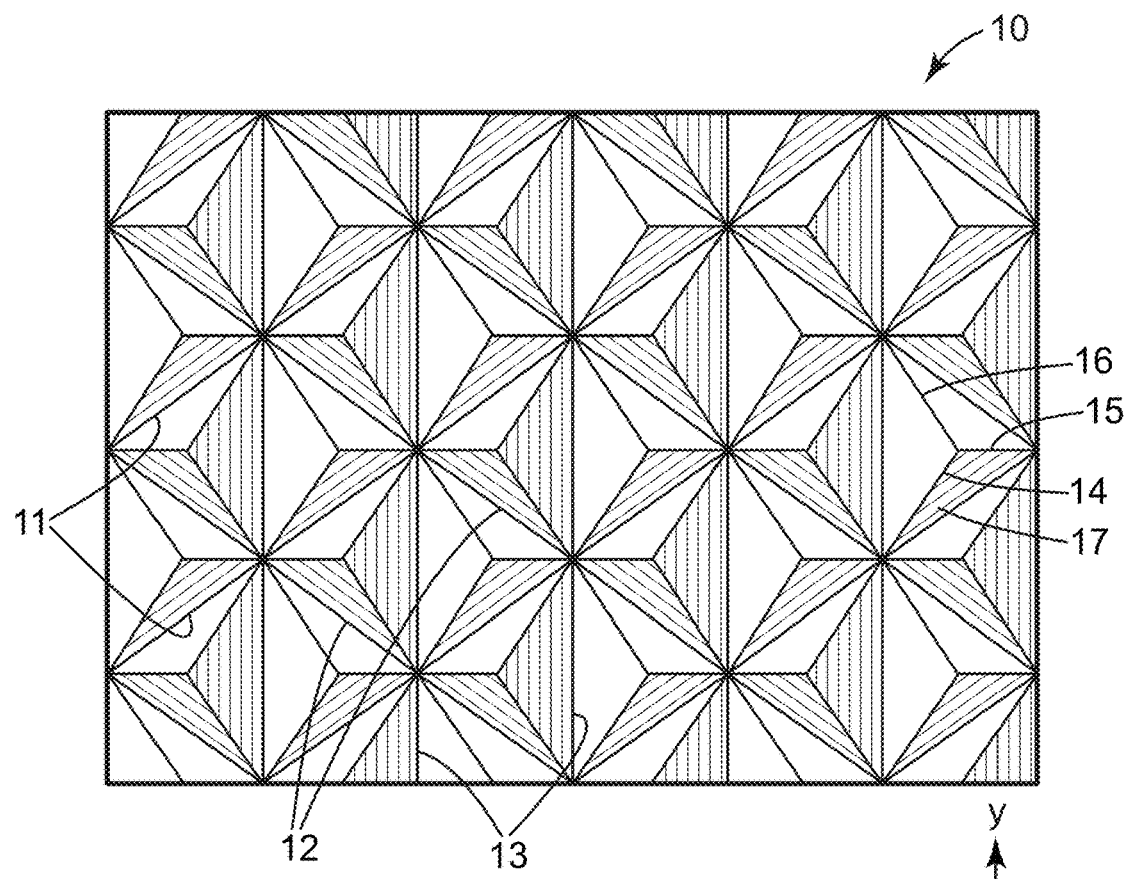
FIG. 4A is a perspective view of a microstructured surface comprising an array of cube corner elements.

In another embodiment, the microstructured surface may have the same surface as cube corner retroreflective sheeting. Retroreflective materials are characterized by the ability to redirect light incident on the material back toward the originating light source. This property has led to the widespread use of retroreflective sheeting for a variety of traffic and personal safety uses. With reference to FIG. 4A, cube corner retroreflective sheeting typically comprises a thin transparent layer having a substantially planar front surface and a rear structured surface 10 comprising a plurality of cube corner elements 17. A seal film (not shown) is typically applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture.

The microstructured surface 10 of FIG. 4A may be characterized as an array of cube corner elements 17 defined by three sets of parallel grooves (i.e. valleys) 11, 12, and 13; two sets of grooves (i.e. valleys) intersect each other at an angle greater than 60 degrees and a third set of grooves (valleys) intersects each of the other two sets at an angle less than 60 degrees to form an array of canted cube corner element matched pairs (see U.S. Pat. No. 4,588,258 (Hoopman)). The angles for the grooves are chosen such that the dihedral angle formed at the linear of intersection of the grooves, e.g. 14, 15, and 16 for representative cube-corner element 17 are about 90 degrees. In some embodiments, the triangular base has angle of at least 64, 65, 66, 67, 68, 69, or 70 degrees and the other angles are 55, 56, 57, or 58 degrees.

Figure 4B:
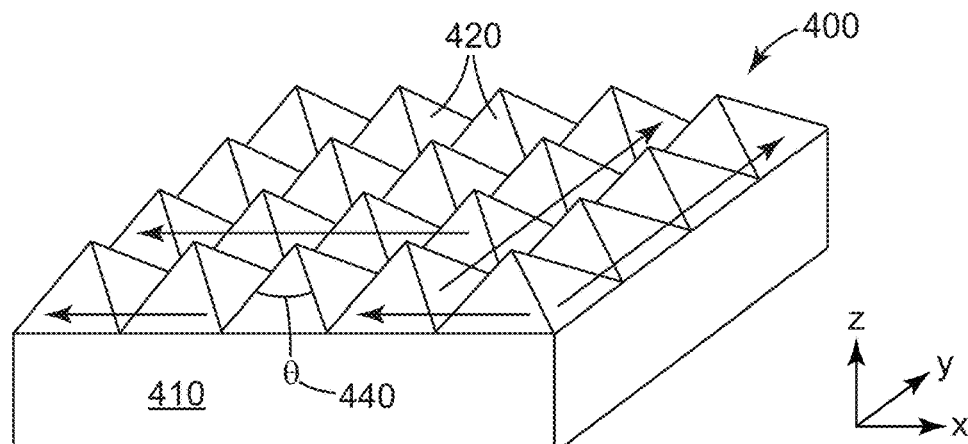
FIG. 4B is a perspective view of a microstructured surface comprising an array of pyramid elements.

In another embodiment, depicted in FIG. 4B, the microstructured surface 400 of FIG. 4B may be characterized as an array of pyramidal peak structures 420 defined by a first set of parallel grooves (i.e. valleys) in the y direction and a second set of parallel groves in the x direction. The base of the pyramidal peak structures is a polygon, typically a square or rectangle depending on the spacing of the grooves. The apex angle θ, 440, is typically about 90°. However, this angle can range from 70° to 120° and may range from 80° to 100°. In other embodiments, the apex angle is at least 20°, 30°, 40°, 50°, or 60°.

Other cube corner element structures, described as "full cubes" or "preferred geometry (PG) cube corner elements", typically comprise at least two non-dihedral edges that are not coplanar as described for example in U.S. Pat. No. 7,188,960; incorporated herein by reference. Full cubes are not truncated. In one aspect, the base of full cube elements in plan view are not triangular. In another aspect, the non-dihedral edges of full cube elements are characteristically not all in the same plane (i.e. not coplanar). Such cube corner elements may be characterized as "preferred geometry (PG) cube corner elements".

A PG cube corner element may be defined in the context of a structured surface of cube corner elements that extends along a reference plane. A PG cube corner element means a cube corner element that has at least one non-dihedral edge that: (1) is nonparallel to the reference plane; and (2) is substantially parallel to an adjacent non-dihedral edge of a neighboring cube corner element. A cube corner element with reflective faces that comprise rectangles (inclusive of squares), trapezoids or pentagons are examples of PG cube corner elements.

Figure 5:
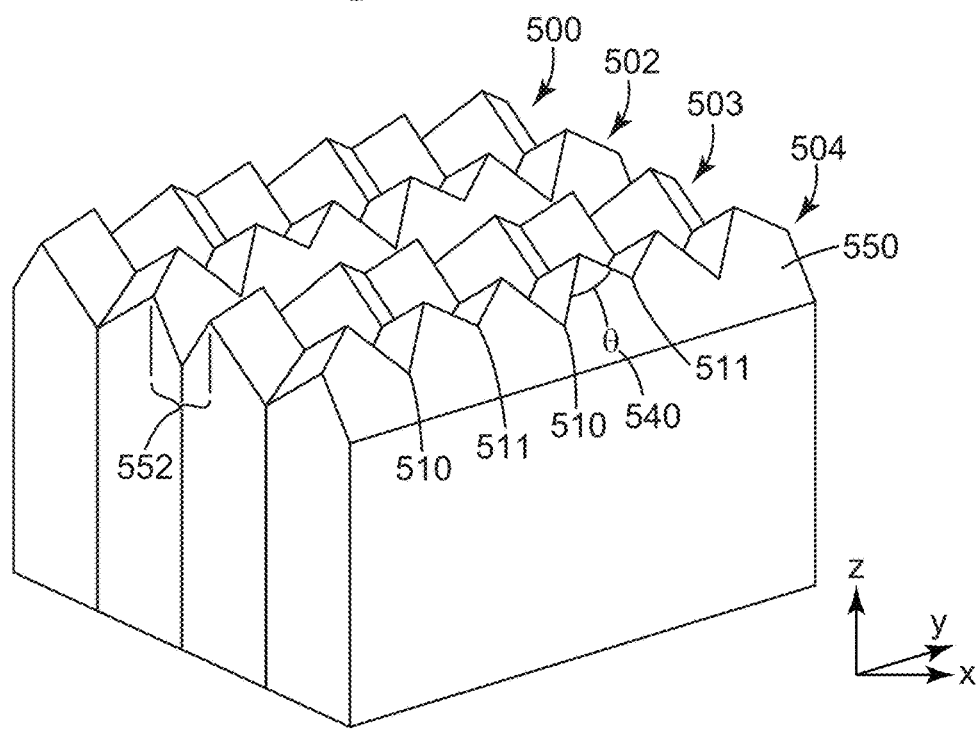
FIG. 5 is a perspective view of a microstructured surface comprising an array of preferred geometry cube corner elements.

With reference to FIG. 5, in another embodiment the microstructured surface 500 may comprise an array of preferred geometry (PG) cube corner elements. The illustrative microstructured surface comprises four rows (501, 502, 503, and 504) of preferred geometry (PG) cube corner elements. Each row of preferred geometry (PG) cube corner elements has faces formed from a first and second groove set also referred to as "side grooves". Such side grooves range from being nominally parallel to non-parallel to within 1 degree to adjacent side grooves. Such side grooves are typically perpendicular to reference plane 124 of FIG. 1. The third face of such cube corner elements preferably comprises a primary groove face 550. This primary groove face ranges from being nominally perpendicular to non-perpendicular within 1 degree to the face formed from the side grooves. In some embodiments, the side grooves can form an apex angle θ, of nominally 90 degrees. In other embodiments, the row of preferred geometry (PG) cube corner elements comprises peak structures formed from an alternating pair of side grooves 510 and 511 (e.g. about 75 and about 105 degrees) as depicted in FIG. 5. Thus, the apex angle 540 of adjacent (PG) cube corner elements can be greater than or less than 90 degrees. In some embodiments, the average apex angle of adjacent (PG) cube corner elements in the same row is typically 90 degrees. As described in previously cited U.S. Pat. No. 7,188,960, during the manufacture of a microstructured surface comprising PG cube corner elements, the side grooves can be independently formed on individual lamina (thin plates), each lamina having a single row of such cube corner elements. Pairs of laminae having opposing orientation are positioned such that their respective primary groove faces form primary groove 552, thereby minimizing the formation of vertical walls. The lamina can be assembled to form a microstructured surface which is then replicated to form a tool of suitable size.

In some embodiments, all the peak structures have the same apex angle θ. For example, the previously described microstructured surface of FIG. 3 depicts a plurality of prism structures, each having an apex angle θ of 90 degrees. As another example, the previously described microstructured surface of FIG. 4B depicts a plurality of pyramidal structures, each having an apex angle θ of 60 degrees. In other embodiments, the peak structures may form apex angles that are not the same. For example, as depicted in FIG. 5, some of the peak structures may have an apex angle greater than 90 degrees and some of the peak structures may have an apex angle less than 90 degrees. In some embodiments, the peak structures of an array of microstructures have peak structures with different apex angles, yet the apex angles average a value ranging from 60 to 120 degrees. In some embodiments, the average apex angle is at least 65, 70, 75, 80, or 85 degrees. In some embodiments, the average apex angle is less than 115, 110, 100, or 95 degrees.

As yet another example, as depicted in the cross-section of FIG. 6, the microstructured surface 600 may comprise a plurality of peak structures such as 646, 648, and 650 having peaks 652, 654, and 656, respectively. When the microstructured surface is free of flat surfaces, (i.e. surfaces that are parallel to reference plane 126 of FIG. 1), the facets of adjacent peak structures may also define the valley between adjacent peaks. In some embodiments, the facets of the peak structure form a valley with a valley angle of less than 90 degrees (e.g. valley 658). In some embodiments, the facets of the peak structure form a valley with a valley angle of greater than 90 degrees (e.g. valley 660). In some embodiments, the valleys are symmetrical, such as depicted by valleys 658 and 660. In other embodiments, the valleys are symmetrical such as depicted by valley 662. When the valley is symmetrical the side walls of adjacent peak structures that define the valley are substantially the same. When the valley is asymmetrical, the side walls of adjacent peak structures that define the valley are different. The microstructured surface may have a combination of symmetrical and asymmetrical valleys.

FIG. 7 shows another embodiment of a microstuctured surface 700, wherein the peak structures have rounded apexes 740. These peak structures are characterized by a chord width 742, a cross-sectional base peak width 744, radius of curvature 746, and root angle 748. In some embodiments, the chord width is equal to about 20% to 40% of the cross-sectional pitch width. In some embodiments, the radius of curvature is equal to about 20% to 50% of the cross-sectional pitch width. In some embodiments, the root angle is at least 50, 65, 70, 80 or 85 degrees. In some embodiments, the root angle is no greater than 110, 105, 100, or 95 degrees. In some embodiments, root angle is at least 60, 65, 70, 75, 80, or 90 degrees can be preferred. The root angle can be the same as the valley angle. In some embodiments, the peak structures have apexes that are rounded to a radius in a range of at least 2, 3, or 4 and no greater than 15, 10, or 5 micrometers. In some embodiments, the valleys are rounded to a radius in a range of at least 2, 3, or 4 and no greater than 15, 10, or 5 micrometers. In some embodiments, both the peaks and valleys are rounded to a radius in a range of at least 2, 3, or 4 and no greater than 15, 10, or 5 micrometers.

FIG. 8 shows another embodiment of a microstructured surface 800, wherein the peak structures 840 are truncated, having flat or in other words planar top surface (substantially parallel to reference plane 126 of FIG. 1). These peak structures can be are characterized by a flattened width 842 and cross-sectional base peak width 844. In typical embodiments, the flattened width can be equal to or less than 50, 45, 40, 35, 30, 25, 20, 15, 10, 5, 4, 3, 2, or 1% of the cross-sectional base peak width. Notably, a peak structure can have the same side wall angle regardless of whether the apex is sharp, rounded, or truncated.

In some embodiments, the peak structures typically comprise at least two (e.g. prisms of FIG. 3), three (e.g. cube corners of FIG. 4A) or more facets. For example, when the base of the microstructure is an octagon the peak structures comprise eight side wall facets. However, when the facets have rounded or truncated surfaces, such as shown in FIGS. 7-8; the microstructures may not be characterized by a specific geometric shape.

Figure 2A:
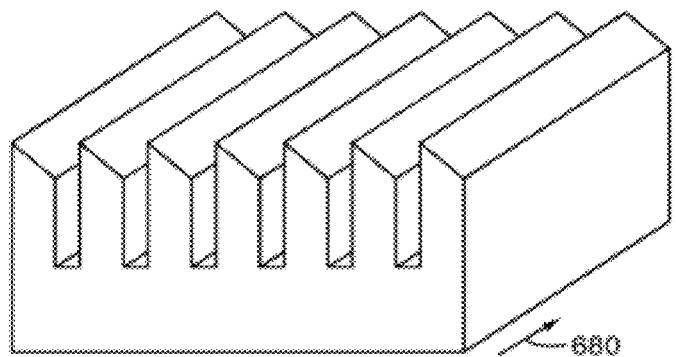
FIG. 2A is a perspective view of a microstructured surface.

When the facets of the microstructures are joined such that the apex and valleys are sharp or rounded, but not truncated, the microstructured surface can be characterized are being free of flat surfaces, that are parallel to the planar base layer. However, wherein the apex and/or valleys are truncated, the microstructured surface typically comprises less than 50, 45, 40, 35, 30, 25, 20, 15, 10, 5 or 1% of flat surface area that is substantially parallel to the planar base layer. In one embodiment, the valleys may have flat surfaces and only one of the side walls of the peaks is angled such as shown in FIG. 2A. However, in favored embodiments, both side walls of adjacent peaks defining the valley(s) are angled toward each other, as previously depicted. Thus, the side walls on either side of a valley are not parallel to each other.

In each of the embodiments of FIGS. 3-8, the facets of adjacent (e.g. prism or cube corner) peak structures are typically connected at the bottom of the valley, i.e. proximate the planar base layer. The facets of the peak structures form a continuous surface in the same direction. For example, in FIG. 3, the facets 321 and 322 of the (e.g. prism) peak structures are continuous in the direction of the length (L) of the microstructures or in otherwords, the y-direction. As yet another example, the primary grooves 452 and 550 of the PG cube corner elements of FIG. 5 form a continuous surface in the y-direction. In other embodiments, the facets form a semi-continuous surface in the same direction. For example, in FIG. 4, facets of the (e.g. cube corner or pyramidal) peak structures are in the same plane in both the x- and y-directions. These semi-continuous and continuous surfaces can assist in the cleaning of pathogens from the surface.

In some embodiments, the apex angle of the peak structure is typically two times the wall angle, particularly when the facets of the peak structures are interconnected at the valleys between peak structures. Thus, the apex angle is typically greater than 20 degrees and more typically at least 25, 30, 35, 40, 45, 50, 55, or 60 degrees. The apex angle of the peak structure is typically less than 160 degrees and more typically less than 155, 150, 145, 140, 135, 130, 125 or 120 degrees.

Topography maps were obtained using confocal laser scanning microscopy (CLSM). The CLSM instrument used for all imaging is a Keyence VK-X200. CLSM is an optical microscopy technique that scans the surface using a focused laser beam to map the topography of a surface.

CLSM works by passing a laser bean through a light source aperture which is then focused by an objective lens into a small area on the surface and image is built up pixel-by-pixel by collecting the emitted photons from the sample. It uses a pinhole to block out-of-focus light in image formation. Dimensional analysis was used to measure various parameters using SPIP 6.7.7 image metrology software according to the manual (see https://www.imagemet.com/media-library/support-documents).

Surface roughness parameters, Sa (Roughness Average), Sq (Root Mean Square), and Sbi (Surface Bearing Index), Svi (Valley Fluid Retention Index) were calculated from the topographic images (3D). Prior to calculating roughness, a plane correction was used "Subtract Plane" (1' order planefit form removal).

The following table describes S parameters of some representative examples and comparative examples.

| | S Parameters | | | | |
|---|---|---|---|---|---|
| Example | Sa [nm] | Sq [nm] | Sbi | Svi | Sbi/Svi |
| Example 19 BEF epoxy | 1899 | 2215 | 0.53 | 0.086 | 6 |
| Example 20 Cube Corner epoxy | 10496 | 12504 | 0.97 | 0.039 | 25 |
| Example 1 BEF polymerized resin | 1961 | 2263 | 1.95 | 0.072 | 27 |
| Example 6 | 27327 | 32252 | 3.92 | 0.063 | 62 |
| Example 7 | 5846 | 6620 | 2.80 | 0.064 | 44 |
| Example 8 | 27289 | 32142 | 3.13 | 0.107 | 29 |
| Comp. B Smooth epoxy | 366 | 457 | 0.28 | 0.092 | 3 |
| Comp. A Smooth Polymerized Resin | 30 | 63 | 0.10 | 0.120 | 1 |
| Comp. E Square Wave | 41627 | 42389 | 7.1 | 0.017 | 417 |
| Comp. F Square Wave | 21002 | 21428 | 1.22 | 0.013 | 95 |

The Roughness Average, $S_a$ is defined as:

$$S_a = \frac{1}{MN} \sum_{k=0}^{M-1} \sum_{l=0}^{N-1} |z(x_k, y_l)|$$

where M and N are the number of data points X and Y.

Although smooth surfaces can have a Sa approaching zero, the comparative smooth surfaces that were found to have poor microorganism removal after cleaning had an average surface roughness, Sa, of at least 10, 15, 20, 25 or 30 nm. The average surface roughness, Sa, of the comparative smooth surfaces was less than 1000 nm (1 micron). In some embodiments, Sa of the comparative smooth surface was at least 50, 75, 100, 125, 150, 200, 250, 300, or 350 nm. In some embodiments, Sa of the comparative smooth surface was no greater than 900, 800, 700, 600, 500, or 400 nm.

The average surface roughness, Sa, of the microstructured surfaces having improved microorganism removal after cleaning was 1 micron (1000 nm) or greater. In some embodiments, Sa was at least 1100 nm, 1200 nm, 1300 nm, 1400 nm, 1500 nm, 1600 nm, 1700 nm, 1800 nm, 1900 nm, or 2000 nm (2 microns). In some embodiments, Sa of the microstructured surfaces was at least 2500 nm, 3000 nm, 3500 nm, 4000 nm or 5000 nm. In some embodiments, Sa of the microstructured surfaces was at least 10,000 nm, 15,000 nm, 20,000 nm or 25,000 nm. In some embodiments, Sa of the microstructured surfaces having improved microorganism removal after cleaning was no greater than 40,000 nm (40 microns), 35,000 nm, 30,000 nm, 15,000 nm, 10,000 nm, or 5,000 nm.

In some embodiments, Sa of the microstructured surface is at least 2 or 3 times the Sa of a smooth surface. In other embodiments, Sa of the microstructured surface is at least 4, 5, 6, 7, 8, 9, or 10 times the Sa of a smooth surface. In other embodiments, Sa of the microstructured surface is at least 15, 20, 25, 30, 35, 40, 45, 50 times the Sa of a smooth surface. In other embodiments, Sa of the microstructured surface is at least 100, 200, 300, 400, 500, 600, 700, 800, 900, or 1000 times the Sa of a smooth surface.

The Root Mean Square (RMS) parameter $S_q$, is defined as:

$$S_q = \sqrt{\frac{1}{MN} \sum_{k=0}^{M-1} \sum_{l=0}^{N-1} [z(x_k, y_l)]^2}$$

where M and N are the number of data points X and Y.

Although the Sq values are slightly higher than the Sa values, the Sq values also fall within the same ranges just described for the Sa values.

The Surface Bearing Index, Sbi, is defined as:

$$S_{bi} = \frac{S_q}{Z_{0.05}},$$

wherein $Z_{0.05}$ is the surface height at 5% bearing area.

The Valley Fluid Retention Index, Sivi, is define as:

$$S_{vi} = \frac{V_v(h_{0.80})}{(M-1)(N-1)\delta x \delta y}/S_q,$$

wherein Vv(h0.80) is the void volume at valley zone within 80-100% bearing area.

As noted in the S Parameters table above, the Sbi/Svi ratio of the comparative smooth samples were 1 and 3. The microstructured surfaces having improved microorganism removal after cleaning had a Sbi/Svi ratio of greater than 3. The microstructured surfaces have a Sbi/Svi ratio of at least 4, 5, or 6. In some embodiments, the microstructured surfaces having improved microorganism removal after cleaning had a Sbi/Svi ratio of at least 7, 8, 9, or 10. In some embodiments, the microstructured surfaces having improved microorganism removal after cleaning had a Sbi/Svi ratio of at least 15, 20, 25, 30, 35, 40 or 45. The microstructured surfaces having improved microorganism removal after cleaning had a Sbi/Svi ratio of less than the comparative square wave microstructured surfaces. Thus, the microstructured surfaces having improved microorganism removal after cleaning had a Sbi/Svi ratio of less than 90, 85, 80, 75, 70 or 65. In some embodiments, the microstructured surfaces having improved microorganism removal after cleaning had a Sbi/Svi ratio of less than 60, 55, 50, 45, 40, 35, 30, 25, 20, or 10.

Topography maps can also be used to measure other features of the microstructured surface. For example, the peak height (especially of a repeating peak of the same height) can be determined from the height histogram function of the software. To calculate the percentage of "flat regions" of a square wave film, the "flat regions" can be identified using SPIP's Particle Pore Analysis feature, which identifies certain shapes (in this case, the "flat tops" of the microstructured square wave film.

Methods

The microstructured films and articles can be formed by a variety of methods, including a variety of microreplication methods, including, but not limited to, coating, casting and curing a polymerizable resin, injection molding, and/or compressing techniques. For example, microstructuring of the (e.g. engineered) surface can be achieved by at least one of (1) casting a molten thermoplastic using a tool having a microstructured pattern, (2) coating of a fluid onto a tool having a microstructured pattern, solidifying the fluid, and removing the resulting film, (3) passing a thermoplastic film through a nip roll to compress against a tool having a microstructured pattern (i.e., embossing), and/or (4) contacting a solution or dispersion of a polymer in a volatile solvent to a tool having a microstructured pattern and removing the solvent, e.g., by evaporation. The tool can be formed using any of a number of techniques known to those skilled in the art, selected depending in part upon the tool material and features of the desired topography. Illustrative techniques include etching (e.g., chemical etching, mechanical etching, or other ablative means such as laser ablation or reactive ion etching, etc., and combinations thereof), photolithography, stereolithography, micromachining, knurling (e.g., cutting knurling or acid enhanced knurling), scoring, cutting, etc., or combinations thereof. In some embodiments, the tool is a metal tool. The tool may further comprise a diamond like glass layer, such as described in WO2009/032815 (David).

Alternative methods of forming the (e.g. engineered) microstructured surface include thermoplastic extrusion, curable fluid coating methods, and embossing thermoplastic layers, which can also be cured. Additional information regarding materials and various processes for forming the (e.g. engineered) microstructured surface can be found, for example, in Halverson et al., PCT Publication No. WO 2007/070310 and US Publication No. US 2007/0134784; Hanschen et al., US Publication No. US 2003/0235677; Graham et al., PCT Publication No. WO2004/000569; Ylitalo et al., U.S. Pat. No. 6,386,699; Johnston et al., US Publication No. US 2002/0128578 and U.S. Pat. Nos. 6,420, 622, 6,867,342, 7,223,364 and Scholz et al., U.S. Pat. No. 7,309,519.

In some embodiments, the microstructured surface is incorporated into at least a portion of the surface of an article. In this embodiment, the microstructured surface is typically formed during the manufacture of the article. In some embodiments, this is accomplished by molding of a (e.g. thermoplastic, thermosetting, or polymerizable) resin, compression molding of a (e.g. thermoplastic of thermosetting) sheet, or thermoforming of a microstructured sheet.

In one embodiment, an article of component thereof, such as a cell phone case or housing can be prepared by casting a liquid (e.g. thermoplastic, thermosetting, or polymerizable) resin into a mold, wherein the mold surface comprises a negative replication of the microstructured surface.

Epoxy Resin Composition

Epoxy resin compositions generally comprises at least one epoxy resins containing at least two epoxide groups. An epoxide group is a cyclic ether with three ring atoms, also sometimes referred to as a glycidyl or oxirane group. Epoxy resins are typically low molecular weight monomers that are liquids at ambient temperature.

The epoxy resin composition generally comprises at least one epoxy resin that comprises at least one cyclic moiety. The cyclic moiety may be aromatic or cycloaliphatic.

In some embodiments, the epoxy resin composition comprises a bisphenol epoxy resin. Bisphenol epoxy resins are formed from reacting epichlorohydrin with bisphenol A to form diglycidyl ethers of bisphenol A.

Examples of commercially available bisphenol epoxy resins include diglycidyl ethers of bisphenol A (e.g. those available under the trade designations EPON 828, EPON 1001, EPON 1004, EPON 2004, EPON 1510, and EPON 1310 from Momentive Specialty Chemicals, Inc., and those under the trade designations D.E.R. 331, D.E.R. 332, D.E.R. 334, and D.E.N. 439 available from Dow Chemical Co.); diglycidyl ethers of bisphenol F (e.g., that are available under the trade designation ARALDITE GY 281 available from Huntsman Corporation) or blends of bisphenol A and F resins such as EPIKOTE 232 from Momentive Specialty Chemicals, Inc.; flame retardant epoxy resins (e.g., that are available under the trade designation DER 560, and brominated bisphenol type epoxy resin, such as available from Dow Chemical Company.

Aromatic epoxy resins can also be prepared by reaction of aromatic alcohols such as biphenyl diols and triphenyl diols and triols with epichlorohydrin. Such aromatic biphenyl and triphenyl epoxy resins are not bisphenol epoxy resins. One representative compound is tris-(hydroxyl phenyl)methane-based epoxy available from Huntsman Corporation, Basel, Switzerland as Tactix™ 742.

Novolac epoxy resins are formed by reaction of phenols with formaldehyde and subsequent glycidylation with epichlorohydrin produces epoxidized novolacs, such as epoxy phenol novolacs (EPN) and epoxy cresol novolacs (ECN). These are highly viscous to solid resins with typical mean epoxide functionality of around 2 to 6. A representative commercially available novolac epoxy resin is a semi-solid epoxy novolac resin commercially available from Dow as the trade designation "D.E.N. 431." Such novolac epoxy resins can be used in combination with an epoxy resin that is liquid at 25° C.

In some embodiments, epoxy resins are cycloaliphatic epoxy resins containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid, as known in the art. Such cycloaliphatic epoxy resins have a saturated (i.e. non-aromatic) ring structure wherein the epoxide group is part of the ring or is attached to the ring structure. These epoxy resins typically contain one or more ester linkages between the epoxide groups. Alkylene ($C_1$-$C_4$) linkages are also typically present between an epoxide group and ester linkage or between ester linkages. Illustrative cycloaliphatic epoxy resins include for example 3,4-epoxycyclohexylmethyl-3,4-epoxycyclohexane carboxylate bis(3,4-epoxycyclohexylmethyl) adipate. Another suitable cycloaliphatic epoxy resins includes vinylcyclohexane dioxide that contains two epoxide groups, one that is part of a ring structure; 3,4-epoxy-6-methylcyclohexylmethyl-3,4-epoxycyclohexane carboxylate and dicyclopentadiene dioxide. Other suitable cycloaliphatic epoxy resins including glycidyl ethers include 1,2-bis(2,3-epoxycyclopentyloxy)-ethane; 2,3-epoxycyclopentyl glycidyl ether; diglycidyl cyclohexane-1,2-dicarboxylate; 3,4-epoxycyclohexyl glycidyl ether; bis-(2,3-epoxycyclopentyl) ether; bis-(3,4-epoxycyclohexyl) ether; 5(6)-glycidyl-2-(1,2-epoxyethyl)bicyclo[2.2.1]heptane; cyclohexa-1,3-diene dioxide; 3,4-epoxy-6-methylcyclohexylmethyl3',4'-epoxy-6'-methylcyclohexanecarboxylate.

Also suitable are epoxy resins in which the 1,2-epoxy groups are attached to various heteroatoms or functional groups; such compounds include, for example, the N,N,O-triglycidyl derivative of 4-aminophenol, the N,N,O-triglycidyl derivative of 3-aminophenol, the glycidyl ether/glycidyl ester of salicylic acid, N-glycicyl-N'-(2-glycidyloxypropyl)-5,5-dimethylhydantoin or 2-glycidyloxy-1,3-bis-(5,5-dimethyl-1-glycidylhydantoin-3-yl)propane.

The epoxy resin typically has an epoxy equivalent weight from 50 to 250, 300, 350, 400, 450, or 500 grams per epoxide group. The epoxy resins typically have a viscosity less than about 1000 cps at 25° C. In some embodiments, the viscosity is at least 50, 100, 150, 200, 250, or 300 centipoise. In some embodiments, the viscosity is no greater than 900, 800, 700, 600, or 500 centipoise. A single epoxy resin or combination of epoxy resins may be utilized. The epoxy resin composition typically comprises at least 5, 6, 7, 8, 9, or 10 wt.-% of epoxy resin(s), based on the weight of the total epoxy resin composition. Due to the high concentration of thermally conductive inorganic particles, the amount of epoxy resin(s), is typically no greater than 20 wt.-%, and in some embodiments no greater than 19, 18, 17, 16, or 15 wt.-%.

In some embodiments, the epoxy resin composition further comprises an oligomeric or polymeric component. The oligomeric or polymeric component can impart flexibility, thermal shock resistance, crack resistance and impact resistance to the cured epoxy resin composition.

In some embodiments, the oligomeric or polymeric component may be characterized as a toughening agent. A toughening agent is typically an organic polymer additive that phase separates in a cured epoxy resin. Toughening agents can be characterized as being non-reactive oligomeric or polymeric components. Toughening agents include for example block copolymers, amphiphilic block copolymers, acrylic block copolymers, carboxyl terminated butadiene acrylonitrile rubber (CTBN), core shell rubbers (CSR), linear polybutadiene-polyacrylonitrile copolymers, oligomeric polysiloxanes, silicone polyethers, organopolysiloxane resins, or mixtures thereof. Other epoxy-reactive polymeric toughening agents include carboxyl terminated polybutadiene, polysulfide-based toughening agents, amine terminated butadiene nitrile rubbers, polythioethers, or mixtures thereof.

Examples epoxy-reactive oligomeric components include for example fatty acids; fatty acid anhydrides such as polyazelaic polyanhydride and dodecenylsuccinic anhydride; diols such as ethylene glycol, polyols, polyetherdiols such as polymers of ethylene glycol polyethylene glycol and polypropylene glycol, fatty alcohols, and other materials having hydroxyl groups, carboxyl epoxy, and/or carboxylic anhydride functionality. Other suitable oligomeric components include trihydric and dihydric carboxyl-terminated, carboxylic anhydride-terminated, glycidyl-terminated and hydroxyl-terminated polyethylene glycols, polypropylene glycols or polybutylene glycols.

In some embodiments, the epoxy resin composition comprises a curing agent. Common classes of curatives for epoxy resins include amines, amides, ureas, imidazoles, and thiols. The curing agent is typically highly reactive with the epoxide groups at ambient temperature.

In some embodiments, the curing agent comprises reactive —NH groups or reactive —$NR_1R_2$ groups wherein $R_1$ and $R_2$ are independently H or $C_1$ to $C_4$ alkyl, and most typically H or methyl.

One class of curing agents are primary, secondary, and tertiary polyamines. The polyamine curing agent may be straight-chain, branched, or cyclic. In some favored embodiments, the polyamine crosslinker is aliphatic. Alternatively, aromatic polyamines can be utilized.

Useful polyamines are of the general formula $R_5$—$(NR_1R_2)_x$ wherein $R_1$ and $R_2$ are independently H or alkyl, $R_5$ is a polyvalent alkylene or arylene, and x is at least two. The alkyl groups of $R_1$ and $R_2$ are typically $C_1$ to $C_{18}$ alkyl, more typically $C_1$ to $C_4$ alkyl, and most typically methyl. $R_1$ and $R_2$ may be taken together to form a cyclic amine. In some embodiment x is two (i.e. diamine). In other embodiments, x is 3 (i.e. triamine). In yet other embodiments, x is 4.

Useful diamines may be represented by the general formula:

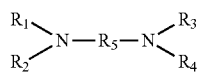

wherein $R_1$, $R_2$, $R_3$ and $R_4$ are independently H or alkyl, and $R_5$ is a divalent alkylene or arylene. In some embodiments, $R_1$, $R_2$, $R_3$ and $R_4$ are each H and the diamine is a primary amine. In other embodiments, $R_1$ and $R_4$ are each H and $R_2$, and $R_4$ are each independently alkyl; and the diamine is a secondary amine. In yet other embodiments, $R_1$, $R_2$, $R_3$ and $R_4$ are independently alkyl and the diamine is a tertiary amine.

In some embodiments, primary amines are preferred. Examples include hexamethylene diamine; 1,10-diaminodecane; 1,12-diaminododecane; 2-(4-aminophenyl)ethylamine; isophorone diamine; norbornane diamine 4,4'-diaminodicyclohexylmethane; and 1,3-bis(aminomethyl)cyclohexane. Illustrative six member ring diamines include for example piperzine and 1,4-diazabicyclo[2.2.2]octane ("DABCO").

Other useful polyamines include polyamines having at least three amino groups, wherein the three amino groups are primary, secondary, or a combination thereof. Examples include 3,3'-diaminobenzidine and hexamethylene triamine.

Common curing agents used to cure cycloaliphatic epoxy resin include anhydrides derived from a carboxylic acid which possesses at least one anhydride group. Such anhydride curing agents are described in U.S. Pat. No. 6,194,024; incorporated herein by reference.

In one embodiment, the curable epoxy resin compositions may be provided as a two-part composition. Generally, the two components of a two-part composition may be mixed prior to dispensing the epoxy resin composition into a mold. At least a portion of the mold comprises a negative replication of the microstructured surface described herein.

Compression Molding of an Epoxy Resin Sheet

In another embodiment, a microstructured surface is prepared by compression molding of an epoxy resin sheet, wherein the mold surface comprises a negative replication of the microstructured surface.

Epoxy resin sheet are produced by applying heat and pressure to layers of paper, canvas, linen or glass cloth impregnated with synthetic thermosetting epoxy resins including a latent curing agent. A variety of resin types and cloth materials can be used to manufacture thermoset laminates with a range of mechanical, thermal, and electrical properties. The curable epoxy resin sheet can be shaped by contacting the molding surface with the sheet and applying heat and pressure. The heat and pressure initially softens the material such that the microstructured surface is replicated onto the surface of the epoxy resin sheet. The heat also cures (i.e. sets) the epoxy resin such that the microstructured surface is maintained. G-10 has a combination of good electrical properties, high strength, higher dimensional stability and high humidity resistance. Representative properties of G-10 are as follows. Other materials with similar properties can also be used.

| ASTM or UL test/Property | Typical Range (Preferred) |
|---|---|
| D792 Density | 1.80-1.85 g/cm$^3$ |
| D570 Water Absorption | 0.10-1.0% 24 hours (<0.5%, <0.2%) |
| D638 Tensile Strength | Lengthwise - 20,000-65,000 psi (>30,000, >40,000 psi) Crosswise within 10,000 psi of lengthwise value |
| D790 Flexural Strength | Lengthwise - 30,000-80,000 psi (>50,000, >60,000, >70,000 psi) Crosswise within 10,000 psi of lengthwise value |
| D790 Flexural Modulus | Lengthwise - 1500-3000 Kpsi (>2,000, >2,500 Kpsi) Crosswise within 300 Kpsi of lengthwise value |
| D256 IZOD Notched Impact | Lengthwise - 12-14 ft-lb/in (>12.5, or 13 ft-lb/in) Crosswise within 2-3 ft-lb/in of lengthwise value |
| D695 Compressive Strength | 50,000-65,000 psi (>60,000) |
| D785 Hardness, Rockwell M | M110 |
| D696 Coefficient of Linear Thermal Expansion | Lengthwise - 0.55-0.85 × 10$^{-5}$ in./in./° F. (<0.70, <0.60) Crosswise within 0.15 of lengthwise value |
| Max Operating Temp | 140-220° C. (<180, <160) |
| C177 Thermal Conductivity | 7 × 10$^{-4}$ cal/cm-sec-° C. |
| UL94 Flammability Rating | H-B |
| D149 Dielectric Strength (short time, ⅛" thick) | 300-900 V/mil (>500, 600, 700) |
| D150 Dielectric Constant at 1 MHz | 4.5-7.5 (5) |
| 150 Dissipation Factor at 1 MHz | 0.018-0.023 (0.019) |
| D495 Arc Resistance (sec) | 100-240 (<150, <125) |

Method of Forming a Microstructured Film of Sheet

In some embodiments, the peak structures and (e.g. planar) base member comprise a different material. For example, as described in Lu et al., U.S. Pat. No. 5,175,030, and Lu, U.S. Pat. No. 5,183,597, a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a monolithic or multilayer e.g. PET film) and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

Such casting and curing method can be utilized to form a microstructured film. Such method can also be utilized to form a thermoformable microstructured base member (e.g. sheet or plate).

In one embodiment, a method of making an article is described comprising providing a base member (e.g. sheet or plate) comprising a microstructured surface. The base member comprises a thermoplastic of thermosettable material.

The peak structures comprise a different material than the base member such that the peak structures have a melt temperature greater than the base member. The peak structures typically comprise a cured polymerizable resin. The method comprises thermoforming the microstructured base member (e.g. film, sheet or plate) into an article at a temperature below the melt temperature of the peak structures. In some embodiments, vacuum forming may be used in combination with thermoforming, also known as dual vacuum thermoforming (DVT). In some embodiments, the thermoformed article may be a three-dimensional shell, such as an oxygen mask or (e.g. interior) automotive trim part.

Useful base member materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, silicone and fluorinated films, and glass. Optionally, the base material can contain mixtures or combinations of these materials. In an embodiment, the base may be multi-layered or may contain a dispersed component suspended or dispersed in a continuous phase. An example of a useful PET films include photograde polyethylene terephthalate and MELINEX™ PET available from DuPont Films of Wilmington, Del. An example of a useful thermoformable material is polyethylene terephthalate (polyester with glycol) commercially available as VIVAK PETG. Such material is characterized by having a tensile strength ranging from 5000-10,000 psi (ASTM D638) and a flexural strength of 5,000 to 15,000 (ASTM D-790). Such material has a glass transition temperature of 178° F. (ASTM D-3418).

Various polymerizable resins have been described that are suitable for the manufacture of microstructured films. In typical embodiments, the polymerizable resin comprises at least one (meth)acrylate monomer or oligomer comprising at least two (meth)acrylate groups (e.g. Photomer 6210) and a (e.g. multi(meth)acrylate) crosslinker (e.g. HDDA).

The materials for retroreflective sheeting and brightness enhancing films have been chosen based on the optical properties. Thus, the peak structures and adjacent valleys typically comprise a material having a refractive index of at least 1.50, 1.55, 1.60 or greater. Further, the transmission of visible light is typically greater than 85 or 90%. However, optical properties may not be of concern for many embodiments of the presently described films, methods, and articles. Thus, various other materials may be used having a lower refractive index including colored, light transmissive, and opaque. In some embodiments, the microstructured film or sheet may further comprise a printed graphic.

In alternative embodiments, the materials of the microstructures and (e.g. planar) base member may be chosen to provide specific optical properties in addition to the improved microorganism removal and/or reduced touch transfer described herein.

For example, in one embodiment, the (e.g. planar) base member may comprise a multilayer optical film comprising at least a plurality of alternating first and second optical layers collectively reflecting at least one of 0°, 30°, 45°, 60°, or 75° incident light angle at least 30 percent of incident ultraviolet light over at least a 30-nanometer wavelength reflection bandwidth in a wavelength range from at least 100 nanometers to 280 nanometers. Such multilayer optical films are described in WO2020/070589; incorporated herein by reference and are useful as a UV-C shield, UV-C light collimator and UV-C light concentrator. In some embodiments, the incident visible light transmission through at least the plurality of alternating first and second optical layers is greater than 30 percent over at least a 30-nanometer wavelength reflection bandwidth in a wavelength range from at least 400 nanometers to 750 nanometers. The first optical layer may comprise at least one polyethylene copolymer. The second optical layer may comprise at least one of a copolymer comprising tetrafluoroethylene, hexafluoropropylene, and vinylidene fluoride, a copolymer comprising tetrafluoro-ethylene and hexafluoropropylene, or perfluoroalkoxy alkane. The first optical layer may comprise titania, zirconia, zirconium oxynitride, hafnia, or alumina. The second optical layer may comprise at least one of silica, aluminum fluoride, or magnesium fluoride. In some embodiments, the microstructures together with the multilayer optical film provide a visible light transparent UV-C (e.g. reflective) protection layer or in other words a UV-C shield. UVC light can be used to disinfect surfaces, however these wavelengths can damage any organic material and causing unwanted discoloration. By combining the microstructured surfaces described herein with a UV-C shield, the surface can be cleaned with both UVC light and conventional cleaning method (e.g. wiping, scrubbing, and/or applying an antimicrobial solution) to disinfect the microstructured surface.

As shown in FIG. 3, a continuous land layer 360 can be present between the bottom of the channels or valleys and the top surface 331 of (e.g. planar) base member 310. In some embodiments, such as when the microstructured surface is prepared from casting and curing a polymerizable resin composition, the thickness of the land layer is typically at least 0.5, 1, 2, 3, 4, or 5 microns ranging up to 50 microns. In some embodiments, the thickness of the land layer is no greater than 45, 40, 35, 30, 25, 20, 15, or 10 microns.

In some embodiments, the microstructured surface (e.g. at least peak structures thereof) comprise an organic polymeric material with a glass transition temperature (as measured with Differential Scanning calorimetry) of at least 25° C. In some embodiments, the organic polymeric material has a glass transition temperature of at least 30, 35, 40, 45, 50, 55 or 60° C. In some embodiments, the organic polymeric material has a glass transition temperature no greater than 100, 95, 90, 85, 80, or 75° C. In other embodiments, the microstructured surface (e.g. at least peak structure thereof) comprises an organic polymeric material with a glass transition temperature as measured with Differential Scanning calorimetry) of less than 25° C. or less than 10° C. In at least some embodiments, the microstructures may be an elastomer. An elastomer may be understood as a polymer with the property of viscoelasticity (or elasticity) generally having suitably low Young's modulus and high yield strain as compared with other materials. The term is often used interchangeably with the term rubber, although the latter is preferred when referring to crosslinked polymers.

The organic polymeric material may also be filled with suitable organic or inorganic fillers and for certain applications the fillers are radioopaque.

In one embodiment, the microstructures or microstructured surface may be made of a curable, thermoset material. Unlike thermoplastic materials wherein melting and solidifying is thermally reversible; thermoset plastics cure after heating and therefore although initially thermoplastic, either cannot be remelted after curing or the melt temperature is significantly higher after being cured.

In some embodiments, the thermoset material comprise a majority of silicone polymer by weight. In at least some embodiments, the silicone polymer will be polydialkoxysiloxane such as poly(dimethylsiloxane) (PDMS), such that the microstructures are made of a material that is a majority PDMS by weight. More specifically, the microstructures may be all or substantially all PDMS. For example, the microstructures may each be over 95 wt. % PDMS. In certain embodiments the PDMS is a cured thermoset composition formed by the hydrosilylation of silicone hydride (Si—H) functional PDMS with unsaturated functional PDMS such as vinyl functional PDMS. The Si—H and unsaturated groups may be terminal, pendant, or both. In other embodiments the PDMS can be moisture curable such as alkoxysilane terminated PDMS.

In some embodiments, other silicone polymers besides PDMS may be useful, for example, silicones in which some of the silicon atoms have other groups that may be aryl, for example phenyl, alkyl, for example ethyl, propyl, butyl or octyl, fluororalkyl, for example 3,3,3-trifluoropropyl, or arylalkyl, for example 2-phenylpropyl. The silicone polymers may also contain reactive groups, such as vinyl, silicon-hydride (Si—H), silanol (Si—OH), acrylate, methacrylate, epoxy, isocyanate, anhydride, mercapto and chloroalkyl. These silicones may be thermoplastic or they may be cured, for example, by condensation cure, addition cure of vinyl and Si—H groups, or by free-radical cure of pendant acrylate groups. They may also be cross-linked with the use of peroxides. Such curing may be accomplished with the addition of heat or actinic radiation.

Other useful polymers for the microstructures or microstructured surface may be thermoplastic or thermosetting polymers including polyurethanes, polyolefins including metallocene polyolefins, low density polyethylene, polypropylene, ethylene methacrylate copolymer; polyesters such as elastomeric polyesters (e.g., Hytrel), biodegradable polyesters such as polylactic, polylactic/glycolic acids, copolymers of succinic acid and diols, and the like, fluoropolymers including fluoroelastomers, acrylic (polyacrylates and polymethacrylates).

Polyurethanes may be linear and thermoplastic or thermoset. Polyurethanes may be formed from aromatic or aliphatic isocyanates combined with polyester or polyether polyols or a combination thereof.

Representative fluoropolymers include for example polyvinyl fluoride (PVF), polyvinylidene fluoride (PVDF), ethylene tetrafluoroethylene (ETFE), copolymers of tetrafluorethylene, hexafluoropropylene, and vinylidene fluoride (THV), polyethylene copolymers comprising subunits derived from tetrafluoroethylene (TFE), hexafluoropropylene (HFP), and vinylidene fluoride (VDF), and fluorinated ethylene propylene (FEP) copolymers. Fluoropolymers are commercially available from Dyneon LLC, Oakdale, MN; Daikin Industries, Ltd., Osaka, Japan; Asahi Glass Co., Ltd., Tokyo, Japan, and E.I. duPont deNemours and Co., Willmington, DE.

In some embodiment, the microstructured film or microstructured surface layer comprises a multilayer film comprising a fluoropolymer as described in previously cited WO2020/070589. Such multilayer films are useful as a UV-C shield, UV-C light collimator and UV-C light concentrator. In other embodiments, the microstructured film or microstructured surface layer comprises a monolithic or multilayer fluoropolymer (e.g. protective) layer that is not useful as a UV-C shield, UV-C light collimator and UV-C light concentrator.

In some embodiments, the microstructures or microstructured surface may be modified such that the microstructured surface is more hydrophilic. The microstructured surface generally may be modified such that a flat organic polymer film surface of the same material as the modified microstructured surface exhibits an advancing or receding contact angle of 45 degrees or less with deionized water. In the absence of such modifications, a flat organic polymer film surface of the same material as the microstructured surface typically exhibits an advancing or receding contact angle of greater than 45, 50, 55, or 60 degrees with deionized water.

Any suitable known method may be utilized to achieve a hydrophilic microstructured surface. Surface treatments may be employed such as plasma treatment, vacuum deposition, polymerization of hydrophilic monomers, grafting hydrophilic moieties onto the film surface, corona or flame treatment, etc. For certain embodiments, the hydrophilic surface treatment comprises a zwitterionic silane, and for certain embodiments, the hydrophilic surface treatment comprises a non-zwitterionic silane. Non-zwitterionic silanes include a non-zwitterionic anionic silane, for instance.

In other embodiments, the hydrophilic surface treatment further comprises at least one silicate, for example and without limitation, comprising lithium silicate, sodium silicate, potassium silicate, silica, tetraethylorthosilicate, poly (diethoxysiloxane), or a combination thereof. One or more silicates may be mixed into a solution containing the hydrophilic silane compounds, for application to the microstructured surface.

Optionally, a surfactant or other suitable agent may be added to the organic polymeric composition that is utilized to form the microstructured surface. For example, a hydrophilic acrylate and initiator could be added to a polymerizable composition and polymerized by heat or actinic radiation. Alternatively, the microstructured surface can be formed from a hydrophilic polymers including homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

Such hydrophilic surfaces have been described for use for fluid control films, as described in US20170045284; incorporated herein by reference.

Optional Additives & Coatings

The organic polymeric material of the microstructured surface may contain other additives such as antimicrobial agents (including antiseptics and antibiotics), dyes, mold release agents, antioxidants, plasticizers, thermal and light stabilizers including ultraviolet (UV) absorbers, fillers, pigments and the like.

Suitable antimicrobials can be incorporated into or deposited onto the polymers. Suitable preferred antimicrobials include those described in US Publication Nos. 2005/0089539 and 2006/0051384 to Scholz et al. and US Publication Nos. 2006/0052452 and 2006/0051385 to Scholz. The microstructures of the present invention also may be coated with antimicrobial coatings such as those disclosed in International Application No. PCT/US2011/37966 to Ali et al.

In typical embodiments, the microstuctured surface is not prepared from a (e.g. fluorinated (e.g. fluoropolymer) or PDMS) low surface energy material and does not comprise a low surface energy coating, a material or coating that on a flat surface has a receding contact angle with water of greater than 90, 95, 100, 105, or 110 degrees. In this embodiment, the low surface energy of the material is not contributing to the cleanability. Rather, the improvement in cleaning is attributed to the features of the microstructured surface. In this embodiment, the microstructured surface is prepared from a material such that a flat surface of the material typically has a receding contact angle with water of less than 90, 85, or 80 degrees.

In other embodiments, a low surface energy coating may be applied to the microstructures. Exemplary low surface energy coating materials that may be used include materials such as hexafluoropropylene oxide (HFPO), or organosilanes such as, alkylsilane, alkoxysilane, acrylsilanes, polyhedral oligomeric silsequioxane (POSS) and fluorine-containing organosilanes, just to name a few. Examples of particular coatings known in the art may be found, e.g., in US Publication No. 2008/0090010, and commonly owned publication, US Publication No. 2007/0298216. For embodiments, that include a coating is applied to the microstructures, it may be applied by any appropriate coating method, such as sputtering, vapor deposition, spin coating, dip coating, roll-to-roll coating, or any other number of suitable methods.

It also is possible and often preferable in order to maintain the fidelity of the microstructures to include a surface energy modifying compound in the composition used to form the microstructures. In some embodiments, the bloom additive may retard or prevent crystallization of the base composition. Suitable bloom additives may be found, for example, in International Publication No. WO2009/152345 to Scholz et al. and U.S. Pat. No. 7,879,746 to Klun et al.

Cleaning the Microstructured Surface

In one embodiment, a method of providing an article having a surface with increased microorganism (e.g. bacteria) removal when cleaned is described. The microstructured surface may be mechanically cleaned, for example by wiping the microstructured surface with a woven or non-woven material or scrubbing the microstructured surface with a brush. In some embodiments, the fibers of the woven or non-woven material have a fiber diameter less than the maximum width of the valleys. In some embodiments, the bristles of the brush have a diameter less than the maximum width of the valleys. Alternatively, the microstructured surface may be cleaned by applying an antimicrobial solution to the microstructured surface. Further, the microstructured surface can also be cleaned by (e.g. ultraviolet) radiation-based disinfection. Combinations of such cleaning technique can be used.

The antimicrobial solution may contain an antiseptic component. Various antiseptic components are known including for example biguanides and bisbiguanides such as chlorhexidine and its various salts including but not limited to the digluconate, diacetate, dimethosulfate, and dilactate salts, as well as combinations thereof, polymeric quaternary ammonium compounds such as polyhexamethylenebiguanide; silver and various silver complexes; small molecule quaternary ammonium compounds such as benzalkoium chloride and alkyl substituted derivatives; di-long chain alkyl (C8-C18) quaternary ammonium compounds; cetylpyridinium halides and their derivatives; benzethonium chloride and its alkyl substituted derivatives; octenidine and compatible combinations thereof. In other embodiments, the antimicrobial component may be a cationic antimicrobial or oxidizing agent such as hydrogen peroxide, peracetic acid, bleach.

In some embodiments, the antimicrobial component is a small molecule quaternary ammonium compounds. Examples of preferred quaternary ammonium antiseptics include benzalkonium halides having an alkyl chain length of C8-C18, more preferably C12-C16, and most preferably a mixture of chain lengths. For example, a typical benzalkonium chloride sample may be comprise of 40% C12 alkyl chains, 50% C14 alkyl chains, and 10% C16 alkyl chains. These are commercially available from numerous sources including Lonza (Barquat MB-50); Benzalkonium halides substituted with alkyl groups on the phenyl ring. A commercially avaible example is Barquat 4250 available from Lonza; dimethyldialkylammonium halides where the alkyl groups have chain lengths of C8-C18. A mixture of chain lengths such as mixture of dioctyl, dilauryl, and dioctadecyl may be particularly useful. Exemplary compounds are commercially available from Lonza as Bardac 2050, 205M and 2250 from Lonza; Cetylpyridinium halides such as cetylpyridinium chloride available from Merrell labs as Cepacol Chloride; Benzethonium halides and alkyl substituted benzethonium halides such as Hyamine 1622 and Hyamine 10.times. available from Rohm and Haas; octenidine and the like.

In one embodiment, the (e.g. disinfectant) antimicrobial solution kills enveloped viruses (e.g. herpes viruses, influenza, hepatitis B), non-enveloped viruses (e.g. papillomaviruses, norovirus, rhinovirus, rotovirus), DNA viruses (e.g. poxviruses), RNA viruses (e.g. coronaviruses, norovirus), retroviruses (e.g. HIV-1), MRSA, VRE, KPC, *Acinetobacter* and other pathogens in 3 minutes. The aqueous disinfectant solution may contain a 1:256 dilution of a disinfectant concentrate containing benzyl-C12-16-alkyldimethyl ammonium chlorides (8.9 wt. %) octyldecyldimethylammonium chloride (6.67 wt. %), dioctyl dimethyl ammonium chloride (2.67 wt. %), surfactant (5-10%), ethtyl alcohol (1-3 wt-%) and chealating agent (7-10 wt. %) adjusted to a pH of 1-3.

Articles

Since an object of the invention is to provide an article having a surface with increased microorganism (e.g. bacteria) removal when cleaned, the article is typically not a (e.g. sterile) medical article such as nasal gastric tubes, wound contact layers, blood stream catheters, stents, pacemaker shells, heart valves, orthopedic implants such as hips, knees, shoulders, etc., periodontal implants, dentures, dental crowns, contact lenses, intraocular lenses, soft tissue implants (breast implants, penile implants, facial and hand implants, etc.), surgical tools, sutures including degradable sutures, cochlear implants, tympanoplasty tubes, shunts including shunts for hydrocephalus, post-surgical drain tubes and drain devices, urinary catheters, endotraecheal tubes, heart valves, wound dressings, other implantable devices, and other indwelling devices. In some embodiments, the article is also not an orthodontic appliance or orthodontic brackets.

The medical articles just described may be characterized as single use articles, i.e. the article is used once and then disgarded. The above articles may also be characterized as single person (e.g. patient) articles. Thus, such articles are typically not cleaned (rather than sterilized) and reused with other patients.

In contrast, the articles and surfaces described herein include those where the microstructured surface is exposed to the surrounding (e.g. indoor or outdoor) environment and is subject to being touched or otherwise coming in contact with multiple people and/or animals, as well as other contaminants (e.g. dirt).

In some embodiments, the microstructured surface of the article, comes in direct (e.g. skin) contact with (e.g. multiple) people and/or animals during normal use of the article. In other embodiments, the microstructured surface may come is close proximity to (e.g. multiple) people/or animals in the absence of direct (e.g. skin) contact. However, since the microstructured surface comes in close proximity such article surfaces can easily be contaminated with microorganisms (e.g. bacteria) and are therefore cleaned to prevent the spreading of microorganisms to others.

Representative articles that would be cleaned during normal use and/or are amenable for use with a (e.g. removable) protective film or integrating the microstructured surface into the surface of the article include various interior or exterior surfaces or components of a) surface or component of a vehicle (e.g. automobile, bus, train, airplane, boat, ambulances, ships) as well as motorized and non-motorized shared vehicles such as car, scooters and bicycles including head rests, dashboards, door panels, window shutter (e.g. of an airplane), gear shifter, seat belt buckle, instrument and button panels, (e.g. plastic) seat back trays and arm rests, railings, cabin siding, luggage compartment, steering wheels, handlebars;

b) housing and cases of an electronic device (e.g. phone, laptop, tablet, or computer) as well as keyboards and mouses (including mouse pads) and touchscreens, projectors, printers, remote control devices, locks, chargers (including cords & docking stations), fobs, video and arcade games, slot machines, automatic teller machines; (e.g. handheld) scanners, key cards, and point of sale electronic devices such as credit card readers, keypads, stylists, cash registers, barcode scanner, payment kiosks;

c) packaging film (e.g. for food or medical products) and polymeric shipping products including labels, mailers, boxes, totes, and bubble-wrap;

d) food preparation and dining surfaces, containers (including plates, bowls, cubs, water bottles) and films including galleys, carts, cutting boards, lunch boxes, thermos, appliances (e.g. microwave, stove, ovens, blenders, toasters, coffee makers, refrigerator including shelves and drawers), beverage dispensers, grills, utensils (e.g. especially handles thereof), menus, condiments bottles, salt & pepper shakers, table tops and chairs (especially for public dining in restaurants, dorms, nursing homes, and prisons), garbage and recyclable containers;

e) (e.g. non-sterile) surfaces of a medical, dental, or laboratory facility or medical, dental, or laboratory equipment (e.g. defibulators, ventilators and CPAPs (especially masks thereof), face shields, crutches, wheelchairs, bed rails, breast pump devices, IV pole and bags, curing lights (e.g. for dental materials), exam tables, surfaces of massage devices;

f) surfaces or components of furniture (e.g. desks, tables, chairs, seats and armrests);

g) handles (e.g. knob, pull, levers including locks) of articles including furniture, doors of buildings, turn styles, appliances, vehicles, shopping carts and baskets, exercise equipment, (e.g. cooking) utensils, tools, handlebars, levers of window blinds, microphone, luggage, etc.;

h) building surfaces (including escalators and elevators) such as doors, railings, walls, flooring, countertops, desktops, cabinets, lockers, windows (e.g. sills), door bells, electrical modulators (e.g. light switches, dimmers, and outlets including plates thereof);

i) surfaces and components of lavatories (e.g. sink, toilet surfaces (e.g. levers), drain caps, shower walls, bathtub, vanity, countertop);

j) surface or liner of a swimming pool or roofing material;

k) personal items including toothbrushes, eye glass frames, shoes, clothing, helmets, head bands, hard hats, headphones, footwear (e.g. shoes and boots), handbags, back packs;

l) articles for children including toys, pacifiers, bottles, teethers, car seats, cribs, changing tables, and playground equipment;

m) cleaning equipment (e.g. vacuum, mop, scrub brush, dusters, toilet bowl cleaners, plunger, brooms)

n) protective athletic and sports equipment (e.g. helmets, guards, balls for various sports including football, basketball, soccer, and golf);

o) exercise, spa, and salon (e.g. hair styling and nail) equipment (e.g. weights, yoga mats)

p) office and schools supplies and equipment including writing instruments (e.g. pencils, pens, markers), writable surfaces (including films and white boards), erasers, file folders, book and notebook covers, scanner and copy machines;

q) manufacturing surfaces and equipment including conveyor belts, control panels for machine operation (e.g. of an assembly line).

The microstructured surface is particularly advantageous for congregate living facilities such as military housing, prisons, dorms, nursing homes, apartments, hotels; public places such as offices, schools, arenas, casinos, bowling alleys, golf courses, arcades, gyms, salons, spas, shopping centers, airports, train stations; and public transportation.

In some embodiments, the film for application to vehicle or building surfaces etc. may be characterized as an architectural, decorative, or graphic film. Graphic films typically include patterns, images, or other visual indicia. The graphic film may be a printed film, or the graphic may be created by means other than printing. For example, the graphic film may be perforated reflective film with a patterned arrangement of perforations.

The graphic film be prepared by the various methods described herein. In some embodiments, the graphic film is prepared by embossing the surface of a (e.g. commercially available) graphic film. Exemplary (e.g. architectural) graphic films (lacking the microstructured surface described herein) are available under the trade designation "3M™ DI-NOC™ Architectural Finishes" by 3M Company, St. Paul, MN Such films comprise an organic polymer layer such as previously described. In some embodiments, the organic polymer layer comprises polyvinyl chloride, polyurethane, or polyester. The organic polymer layer further comprises a design pattern having the appearance for example of wood, leather, metal, concrete, ceramic, as well as various (e.g. abstract) designs. The surface finish is typically matte or glossy. In some instances, the film may have a (e.g. visible) macrostructure, as previously described, in combination with the microstructures described herein.

Referring again to FIGS. 2-4 and 6, the presently described articles comprise an (e.g. engineered) microstructured surface (200, 300, 400, 600) disposed on a base member (210, 310, 410, 610). When the article is a film (e.g. sheeting), the base member is planar (e.g. parallel to reference plane 126). The thickness of the base member is typically at least 10, 15, 20, or 25 microns (1 mil) and typically no greater than 500 microns (20 mil) thickness. In some embodiments, the thickness of the base member is no greater than 400, 300, 200, or 100 microns. The width of the (e.g. film) base member may be is at least 30 inches (122 cm) and preferably at least 48 inches (76 cm). The (e.g. film) base member may be continuous in its length for up to about 50 yards (45.5 m) to 100 yards (91 m) such that the microstructured film is provided in a conveniently handled roll-good. Alternatively, however, the (e.g. film) base member may be individual sheets or strips (e.g. tape) rather than as a roll-good.

Thermoformable microstructured base members typically having a thickness of at least 50, 100, 200, 300, 400, or 500 microns. Thermoformable microstructured base members may have thickness up to 3, 4, or 5 mm or greater.

When the article is a three-dimensional object, the base member may be planar such as in the case of a seat back tray. In other embodiments, the three-dimensional base member may be non-planar, having a curved surface or a surface with a complex topography, such as in the case of a toy.

The base member can be formed from various materials such as metal, alloy, organic polymeric material, or a combination comprising at least one of the foregoing. Specifically, glass, ceramic, metal or polymeric materials may be appropriate, as well as other suitable alternatives and combinations thereof such as ceramic coated polymers, ceramic coated metals, polymer coated metals, metal coated polymers and the like. The base member can, in some implementations, include discrete pores and/or pores in communication. The thickness of the base member can vary depending on the use.

The organic polymeric materials of the base member can be the same organic polymeric materials (e.g. thermoplastic, thermoset) previously described for the microstructured surface. In addition, fiber- and/or particle-reinforced polymers can also be used.

Non-limiting examples of suitable non-biodegradable polymers for planar or non-planar base members include polyolefins (e.g. polyisobutylene copolymers), styrenic block copolymers (e.g. styrene-isobutylene-styrene block copolymers, such as styrene-isobutylene-styrene tert-block copolymers (SIBS); polyvinylpyrrolidone including crosslinked polyvinylpyrrolidone; polyvinyl alcohols; copolymers of vinyl monomers such as EVA and polyvinyl chloride (PVC); polyvinyl ethers; polyvinyl aromatics; polyethylene oxides; polyesters such as polyethylene terephthalate; polyamides; polyacrylamides; polyethers such as polyether sulfone; polyolefins such as polypropylene, polyethylene, highly crosslinked polyethylene, and high or ultra high molecular weight polyethylene; polyurethanes; polycarbonates; silicones; siloxane polymers; natural based polymers such as optionally modified polysaccharides and proteins including, but not limited to, cellulosic polymers and cellulose esters such as cellulose acetate; and combinations comprising at least one of the foregoing polymers. Combinations may include miscible and immiscible blends as well as laminates.

The base (e.g. planar or non-planar) member may be comprised of a biodegradable material. Non-limiting examples of suitable biodegradable polymers include polycarboxylic acid; polyanhydrides such as maleic anhydride polymers; polyorthoesters; poly-amino acids; polyethylene oxide; polyphosphazenes; polylactic acid, polyglycolic acid, and copolymers and mixtures thereof such as poly(L-lactic acid) (PLLA), poly(D,L,-lactide), poly(lactic acid-co-glycolic acid), and 50/50 weight ratio (D,L-lactide-co-glycolide); polydioxanone; polypropylene fumarate; polydepsipeptides; polycaprolactone and co-polymers and mixtures thereof such as poly(D,L-lactide-co-caprolactone) and polycaprolactone co-blutylacrylate; polyhydroxybutyrate valerate and mixtures thereof; polycarbonates such as tyrosine-derived polycarbonates and arylates, polyiminocarbonates, and polydimethyltrimethylcarbonates; cyanoacrylate; calcium phosphates; polyglycosaminoglycans; macromolecules such as polysaccharides (including hyaluronic acid, cellulose, and hydroxypropylmethyl cellulose; gelatin; starches; dextrans; and alginates and derivatives thereof, proteins and polypeptides; and mixtures and copolymers of any of the foregoing. The biodegradable polymer can also be a surface erodible polymer such as polyhydroxybutyrate and its copolymers, polycaprolactone, polyanhydrides (both crystalline and amorphous), and maleic anhydride.

In some embodiments, the microstructured surface may be integrated with at least a portion of the article or component thereof. In other embodiments, the (e.g. engineered) microstructured surface may be provided as a film or tape and affixed to the base member. In such embodiments, the microstructures may be made of the same or different material base member. Fixation may be provided using mechanical coupling, an adhesive, a thermal process such as heat welding, ultrasonic welding, RF welding and the like, or a combination thereof.

In some embodiments, the (e.g. planar) base member as well as microstructured film is flexible. In some embodiments, the (e.g. graphic) film is sufficiently flexible and conformable such that the film can be applied (e.g. bonded with an adhesive) to a complex curved (e.g. three-dimensional) surface. In some embodiments, the (e.g. planar) base member as well as microstructured film has an elongation of at least 50, 75, 100, 125, 150, or 200%. In some embodiments, the (e.g. planar) base member as well as microstructured film has an elongation of no greater than 500, 450, 400, 350, 300, or 250%. In some embodiments, the (e.g. planar) base member as well as microstructured film has a tensile modulus of no greater than 1000, 750, 500 MPa. The tensile modulus is typically at least 100, 150, or 200 MPa. In some embodiments, the (e.g. planar) base member as well as microstructured film has a tensile strength of no greater than 50, 40, or 30 MPa. The tensile strength is typically at least 10, 15, 20, or 25 MPa. Tensile testing is determined according to ASTM D882-10 with an initial grip distance of 1 inch and a speed of 1 inch/min or 100% strain/min.

In one embodiment, a film (e.g. tape) comprising a microstructured surface disposed on a planar base layer as described herein is provided. The film (e.g. tape) comprises a pressure sensitive adhesive (e.g. 350 of FIG. 3) on the opposing surface of the film. A microstuctured surface can be provided on a surface or article by providing the adhesive-coated film and bonding the film to the surface or article with the (e.g. pressure sensitive) adhesive.

The base (e.g. planar or non-planar) member may be subjected to customary surface treatments for better adhesion with the adjacent (e.g. pressure sensitive) adhesive layer. Additionally, the base member may be subjected to customary surface treatments for better adhesion of the (e.g. cast and cured) microstructured layer to an underlying base member. Surface treatments include for example exposure to ozone, exposure to flame, exposure to a high-voltage electric shock, treatment with ionizing radiation, and other chemical or physical oxidation treatments. Chemical surface treatments include primers. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. In one embodiment, the primer is an organic solvent based primer comprising acrylate polymer, chlorinated polyolefin, and epoxy resin as available from 3M Company as "3M™ Primer 94". The microstructured film may comprise various (e.g. pressure sensitive) adhesives such as natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3\times10^6$ dynes/cm at a frequency of 1 Hz.

In some embodiments, the pressure sensitive adhesive may be natural-rubber-based, meaning that a natural rubber elastomer or elastomers make up at least about 20 wt. % of the elastomeric components of the adhesive (not including any filler, tackifying resin, etc.). In further embodiments, the natural rubber elastomer makes up at least about 50 wt. %, or at least about 80 wt. %, of the elastomeric components of the adhesive. In some embodiments, the natural rubber elastomer may be blended with one or more block copolymer thermoplastic elastomers (e.g., of the general type available under the trade designation KRATON from Kraton Polymers, Houston, TX). In specific embodiments, the natural rubber elastomer may be blended with a styrene-isoprene radial block copolymer), in combination with natural rubber elastomer, along with at least one tackifying resin. Adhesive compositions of this type are disclosed in further detail in US Patent Application Publication 2003/0215628 to Ma et al.

The (e.g. pressure sensitive) adhesives may be organic solvent-based, a water-based emulsion, hot melt (e.g. such as described in U.S. Pat. No. 6,294,249), as well as an actinic radiation (e.g. e-beam, ultraviolet) curable (e.g. pressure sensitive) adhesive.

In some embodiments, the adhesive layer is a removable. A removable adhesive cleanly removes from a substrate or surface (e.g. glass or polypropylene panels) to which it is temporarily bonded after aging at 50, 60, 70, 80, 90, 100 or 120° C. (248° F.) for 4 hours and then equilibrated to 25° C. at a removal rate of about 20 inches/minute.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by 3M Company, St. Paul, Minnesota, USA.

The adhesive layer may also be a structured adhesive layer or an adhesive layer having at least one micro structured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The acrylic pressure sensitive adhesives may be produced by free-radical polymerization technique such as solution polymerization, bulk polymerization, or emulsion polymerization. The acrylic polymer may be of any type such as a random copolymer, a block copolymer, or a graft polymer. The polymerization may employ any of polymerization initiators and chain-transfer agents generally used.

The acrylic pressure sensitive adhesive comprises polymerized units of one or more (meth)acrylate ester monomers derived from a (e.g. non-tertiary) alcohol containing 1 to 14 carbon atoms and preferably an average of 4 to 12 carbon atoms. Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The acrylic pressure sensitive adhesive comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In typical embodiments, the acrylic pressure sensitive adhesive comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, isodecyl (meth)acrylate, lauryl (meth)acrylate, as well as esters of (meth)acrylic acid with an alcohol derived from a renewable source, such as 2-octyl (meth)acrylate.

The acrylic pressure sensitive adhesive typically comprises at least 50, 55, 60, 65, 70, 75, 80, 85, 90 wt. % or greater of polymerized units of monofunctional alkyl (meth) acrylate monomer having a Tg of less than 0° C., based on the total weight of the polymerized units (i.e. excluding inorganic filler or other additives).

The acrylic pressure sensitive adhesive may further comprise at least one high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C. High Tg monofunctional alkyl (meth) acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

The acrylic pressure sensitive adhesive may further comprise polymerized units of polar monomers. Representative polar monomers include for example acid-functional monomers (e.g. acrylic acid, methacrylic acid), hydroxyl functional (meth)acrylate monomers, nitrogen-containing monomers (e.g. acrylamides), and combinations thereof. In some embodiments, the acrylic pressure sensitive adhesive comprises at least 0.5, 1, 2 or 3 wt-% and typically no greater than 10 wt-% of polymerized units of polar monomers, such as acrylamide and/or acid-functional monomers such as (meth)acrylic acid.

The (e.g. pressure sensitive) adhesive may further include one or more suitable additives according to necessity. The additives are exemplified by crosslinking agents (e.g. multifunctional (meth)acrylate crosslinkers (e.g. HDDA, TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The (e.g. pressure sensitive) adhesive layer may be disposed upon the film by various customary coating methods (e.g. gravure) roller coating, flow coating, dip coating, spin coating, spray coating, knife coating, (e.g. rotary or slit) die coating, (e.g. hot melt) extrusion coating, and printing. The adhesive may be applied directly to the substrate described herein or transfer coated by use of release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

The release liner typically comprises paper or film, which has been coated or modified with compounds of low surface energy such as organosilicone compounds, fluoropolymers, polyurethanes and polyolefins. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer. A microstructured release liner may also be used to impart the microstructured surface and protect the microstructured surface from damage prior and during application of a microstructured layer to a target surface or article.

The adhesive layer can be adhered to various surfaces as previously described. The surface may comprise wood, metal, as well as various organic polymeric materials. The film is the absence of adhesive may also be suitable for use as a textile (e.g. synthetic leather) for furniture and clothing.

The term "microorganism" is generally used to refer to any prokaryotic or eukaryotic microscopic organism, including without limitation, one or more of bacteria (e.g., motile or nonmotile, vegetative or dormant, Gram positive or Gram negative, planktonic or living in a biofilm), bacterial spores or endospores, algae, fungi (e.g., yeast, filamentous fungi, fungal spores), mycoplasmas, and protozoa, as well as combinations thereof. In some cases, the microorganisms of particular interest are those that are pathogenic, and the term "pathogen" is used to refer to any pathogenic microorganism. Examples of pathogens can include, but are not limited to, both Gram positive and Gram negative bacteria, fungi, and viruses including members of the family Enterobacteriaceae, or members of the family Micrococaceae, or the genera *Staphylococcus* spp., *Streptococcus*, spp., *Pseudomonas* spp., *Acinetobacter* spp., *Enterococcus* spp., *Salmonella* spp., *Legionella* spp., *Shigella* spp., *Yersinia* spp., *Enterobacter* spp., *Escherichia* spp., *Bacillus* spp., *Listeria* spp., *Campylobacter* spp., *Acinetobacter* spp., *Vibrio* spp., *Clostridium* spp., *Klebsiella* spp., *Proteus* spp. *Aspergillus* spp., *Candida* spp., and *Corynebacterium* spp. Particular examples of pathogens can include, but are not limited to, *Escherichia coli* including enterohemorrhagic *E. coli* e.g., serotype O157:H7, O129:H11; *Pseudomonas aeruginosa; Bacillus cereus; Bacillus anthracia; Salmonella enteritidis; Salmonella enterica* serotype *Typhimurium; Listeria monocytogenes; Clostridium botulinum; Clostridium perfringens; Staphylococcus aureus*; methicillin-resistant *Staphylococcus aureus*; carbapenem-resistant Enterobacteriaceae, *Campylobacter jejuni; Yersinia enterocolitica; Vibrio vulnificus; Clostridium difficile*; vancomycin-resistant *Enterococcus; Klebsiella pnuemoniae; Proteus mirabilus* and *Enterobacter* [*Cronobacter*] *sakazakii.*

Advantages of this invention are further illustrated by the following examples, but the particular materials and amounts thereof recited in these examples, as well as other conditions and details, should not be construed to unduly limit this invention. Unless otherwise indicated, all parts and percentages are by weight.

EXAMPLES

Materials

| Abbreviation | Description and Source |
| --- | --- |
| TWEEN 20 | Polyethylene glycol sorbitan monolaurate non-ionic detergent (Sigma-Aldrich Company, St. Louis, MO) |
| PBS | Phosphate buffered saline (Thermo Fischer Scientific, Waltham, MA) |
| D/E neutralizing broth | Dey/Engley neutralizing broth (Becton, Dickinson and Company, Franklin Lakes, NJ) |
| MELINEX 618 | MELINEX 618 PET film (DuPont Teijin Films, Chester, VA) |
| SONTARA 8000 | Polyethylene terephthalate (PET) nonwoven sheet (12 micron fiber diameter, 40 gsm) (Jacob Holm Group, Basel, Switzerland) |
| DURAN PET-G | Polyethylene terephthalate glycol disc (clear, transparent) (Scheu Dental GmbH, Iserlohn, Germany) |
| VIVAK PET-G | Polyethylene terephthalate glycol sheet (Plaskolite Incorporated, Columbus, OH) |
| PHOTOMER 6210 | Aliphatic urethane diacrylate oligomer (IGM Resins, Charlotte, NC) |
| SR238 | 1,6-Hexanediol diacrylate, obtained from Sartomer, Exton, PA |
| LUCIRIN TPO | Photoinitiator (BASF Corporation, Florham Park, NJ) |
| DAROCUR 1173 | Photoinitiator (BASF Corporation) |
| IRGACURE-651 | Photoinitiator (BASF Corporation) |

Methods

Scanning Electron Microscopy—Sample Preparation and Imaging

Sample discs were fixed for scanning electron microscopy (SEM) by carefully submerging each disc in a 5% glutaraldehyde solution for 30 minutes. This was followed by six sequential disc submersion wash steps (submersion time of 30 minutes for each wash step) performed in the following order: 1) a PBS solution, 2) an aqueous 25% isopropyl alcohol solution, 3) an aqueous 50% isopropyl alcohol solution, 4) an aqueous 75% isopropyl alcohol solution, 5-6) two final submersion washes in a 100% isopropyl alcohol solution. Each disc was transferred to a 96-well plate using tweezers. The discs were allowed to dry for 48 hours. Discs were then individually affixed to a SEM stub using double sided tape with the microstructured surface of the disc facing outward from the stub. Conductive silver paint was dabbed on the edge of each sample and the whole stub assembly was sputter coated for 90 seconds using a Denton Vacuum Desk V Sputter Coater (Denton Vacuum, Moorestown, NJ) and a gold target. After sputter coating, the stub was moved to a JEOL JCM-500 NeoScope SEM instrument (JEOL USA Incorporated, Peabody, MA) for imaging.

Media Preparation

Tryptic Soy Broth (TSB, obtained from Becton, Dickinson and Company, Franklin Lakes, NJ) was dissolved in deionized water and filter-sterilized according to the manufacturer's instructions.

Brain Heart Infusion (BHI, obtained from Becton, Dickinson and Company) was dissolved in deionized and filter-sterilized according to the manufacturer's instructions.

Bacterial Cultures

A streak plate of *Pseudomonas aeruginosa* (ATCC 15442) or *Staphylococcus aureus* (ATCC 6538) was prepared from a frozen stock on Tryptic Soy Agar. The plate was incubated overnight at 37° C. A single colony from the plate was transferred to 10 mL of sterile TSB. The culture was shaken overnight at 250 revolutions per minute and 37° C. Inoculation samples were prepared by diluting the culture (about $10^9$ colony forming units (cfu)/mL) 1:100 in TSB.

An overnight culture of *Streptococcus mutans* (ATCC 25175) was grown by using a sterile, serological pipette to scrape and transfer a small amount of a 25% glycerol freezer stock of the microorganism to a 15 mL conical tube. The tube contained 5 mL of BHI broth. The tube was maintained at 37° C. under static (non-shaking) conditions for 12-16 hours. Inoculation samples were prepared by diluting the culture (about $10^9$ colony forming units (cfu)/mL) 1:100 in TSB.

Procedure for Preparing Microstructured Films

A UV curable resin was prepared from PHOTOMER 6210 aliphatic urethane diacrylate oligomer (75 parts), SR238 1,6-hexanediol diacrylate (25 parts), and LUCIRIN TPO photoinitiator (0.5%). The components were blended in a high speed mixer, heated in an oven at about 70° C. for 24 hours) and then cooled to room temperature. Copper buttons (2 inch (5.08 cm) diameter) were used as templates for preparing linear prism films. A button and the compounded resin were both heated in an oven at about 70° C. for 15 minutes. Approximately six drops of the warmed resin were applied using a transfer pipette to the center of the warmed button. A section of MELINEX 618 PET support film [3 inch by 4 inch (7.62 cm by 10.16 cm), 5 mil thick] was placed over the applied resin followed by a glass plate. The primed surface of the PET film was oriented to contact the resin. The glass plate was held in place with hand pressure until the resin completely covered the surface of the button. The glass plate was carefully removed. If any air bubbles were introduced, a rubber hand roller was used to remove them.

The sample was cured with UV light by passing the sample 2 times through a UV processor (model QC 120233AN with two Hg vapor lamps, obtained from RPC Industries, Plainfield, IL) at a rate of 15.2 meters/minute (50 feet/minute) under a nitrogen atmosphere. The cured, microstructured film having an array pattern of FIG. 3 was removed from the copper template by gently pulling away at a 90° angle. A release liner backed adhesive layer (8 mil thick, obtained as 3M 8188 Optically Clear Adhesive from the 3M Corporation) was applied to the back surface (i.e. non-microstructured surface) of the microstructured film using a hand roller. The features of the linear prism microstructured films that were prepared are reported in Table 1.

TABLE 1

| Film | Peak Height (microns) | Maximum Valley Width (microns) | Apex Angle (degrees) | Valley Angle (degrees) | Side Wall Angle (degrees) | Apex (Radius of Curvature) |
| --- | --- | --- | --- | --- | --- | --- |
| Example 1 | 6.6 | 17 | 95 | 95 | 47.5 | sharp |
| Example 2 | 6.0 | 24 | 91 | 91 | 45.5 | sharp |
| Example 3 | 25.0 | 50 | 90 | 90 | 45 | sharp |

TABLE 1-continued

| Film | Peak Height (microns) | Maximum Valley Width (microns) | Apex Angle (degrees) | Valley Angle (degrees) | Side Wall Angle (degrees) | Apex (Radius of Curvature) |
|---|---|---|---|---|---|---|
| Example 4 | 125 | 250 | 90 | 90 | 45 | sharp |
| Example 5 | 24.2 | 50 | 90 | 90 | 45 | rounded (2 microns) |
| Example 6 | 125 | 250 | 90 | 90 | 45 | rounded (2 microns) |
| Example 7 | 24.2 | 50 | 90 | 90 | 45 | rounded (8.5 microns) |
| Example 8 | 121.5 | 250 | 90 | 90 | 45 | rounded (8.5 microns) |

Comparative Example A film was prepared according to the same procedure as described above with the exception that a copper button having a smooth surface for contacting the resin was used instead of a patterned microstructured surface. This resulted in the formation of a film having a smooth surface (i.e. a film without a patterned, microstructured surface).

Sample Disc Preparation

A 34 mm diameter hollow punch was used to cut out individual discs from the microstructured films. A single disc was placed in each well of a sterile 6-well microplate and oriented so that the microstructured surface of the disc faced the well opening and the release liner faced the well bottom. The plate was then sprayed with a mist of isopropyl alcohol to disinfect the samples and allowed to dry. Discs were also prepared from the Comparative Example A film.

Sample Disc Inoculation, Incubation and Washing Method

Inoculation samples (4 mL) of a bacterial culture (described above) were added to each well of the 6-well microplate containing a disc. The lid was placed on the 6-well microplate and the plate was wrapped in PARAFILM M laboratory film (obtained from the Bemis Company, Oshkosh, WI). The wrapped plate was inserted in a plastic bag containing a wet paper towel and the sealed bag was placed in an incubator at 37° C. After 7 hours, the plate was removed from the incubator and the liquid media was removed from each well using a pipette. Fresh, sterile TSB (4 mL) was added to each well and the plate lid was attached. The plate was re-wrapped in PARAFILM M laboratory film, sealed in a bag with a wet paper towel, and returned to the incubator. After 17 hours, the plate was removed from the incubator. The liquid media was removed from each well (using a pipette) and replaced with 4 mL of sterile, deionized water. The water was removed and replaced with 4 mL portions of sterile, deionized water two additional times. The final water portion was removed from each well and then the discs were removed. The liner layer was peeled from each disc to expose the adhesive backing. Smaller 12.7 mm diameter discs were cut from each disc using a hollow punch. Some of the discs (n=3) were analyzed for colony count (cfu) on the disc and some of the discs (n=3) were carried on to the cleaning procedure step.

Sample Disc Cleaning Procedure A

The 12.7 mm diameter disc was attached through the adhesive backing of the disc to a cleaning lane of an Elcometer Model 1720 Abrasion and Washability Tester (Elcometer Incorporated, Warren, MI). Unless otherwise specified, each disc was placed in the tester so that the microstructured channels in the disc surface were oriented in the same direction as the cleaning carriage motion. A 2 inch by 5 inch (5.08 cm by 12.7 cm) section of a nonwoven sheet [selected from either SONTARA 8000 or a polypropylene nonwoven sheet (5.9 micron fiber diameter, 40 gsm)] was soaked in solution containing TWEEN 20 (0.05%) in deionized water and excess liquid was squeezed out. The nonwoven sheet was secured around the Universal Material Clamp Tool (450 g) and the tool was attached to the carriage of the instrument. The instrument was set to operate with 15 carriage cycles at a rate of 60 cycles/minute (total cleaning time=15 seconds).

Sample Disc Cleaning Procedure B

The 12.7 mm diameter disc was attached through the adhesive backing of the disc to a cleaning lane of an Elcometer Model 1720 Abrasion and Washability Tester. Unless otherwise specified, each disc was placed in the tester so that the microstructured channels in the disc surface were oriented in the same direction as the cleaning carriage motion. A tool was prepared by additive manufacturing to hold the head of an Acclean manual toothbrush (average bristle diameter about 180 microns, obtained from Henry Schein Incorporated, Melville, NY) in the carriage of the instrument. The toothbrush head and the disc were aligned so that the entire exposed surface of the disc was contacted by the bristles of the brush. The brush bristles were soaked in water prior to operation. The instrument was set to operate with 15 carriage cycles at a rate of 60 cycles/minute (total cleaning time=15 seconds). The weight of the tool was 190 g.

Sample Disc Colony Count Method A

Following the cleaning procedure, each disc was washed five times with 1 mL portions of a solution containing TWEEN 20 (0.05%) in PBS buffer. Each washed disc was individually transferred to a separate 50 mL conical vial that contained a solution of TWEEN 20 (0.05%) in PBS buffer (10 mL). Each tube was sequentially vortexed for 1 minute, sonicated for 1 minute using a Branson 2510 Ultrasonic Cleaning Bath (Branson Ultrasonics, Danbury, CT), and vortexed for 1 minute. The solution from each tube was serially diluted (about 8 dilutions) with Butterfield's buffer (obtained from the 3M Corporation) to yield a bacterial concentration level that provided counts of colony forming units (cfu) within the counting range of a 3M PETRIFILM Aerobic Count Plate (3M Corporation). An aliquot (1 mL) from each diluted sample was plated on a separate 3M PETRIFILM Aerobic Count Plate according to the manufacturer's instructions. The count plates were incubated at 37° C. for 48 hours. After the incubation period, the number of cfu on each plate was counted using a 3M PETRIFILM Plate Reader (3M Corporation). The count value was used to calculate the total number of cfu recovered from a disc. The results are reported as the mean cfu count determined for 3 discs.

Discs that were not subjected to the cleaning procedure were analyzed for colony count (cfu) using the same described procedure.

Sample Disc Colony Count Method B

Following the brushing procedure, each disc was washed five times with 1 mL portions of a solution containing TWEEN 20 (0.05%) in PBS buffer. Each washed disc was individually transferred to a separate 50 mL conical vial that contained a solution of TWEEN 20 (0.05%) in PBS buffer (10 mL). Each tube was sequentially vortexed for 1 minute, sonicated for 30 seconds (2 second pulses with 0.5 seconds between pulses at the level 3 setting) using a Misonix Sonicator Ultrasonic Processor XL, Misonix Incorporated, Farmingdale, NY, and vortexed for 1 minute. The solution from each tube was serially diluted (about 8 dilutions) with Butterfield's buffer to yield a bacterial concentration level that provided counts of colony forming units (cfu) within the counting range of a 3M PETRIFILM Aerobic Count Plate. An aliquot (1 mL) from each diluted sample was plated on a separate 3M PETRIFILM Aerobic Count Plate according to the manufacturer's instructions. The count plates were sealed in an air tight anaerobic box with two BD GasPak EZ pouches (obtained from Becton, Dickinson and Company) and incubated at 37° C. for 24 hours. After the incubation period, the number of cfu on each plate was counted using a 3M PETRIFILM Plate Reader. The count value was used to calculate the total number of cfu recovered from a disc. The results are reported as the mean cfu count determined for 3 discs.

Discs that were not subjected to the brushing procedure were analyzed for colony count (cfu) using the same described procedure.

Example 9

Discs (12.7 mm) of Example 1, Example 2, and Comparative Example A inoculated with $P.$ $aeruginosa$ were prepared as described in the 'Sample Disc Inoculation, Incubation and Washing Method' (described above). The discs were cleaned according to the 'Sample Disc Cleaning Procedure A' (described above) using SONTARA 8000 as the nonwoven sheet. The cleaned discs were analyzed according to 'Sample Disc Colony Count Method A' (described above). The mean $\log_{10}$ cfu counts are reported in Table 2 together with the calculated $\log_{10}$ cfu reduction achieved by cleaning the disc.

SEM images of the discs before cleaning showed a large continuous biofilm on the surface of Comparative Example A discs, while the discs of Examples 1 and 2 showed separated aggregates and small groups of cells on the microstructured disc surface. Following the cleaning procedure, biofilm aggregates in small patches covered the surface of Comparative Example A discs, while the discs of Examples 1 and 2 had only small groups of cells and individual cells on the microstructured disc surface.

TABLE 2

| Sample | Mean $\log_{10}$ CFU Recovered ($P.$ $aeruginosa$) from a Disc (n = 3), SD = Standard Deviation | | $\log_{10}$ CFU Reduction from |
|---|---|---|---|
| Disc | Not Cleaned | Cleaned | Cleaning |
| Example 1 | 8.64 (SD = 0.43) | 4.24 (SD = 0.74) | 4.40 |
| Example 2 | 8.73 (SD = 0.15) | 2.97 (SD = 0.50) | 5.76 |
| Comparative Example A | 8.67 (SD = 0.01) | 6.88 (SD = 0.70) | 1.79 |

Example 10

Discs (12.7 mm) of Examples 3-8 and Comparative Example A inoculated with $P.$ $aeruginosa$ were prepared as described in the 'Sample Disc Inoculation, Incubation and Washing Method'. The discs were cleaned according to the 'Sample Disc Cleaning Procedure A' using SONTARA 8000 as the nonwoven sheet. The cleaned discs were analyzed according to 'Sample Disc Colony Count Method A'. The mean $\log_{10}$ cfu counts are reported in Table 3 together with the calculated $\log_{10}$ cfu reduction achieved by cleaning the disc.

TABLE 3

| Sample | Mean $\log_{10}$ CFU Recovered ($P.$ $aeruginosa$) from a Disc (n = 3), SD = Standard Deviation | | $\log_{10}$ CFU Reduction from |
|---|---|---|---|
| Disc | Not Cleaned | Cleaned | Cleaning |
| Example 3 | 9.04 (SD = 0.07) | 6.72 (SD = 0.31) | 2.32 |
| Example 4 | 9.06 (SD = 0.02) | 6.85 (SD = 0.33) | 2.21 |
| Example 5 | 9.13 (SD = 0.06) | 6.46 (SD = 0.58) | 2.67 |
| Example 6 | 9.02 (SD = 0.09) | 6.32 (SD = 0.14) | 2.70 |
| Example 7 | 9.07 (SD = 0.03) | 6.46 (SD = 0.06) | 2.61 |
| Example 8 | 8.90 (SD = 0.14) | 6.50 (SD = 0.35) | 2.40 |
| Comparative Example A | 9.07 (SD = 0.10) | 7.84 (SD = 0.13) | 1.23 |

Example 11

Discs (12.7 mm) of Example 1, Example 2, and Comparative Example A inoculated with $S.$ $aureus$ were prepared as described in the 'Sample Disc Inoculation, Incubation and Washing Method'. The discs were cleaned according to the 'Sample Disc Cleaning Procedure A' using SONTARA 8000 as the nonwoven sheet. The cleaned discs were analyzed according to 'Sample Disc Colony Count Method A'. The mean $\log_{10}$ cfu counts are reported in Table 4 together with the calculated $\log_{10}$ cfu reduction achieved by cleaning a disc.

SEM images of the discs before cleaning showed a large continuous biofilm on the surface of Comparative Example A discs, while the discs of Examples 1 and 2 showed separated aggregates and small groups of cells on the surface. For the discs of Examples 1 and 2 the $S.$ $aureus$ cells were primarily in the valley portions of the structured surface. Following the cleaning procedure, biofilm aggregates in small patches covered the surface of Comparative Example A discs, while the discs of Examples 1 and 2 had only small groups of cells and individual cells on the surface.

TABLE 4

| Sample Disc | Mean Log₁₀ CFU Recovered (*S. aureus*) from a Disc (n = 3), SD = Standard Deviation | | Log₁₀ CFU Reduction from Cleaning |
|---|---|---|---|
| | Not Cleaned | Cleaned | |
| Example 1 | 8.01 (SD = 0.23) | 4.55 (SD = 0.07) | 3.46 |
| Example 2 | 7.55 (SD = 0.31) | 4.34 (SD = 0.30) | 3.21 |
| Comparative Example A | 8.04 (SD = 0.14) | 6.14 (SD = 0.43) | 1.90 |

Example 12

Discs (12.7 mm) of Example 1, Example 2, and Comparative Example A inoculated with *P. aeruginosa* were prepared as described in the 'Sample Disc Inoculation, Incubation and Washing Method'. The discs were cleaned according to the 'Sample Disc Cleaning Procedure A' using SONTARA 8000 as the nonwoven sheet. The only exception was that half of the discs were oriented in the instrument so that the microstructured channels in the disc surface were oriented in the same direction as the cleaning carriage motion and half of the discs were oriented in the instrument so that the microstructured channels in the disc surface were oriented in the direction perpendicular to the cleaning carriage motion. The cleaned discs were analyzed according to 'Sample Disc Colony Count Method A'. The mean $\log_{10}$ cfu counts are reported in Table 5 together with the calculated $\log_{10}$ cfu reduction achieved by cleaning the disc.

TABLE 5

| Sample Disc | Mean Log₁₀ CFU Recovered (*P. aeruginosa*) from a Disc (n = 3), SD = Standard Deviation | | Log₁₀ CFU Reduction from Cleaning | Cleaning Direction |
|---|---|---|---|---|
| | Not Cleaned | Cleaned | | |
| Example 1 | 8.88 (SD = 0.53) | 5.95 (SD = 0.74) | 2.93 | parallel |
| Example 1 | 8.88 (SD = 0.53) | 5.66 (SD = 0.18) | 3.22 | perpendicular |
| Example 2 | 8.80 (SD = 0.16) | 4.74 (SD = 0.31) | 4.06 | parallel |
| Example 2 | 8.80 (SD = 0.16) | 5.00 (SD = 0.83) | 3.80 | perpendicular |
| Comparative Example A | 8.51 (SD = 0.63) | 7.19 (SD = 0.77) | 1.32 | not applicable |

Example 13

Discs (12.7 mm) of Example 1 and Comparative Example A inoculated with *P. aeruginosa* were prepared as described in the 'Sample Disc Inoculation, Incubation and Washing Method'. The discs were cleaned according to the 'Sample Disc Cleaning Procedure A' using the polypropylene nonwoven sheet (5.9 micron fiber diameter, 40 gsm). The cleaned discs were analyzed according to 'Sample Disc Colony Count Method A'. The mean $\log_{10}$ cfu counts are reported in Table 6 together with the calculated $\log_{10}$ cfu reduction achieved by cleaning a disc.

TABLE 6

| Sample Disc | Mean Log₁₀ CFU Recovered (*P. aeruginosa*) from a Disc (n = 3), SD = Standard Deviation | | Log₁₀ CFU Reduction from Cleaning |
|---|---|---|---|
| | Not Cleaned | Cleaned | |
| Example 1 | 9.06 (SD = 0.05) | 3.08 (SD = 0.28) | 5.98 |
| Comparative Example A | 8.67 (SD = 0.13) | 5.32 (SD = 1.29) | 3.35 |

Example 14

Discs (12.7 mm) of Example 1, Example 2, and Comparative Example A inoculated with *S. mutans* were prepared as described in the 'Sample Disc Inoculation, Incubation and Washing Method'. The discs were cleaned according to the 'Sample Disc Cleaning Procedure B'. The cleaned discs were analyzed according to 'Sample Disc Colony Count Method B'. The mean $\log_{10}$ cfu counts are reported in Table 7 together with the calculated $\log_{10}$ cfu reduction achieved by cleaning the disc.

SEM images of the discs before cleaning showed a large continuous biofilm on the surface of Comparative Example A discs, while the discs of Examples 1 and 2 showed separated aggregates of cells growing mostly on top of the peaks of the microstructured surface. Following the cleaning procedure, biofilm aggregates still covered most the surface of Comparative Example A discs, while the discs of Examples 1 and 2 had only small groups of cells and individual cells growing on top of the microstructured surface.

TABLE 7

| Sample | Mean Log₁₀ CFU Recovered (*S. mutans*) From a Disc (n = 3), SD = Standard Deviation | | Log₁₀ CFU Reduction from Cleaning |
|---|---|---|---|
| | Not Brushed | Brushed | |
| Example 1 | 8.49 (SD = 0.08) | 5.37 (SD = 0.15) | 3.12 |
| Example 2 | 8.47 (SD = 0.24) | 6.04 (SD = 0.33) | 2.43 |
| Comparative Example A | 8.21 (SD = 0.17) | 7.00 (SD = 0.47) | 1.21 |

Example 15. Sample Disc Cleaning with a Disinfectant Solution

A disinfectant cleaning solution was prepared by diluting (1:256) 3M Disinfectant Cleaner RCT Concentrate 40A (obtained from the 3M Corporation) with sterile water. Discs of Example 1, Example 2, and Comparative Example A (12.7 mm) inoculated with *P. aeruginosa* were prepared as described in the 'Sample Disc Inoculation, Incubation and Washing Method'. The release liner layers were removed and each disc was attached to the wall of a separate 50 mL conical vial (i.e. one disc per tube). To ensure complete submersion of the disc in the disinfectant cleaning solution, the disc was attached as close as possible to the bottom of the tube. An aliquot (4 mL) of the disinfectant cleaning solution was added to each tube and the tubes were maintained at room temperature for either 30 seconds or 3 minutes. Dey\Engley neutralizing broth (36 mL) was added immediately and the capped tube was inverted 3 times by hand motion to mix the sample. Each tube was sequentially vortexed for 30 seconds, sonicated for 30 seconds using a Branson 2510 Ultrasonic Cleaning Bath, and vortexed for 30 seconds. The solution from each tube was serially diluted (about 8 dilutions) with Butterfield's buffer to yield a bacterial concentration level that provided counts of colony forming units (cfu) within the counting range of a 3M PETRIFILM Aerobic Count Plate. An aliquot (1 mL) from each diluted sample was plated on a separate 3M PETRIFILM Aerobic Count Plate according to the manufacturer's instructions. The count plates were incubated at 37° C. for 48 hours. The number of cfu on each plate was counted after the 24 hour incubation using a 3M PETRIFILM Plate Reader. The count value was used to calculate the total number of cfu recovered from a disc.

Control discs were prepared and analyzed following the same procedure with the exception that the discs were not treated with the disinfectant cleaning solution. The results are reported in Table 8 as the mean $\log_{10}$ cfu reduction when disinfectant was used as compared to the mean cfu count observed for the control discs (n=3).

TABLE 8

Cleaning Effect with a Disinfectant Solution

| Sample | Mean $\log_{10}$ CFU Reduction (*P. aeruginosa*) when using a Disinfectant Cleaning Solution (n = 3), SD = Standard Deviation | |
| --- | --- | --- |
| Disc | 30 seconds | 3 minutes |
| Example 1 | 1.60 (SD = 0.31) | 2.16 (SD = 0.27) |
| Example 2 | 0.45 (SD = 0.17) | 1.60 (SD = 0.31) |
| Comparative Example A | 0.14 (SD = 0.13) | 0.46 (SD = 0.36) |

Example 16

An acrylic pressure sensitive adhesive (PSA) film was prepared by combining and mixing isooctyl acrylate (450 g, Sigma-Aldrich Company), acrylic acid (50 g, Alfa Aesar, Haverhill, MA) and DAROCUR 1173 photoinitiator (0.15 g) in a clear glass jar. The sample was purged with nitrogen for 5 minutes and exposed to low intensity (0.3 mW/cm$^2$) UV irradiation from a 360 nm UV light until a viscosity of approximately 2000 centipoise was achieved. Viscosity measurements were determined using a Brookfield LVDV-II+ Pro Viscometer with LV Spindle #63 (AMETEK Brookfield, Middleboro, MA) at 23° C. and shear rate of 50 s$^{-1}$. IRGACURE-651 photoinitiator (1.125 g) and hexanediol diacrylate (2.7 g, Sigma-Aldrich Company) were added to the jar and the mixture was mixed for 24 hours. The resulting viscous polymer solution was coated between siliconized polyester release liners (RFO2N and RF22N, obtained from SKC Hass, Seoul, Korea), using a knife coater with a set gap to yield an adhesive coating thickness of 100 microns. This construction was irradiated at 350 nm UV irradiation using a total dose of 1200 mJ/cm$^2$ of UVA radiation to provide the finished PSA film.

The PSA film was applied to the back surface (i.e. non-microstructured surface) of a linear prism film sheet having microstructure features of Example 1 (Table 1). The resulting laminated film was cut into test strips [1 inch by 3 inch (2.54 cm by 7.62 cm)]. Test strips were applied to the surface flat glass and polypropylene panels using a hand roller. The panels were conditioned at 120° C. for 4 hours and then equilibrated to room temperature. Test strips were peeled from the panel surfaces by hand. Following removal of the test strips, the panel surfaces were visually inspected and no residue from the test strips was observed on any of the panel surfaces.

Example 17

A metal tool was used with a laminator to create a linear prism film of FIG. 3 with dimensions of Example 3. A layer of 3M Tape Primer 94 (obtained from the 3M Corporation) was applied using a brush to a centered section (12 cm by 13 cm) on one side of a VIVAK PET-G sheet (30 cm by 30 cm, sheet thickness=2.1 mm). The primer layer was allowed to dry at room temperature for 5 minutes. A second layer of primer was applied in the same manner followed by drying. The UV curable resin (described above) was applied to the tooling by pipette and the PET-G disc was placed over the tool with the primed surface of the disc facing the tool and the tool centered on the sheet. The disc was laminated using a laminator with a nip pressure setting of 50 psig and a speed setting of 0.52 feet/minute (0.16 meters/minute). The sample was cured with UV light by passing the sample 3 times through a UV processor (model QC 120233AN with two Hg vapor lamps, obtained from RPC Industries) at a rate of 15.2 meters/minute (50 feet/minute) under a nitrogen atmosphere.

The resulting laminated, microstructured film sheet was thermoformed using a Model C22-S MAAC Thermoformer (MAAC Machinery, Carol Stream, IL). The template model consisted of two manual wrenches placed side-by-side. One wrench was an adjustable crescent wrench (110 mm overall length) and the other wrench was a 7/16 inch combination wrench (open end and box end) with an overall length of 125 mm. The sheet was placed in the holder and a thermoforming cycle was initiated with a soak time of 100-110 seconds, 55% top and bottom heater output, and 30 mm Hg vacuum. The sheet was oriented so that the microstructured section of the sheet was aligned with the wrench template with the microstructured surface facing away from the wrench template. The sheet formed over the wrench conformally with high fidelity. The thermoformed plastic article was separated from the template and the microstructures of the article were inspected and measured using a Keyence VK-X200 series laser microscope (Keyence Corporation). The microstructures retained their shape and nominally 60% of their peak height.

Example 18

A UV curable resin was prepared from PHOTOMER 6210 aliphatic urethane diacrylate oligomer (75 parts), SR238 1,6-hexanediol diacrylate (25 parts), and LUCIRIN TPO photoinitiator (0.5%). The components were blended in a high speed mixer, heated in an oven at about 70° C. for 24 hours) and then cooled to room temperature. Copper buttons were used as templates for preparing cube corner microstructured films. A button and the compounded resin were both heated in an oven at about 70° C. for 15 minutes. Warmed resin was applied to the center of the warmed button using a transfer pipette. A section of MELINEX 618 PET support film (5 mil thick) larger than the button was placed over the applied resin followed by a glass plate. The primed surface of the PET film was oriented to contact the resin. The glass plate was held in place with hand pressure until the resin completely covered the surface of the button.

The glass plate was carefully removed. If any air bubbles were introduced, a rubber hand roller was used to remove them.

The sample was cured with UV light by passing the sample 2 times through a UV processor (model QC 120233AN with two Hg vapor lamps, obtained from RPC Industries, Plainfield, IL) at a rate of 15.2 meters/minute (50 feet/minute) under a nitrogen atmosphere. The cured, microstructured film was removed from the copper template by gently pulling away at a 90° angle. The microstructured surface had an array of canted cube corner structures such as depicted in FIG. 4A. With reference to reference to FIG. 4C, the dimensions of an individual cube corner microstructure was as follows: triangular base of 70/55/55 degrees (beta 1, 2, 3); side wall angles alpha2, alpha3, alpha1 that were 60, 60, 89 degrees respectively; a peak height of 63.3 micrometers; and valley widths of 127 micrometers and 145 micrometers. The copper buttons utilized as templates had a negative replication of this microstructured surface.

Example 19

Compression molding was used to prepare a sheet of G-10 epoxy laminate with a linear prism microstructured surface having the same microstructured feature dimensions as reported for Example 1. A mold having a negative replication of the microstructured surface was made from a master using 3M ESPE PARADIGM Heavy Body VPS impression material (3M Corporation). The mold (15.2 cm×15.2 cm) was placed on a flat section of cardboard. Two sheets (12.7 cm×12.7 cm) of G10 Epoxy Fiberboard were stacked and centered on the mold. A flat, smooth sheet of silicone (about 1.27 cm) was placed on top of the epoxy sheets and a flat stainless steel plate (about 2.54 cm thick) was placed on top of the silicone sheet. The completed stack was placed on the lower platen of a hydraulic press. The upper and lower platens of the press were heated at 300° F. (148.9° C.) and the stack was placed under 2500 pounds of pressure (100 pounds of pressure per square inch) for 1 hour, followed by cooling of the platens to 70° F. (21.1° C.) while maintaining pressure on the stack. Upon cooling, the applied pressure was removed. The resulting microstructured G-10 epoxy sheet was released from the mold and silicone spacer.

Example 20

Compression molding was used to prepare a sheet of G-10 epoxy laminate with a cube corner microstructured surface according to the procedure reported in Example 19. A mold having a negative replication of the microstructured surface described in Example 18 was made from a master using 3M ESPE PARADIGM Heavy Body VPS impression material.

Example 21

Compression molding with a metal tool was used to prepare a sheet of G-10 epoxy laminate with a cube corner microstructured surface.

A silicon containing layer was applied to the microstructured surface of a tool as described in WO2009/032815 (David) using a parallel plate capacitively coupled plasma reactor. The chamber of the reactor had a central cylindrical powered electrode with a surface area of 3.61 ft² (0.10 m³). The micro-structured tool was placed on the floor of the chamber directly below the powered electrode (nominal distance between tool and electrode about 4 inches (10.16 cm) and the reactor chamber was pumped down to a base pressure of less than 1.3 Pa (1 mTorr). Oxygen was introduced into the chamber at a flow rate of 600 SCCM (standard cubic centimeters per minute). Treatment was carried out by coupling RF power into the reactor at a frequency of 13.56 MHz and an applied power of 600 watts for 60 seconds. A second step resulting in a deposited thin film on the microstructure was accomplished by stopping the flow of oxygen and evaporating and transporting HMDSO (hexamethyldisiloxane) into the system at a flow rate of 120 SCCM. Treatment was carried out using a plasma enhanced chemical vapor deposition (CVD) method by coupling RF power into the reactor at a frequency of 13.56 MHz and an applied power of 600 watts for 120 seconds. Following the completion of the second step, a second line of HMDSO was opened to the chamber in addition to the 120 SCCM flow of HMDSO. The combined flow rates resulted in a chamber pressure of 4.1 mTorr. Treatment was carried out by coupling RF power into the reactor at a frequency of 13.56 MHz and an applied power of 200 watts for 45 seconds. The process conditions provided a release coating with an estimated thickness of less than 200 nm. For each step, rf power was applied to the electrode to generate the plasma after the stated gas flow had stabilized. Following completion of the plasma treatment the RF power and gas supply were stopped and the chamber was vented to the atmosphere.

The metal tool (15.2 cm×15.2 cm) was placed on a flat section of cardboard. Two sheets (12.7 cm×12.7 cm) of G10 Epoxy Fiberboard were stacked and centered on the mold. A flat, smooth sheet of silicone (about 1.27 cm thick) was placed on top of the epoxy sheets and a flat stainless steel plate (2.54 cm thick) was placed on top of the silicone sheet. The completed stack was placed on the lower platen of a hydraulic press. The upper and lower platens of the press were heated at 300° F. (148.9° C.) and the stack was placed under 2500 pounds of pressure (100 pounds of pressure per square inch) for 1 hour, followed by cooling of the platens to 70° F. (21.1° C.) while maintaining pressure on the stack. Upon cooling, the applied pressure was removed. The resulting microstructured G-10 epoxy sheet was released from the mold and silicone spacer. The microstructured surface had an array of canted cube corner structures such as depicted in FIG. 4A. With reference to reference to FIG. 4C, the dimensions an individual cube corner microstructure was as follows: triangular base of 58/58/64 degrees (beta 1, 2, 3); side wall angles were 67, 67, 77 degrees respectively; a peak height of 49.5 micrometers; and valley widths of 101.6 micrometers and 107.7 micrometers.

Comparative Example B

A flat, smooth sheet of G-10 epoxy laminate was submitted to the same compression molding process as described in Example 19 with the exception that the microfeature mold was replaced in the stack with a second flat, smooth sheet of silicone. This resulted in the formation of an epoxy sheet having a smooth surface (i.e. a film without a patterned, microstructured surface).

Example 22

Discs (12.7 mm) of Example 19 and Comparative Example B were prepared, cleaned, and analyzed according to the procedure described in Example 9. The mean $\log_{10}$ cfu counts are reported in Table 9 together with the calculated $\log_{10}$ cfu reduction achieved by cleaning the disc.

TABLE 9

| Sample | Mean Log$_{10}$ CFU Recovered (*P. aeruginosa*) from a Disc (n = 3), SD = Standard Deviation | | Log$_{10}$ CFU Reduction from Cleaning |
|---|---|---|---|
| Disc | Not Cleaned | Cleaned | |
| Example 19 | 8.70 (SD = 0.17) | 4.38 (SD = 0.16) | 4.32 |
| Comparative Example B | 8.69 (SD = 0.10) | 6.38 (SD = 0.11) | 2.31 |

Example 23. Reduction of Microbial Touch Transfer

Tryptic Soy Agar was prepared according to the manufacturer's instructions. A streak plate of *Pseudomonas aeruginosa* (ATCC 15442) or *Staphylococcus aureus* (ATCC 6538) was prepared from a frozen stock on Tryptic Soy Agar and incubated overnight at 37° C. Two colonies from the plate were used to inoculate 9 mL of sterile Butterfield's Buffer (3M Corporation). The optical density (absorbance) was read at 600 nm to confirm that the reading was 0.040±0.010. If required, the culture was adjusted to be within this range. A portion of the culture (1.5 mL) was added to 45 mL of Butterfield's Buffer in a sterile 50 mL conical tube to make the inoculation solution for the touch transfer experiments. Serial dilution samples of inoculation solutions were prepared using Butterfield's Buffer. The dilution samples were plated on 3M PETRIFILM Aerobic Count plates (3M Corporation) and evaluated according to the manufacturer's instructions to confirm the cell concentration used in each experiment.

Microstructured samples (50 mm×50 mm) of Examples 1, 2, 18, 19, and 20 were prepared and individually adhered to the internal, bottom surface of sterile 100 mm Petri dishes using double sided tape. Each Petri dish contained a single sample and the sample was attached so that the microstructured surface was exposed. Samples of the corresponding Comparative Examples A and B were also tested and served as control samples. Samples of Comparative Example A served as the control samples for microstructured samples of Examples 1, 2, and 18. Samples of Comparative Example B served as the control samples for microstructured samples of Examples 19 and 20. The exposed surface of each microstructured and control sample was wiped three times using a KIMWIPE wiper (Kimberly-Clark Corporation, Irving, TX) that had been wetted with a 95% isopropyl alcohol solution. The samples were air dried for 15 minutes in a biosafety cabinet with the fan turned on. The samples were then sterilized by for 30 minutes using irradiation from the UV light in the cabinet.

Inoculation solution (25 mL of either *S. aureus* or *P. aeruginosa* described above) was poured into a sterile Petri dish (100 mm). For each sample, an autoclave-sterilized circular disc of Whatman Filter Paper (Grade 2, 42.5 mm diameter; GE Healthcare, Marlborough, MA) was grasped using flame-sterilized tweezers and immersed in the Petri dish containing the inoculation solution for 5 seconds. The paper was removed and held over the dish for 25 seconds to allow excess inoculum to drain from the paper. The inoculated paper disc was placed on top of the microstructured sample and a new autoclave-sterilized piece of Whatman Filter paper (Grade 2, 60×60 mm) was placed over the inoculated paper disc. A sterile cell spreader was pressed on the top paper surface of the stack and moved across the surface twice in perpendicular directions. The stack was maintained for two minutes. Both pieces of filter paper were then removed from the microstructured sample using sterile tweezers. The sample was allowed to air dry at room temperature for 5 minutes. Touch transfer of bacteria from the microstructured surface of each sample was assessed by pressing a RODAC plate (Trypticase Soy Agar with Lecithin and Polysorbate 80; from Thermo Fisher Scientific) evenly onto the film sample for 5 seconds using uniform pressure (about 300 g). The RODAC plates were incubated at 37° C. overnight. Following the incubation period, the colony forming units (cfu) were counted for each plate. Samples were tested in triplicate with the mean count value reported.

The mean cfu count for each sample was converted to the log$_{10}$ scale. The log$_{10}$ reduction in cfu count by touch transfer was determined by subtracting the log$_{10}$ count value obtained for the microstructured sample from the log$_{10}$ count value obtained for the corresponding control sample (sample with a smooth surface). The mean % reduction (n=3) in touch transfer was calculated by Equation A. The results are reported in Table 10.

$$\% \text{ Reduction in Touch Transfer} = (1-10^{(-log10 reduction\ value)})*100.$$  Equation A:

TABLE 10

| Microstructured Sample | Inoculation Organism | Mean log$_{10}$ cfu Count using the Microstructured Sample | Mean log$_{10}$ cfu Count using the Control Sample | % Reduction in Touch Transfer |
|---|---|---|---|---|
| Example 1 | *S. aureus.* | 0.20 | 2.27 | 99.2 |
| Example 2 | *S. aureus* | 0.16 | 1.46 | 95.0 |
| Example 18 | *S. aureus* | 1.27 | 2.60 | 95.2 |
| Example 1 | *P. aeruginosa* | 1.59 | 2.20 | 75.1 |
| Example 18 | *P. aeruginosa* | 1.18 | 2.59 | 96.1 |
| Example 19 | *S. aureus* | 1.27 | 2.41 | 92.8 |
| Example 20 | *S. aureus* | 1.50 | 2.41 | 87.8 |
| Example 19 | *P. aeruginosa* | 0.52 | 2.02 | 96.9 |
| Example 20 | *P. aeruginosa* | 0.73 | 2.02 | 94.9 |

Example 24

A layer of 3M Tape Primer 94 (obtained from the 3M Corporation) was applied using a brush to the entire surface on one side of a DURAN PET-G disc (disc diameter=125 mm, disc thickness=0.75 mm). The primer layer was allowed to dry at room temperature for 5 minutes.

A metal tool was used with a laminator to create a microstructured surface with cube corner features. The UV curable resin (described above) was applied to the tooling by pipette. The coated tool was placed in a vacuum oven and the pressure in the oven was slowly dropped to 635 mm of Hg. Once this vacuum was attained the pressure was allowed to increase back to atmospheric pressure. The PET-G disc was placed over the tooling with the primed surface of the disc facing the tooling. The disc was laminated using a laminator with a nip pressure setting of 50 psig and a speed setting of 0.52 feet/minute (0.16 meters/minute). The sample was cured with UV light by passing the sample 3 times through a UV processor (model QC 120233AN with two Hg vapor lamps, obtained from RPC Industries) at a rate of 15.2 meters/minute (50 feet/minute) under a nitrogen atmosphere. The disc was carefully removed from the tool. The microstructured surface had an array of canted cube corner structures such as depicted in FIG. 4A. With reference to reference to FIG. 4C, the dimensions of an individual cube corner microstructure was as follows: triangular base of 70/55/55 degrees (beta 1, 2, 3); side wall angles alpha2, alpha3, alpha1 that were 60, 60, 89 degrees respectively; a peak height of 63.5 micrometers; and valley widths of 127 micrometers and 178 micrometers. The metal tool had a negative replication of the microstructured surface.

The laminated, microstructured disc was formed into a dental aligner article using a BIOSTAR VI pressure molding machine (Scheu-Dental GmbH). The microstructured disc was heated for 30 seconds and then pulled over a rigid-polymer model. The film was oriented so that the microstructured surface contacted the model. The chamber of the molding machine behind the film was pressurized to 90 psi for 30 seconds with cooling and the chamber was then vented to return to ambient pressure. The model with thermoformed film was removed from the machine and excess film was trimmed using a sonic cutter (model NE80, Nakanishi Incorporated, Kanuma City, Japan). The finished, thermoformed three-dimensional shell was separated from the model. The microstructures of the formed three-dimensional shell were inspected and measured using a Keyence VK-X200 series laser microscope (Keyence Corporation, Itasca, IL). The cube corner microstructures retained their shape and nominally 80% of their peak height.

Comparative Example D. Square Wave Microstructured Film

A diamond (29.0 micrometer tip width, 3° included angle, 87 micrometers deep) was used to cut a tool having a plurality of parallel linear grooves. The grooves were spaced apart by a pitch of 59.1 micrometers. Resin A was prepared by mixing the materials in Table 11 below.

TABLE 11

Composition of Resin A

| Material | Parts by Weight | Source |
| --- | --- | --- |
| Aliphatic urethane diacrylate (Photomer 6010) | 60 | BASF Corporation, Florham Park, NJ |
| Ethoxylated (10) bisphenol A diacrylate (SR602) | 20 | Sartomer, Exton, PA |
| Ethoxylated (4) bisphenol A diacrylate (SR601) | 4.0 | Sartomer |
| Trimethylolpropane triacrylate (TMPTA) | 8.0 | Cytec Industries, Woodland Park, NJ |
| Phenoxyethyl Acrylate [PEA (Etermer 2010)] | 8.0 | Eternal Chemical Co., Ltd., Kaohsiung, Taiwan |
| Darocur 1173 Photoinitiator | 0.35 | BASF Corporation, |
| Diphenyl(2,4,6-trimethylbenzoyl)phosphine oxide photoinitiator (TPO) | 0.10 | BASF Corporation |
| Irgacure 1035 antioxidant (I1035) | 0.20 | BASF Corporation |

A cast-and-cure microreplication process was carried out using Resin A and the tool described above. The line conditions were resin temperature 150° F. (65.5° C.), die temperature 150° F. (65.5° C.), coater IR 120° F. (48.9° C.) edges/130° F. (54.4° C.) center, tool temperature 100° F. (37.8° C.), and line speed 70 fpm. Fusion D lamps (obtained from Fusion UV Systems, Gaithersburg, MD), with peak wavelength at 385 nm, were used for curing and operated at 100% power. The resulting microstructured film comprised a plurality of walls separated by channels as illustrated by FIG. 2. The base layer was PET film (3M Corporation), having a thickness of 3 mils (76.2 micrometers). The side of the PET film that contacted the resin was primed with a thermoset acrylic polymer (Rhoplex 3208 obtained from Dow Chemical, Midland, MI). The land layer of the cured resin had a thickness of 8 micrometers. With reference to FIG. 2, the dimensions of the resulting microstructured film surface were as follows: wall height (H) of 84.1 micrometers, side wall angle of 0.4 degrees, pitch of 59.1 micrometers, width on top surface of wall of 28.5 micrometers, and a maximum valley width of 30.6 microns.

Discs (12.7 mm) of Comparative Example D and Comparative Example A were prepared, cleaned, and analyzed according to the procedure described in Example 9. The mean $\log_{10}$ cfu counts are reported in Table 12 together with the calculated $\log_{10}$ cfu reduction achieved by cleaning the disc.

TABLE 12

| Sample Disc | Mean $\log_{10}$ CFU Recovered (*P. aeruginosa*) from a Disc (n = 3), SD = Standard Deviation | | $\log_{10}$ CFU Reduction from Cleaning |
| --- | --- | --- | --- |
| | Not Cleaned | Cleaned | |
| Comparative Example D | 9.13 (SD = 0.03) | 8.21 (SD = 0.46) | 0.92 |
| Comparative Example A | 9.07 (SD = 0.34) | 8.00 (SD = 0.33) | 1.07 |

Comparative Example E and Comparative Example F. Square Wave Microstructured Films The procedure described in Comparative Example D was followed to produce two square wave microstructured films with different dimensions. The microstructured film of Comparative Example E had the following surface dimensions: wall height (H) of 89.5 micrometers, side wall angle of 1.4 degrees, pitch of 62.3 micrometers, width on top surface of wall of 28.8 micrometers, and a maximum valley width of 33.3 micrometers. The microstructured film of Comparative Example F had the following surface dimensions: wall height (H) of 45 micrometers, side wall angle of 0.48 degrees, pitch of 30 micrometers, width on top surface of wall of 15 micrometers, and a maximum valley width of 15 micrometers.

Samples of the microstructured films were evaluated for reduction of microbial touch transfer according to the procedure described in Example 23 (using *S. aureus*). The mean percent reduction in microbial touch transfer for the microstructured film of Comparative Example E was 25-37%. The microstructured film of Comparative Example F showed a mean 10% increase in microbial touch transfer compared to the corresponding control sample.

Example 25

A sheet of architectural graphic film (SCOTCHCAL vinyl graphic film #IJ40, obtained from the 3M Corporation) having a linear prism microstructured surface with the same dimensions as reported for Example 3 (Table 1) was prepared using compression molding with a nickel tool. The film was a laminate with a vinyl film top layer overlaying a decorative graphic film layer and an acrylic pressure-sensitive adhesive backing. The adhesive backing was covered with a silicon-coated release liner.

A section (12.7 cm×12.7 cm) of the architectural graphic film was adhesively laminated to a 3 mil PET film. The nickel tool (15.2 cm×15.2 cm) was placed on a Teflon sheet.

The laminated graphic film was centered on the tool and oriented so the graphic film surface faced the tool. A flat, smooth sheet of silicone (about 1.27 cm thick) was placed to cover the graphic film and a flat stainless steel plate (2.54 cm thick) was placed on top of the silicone sheet. The completed stack was placed on the lower platen of a hydraulic press. The upper and lower platens of the press were heated at 350° F. (176.7° C.) and the stack was placed under 2000 pounds of pressure (80 pounds of pressure per square inch) for 10 minutes, followed by cooling of the platens to 70° F. (21.1° C.) while maintaining pressure on the stack. Upon cooling, the applied pressure was removed. The resulting microstructured sheet was released from the tool and silicone spacer. Samples of the resulting microstructured film were evaluated for reduction in microbial touch transfer according to the procedure described in Example 23. The mean percent reduction in microbial touch transfer for the microstructured film was 95%. The log 10 reduction of microorganism after cleaning would be similar to Example 1.

Example 26

The same procedure as reported in Example 25 was followed with the exception that a vinyl overlaminate protective film (SCOTCHCAL #8508, 2.3 mil thick, obtained from the 3M Corporation) was used in place of the architectural graphic film. Samples of the resulting microstructured film were evaluated for reduction in microbial touch transfer according to the procedure described in Example 23. The mean percent reduction in microbial touch transfer for the microstructured film was 84%.

Example 27. Surface Coverage of a Liquid Disinfectant

Samples (7.6 cm by 20.3 cm strips) of microstructured films of Example 1, Example 20, and Comparative Example A were adhesively attached to a cleaning lane of an Elcometer Model 1720 Abrasion and Washability Tester (Elcometer Incorporated). In addition, a cube corner microstructured film (Example 27a) was prepared according to Example 20 with the dimensions of an individual cube corner microstructure as follows: triangular base of 60/60/60 degrees (beta 1, 2, 3); side wall angles alpha2, alpha3, alpha1 that were 45, 45, 45 degrees; a peak height of 9 micrometers; and valley widths of 27.7 micrometers and 27.7 micrometers. A corresponding sample strip of Example 27a was also attached to a cleaning lane of the instrument. Each lane contained a single test sample. For the microstructured samples, the microstructured surface was exposed with the opposite non-microstructured surface attached to the cleaning lane. For the microstructured film of Example 1, some samples were placed in the instrument so that the microstructured channels in the film surface were oriented in the same direction (parallel direction) as the carriage motion, while other samples were placed in the instrument so that the microstructured channels in the film surface were oriented in the direction perpendicular to the carriage motion.

Two different wetted wipes were used in the test. The first wetted wipe was a SONTARA 8000 nonwoven (5.1 cm by 12.7 cm) that was soaked in an aqueous solution of isopropyl alcohol (70%) containing 0.025% crystal violet dye (obtained from the Sigma-Aldrich Company). The second wetted wipe was a paper towel (5.1 cm by 12.7 cm section of a WypALL L30 General Purpose Wiper obtained from the Kimberly-Clark Corporation, Irving, TX) that was soaked in a solution of isopropyl alcohol (70%) containing 0.025% crystal violet dye. Excess liquid was removed from all wipes by hand squeezing liquid from each wipe. Each wetted wipe was secured around a Universal Material Clamp Tool (450 g) and the tool was attached to the carriage of the instrument. The instrument was set to operate with 15 carriage cycles at a rate of 60 cycles/minute (total time=15 seconds).

Images of the surface of each sample were taken 1 minute and 3 minutes after completion of the test to determine the coverage of dye on the sample surface. The color images were converted to 8-bit and three randomly selected 200× 200 pixel regions of each image were analyzed. A threshold was set and the percent surface area covered by dye was measured using the open source image processing software ImageJ (NIH, Bethesda, MD; https://imagej.nih.gov/ij/). The results are reported in Tables 13 and 14 as the percentage of the test sample surface covered with dye, where 100% represents dye completely covering the test sample surface. The reported value is the mean value calculated from the three analyzed regions

TABLE 13

| Sample | Wipe | Percent of Sample Surface Covered with Dye Post Wiping | | Sample Orientation |
|---|---|---|---|---|
| | | 1 Minute | 3 Minutes | |
| Example 1 | SONTARA 8000 | 96.8 | 98.2 | parallel |
| Example 1 | SONTARA 8000 | 97.1 | 97.4 | perpendicular |
| Example 20 | SONTARA 8000 | 97.6 | 97.6 | not applicable |
| Example 27a | SONTARA 8000 | 97.0 | 97.6 | not applicable |
| Comparative Example A | SONTARA 8000 | 5.0 | 4.5 | not applicable |

TABLE 14

| Sample | Wipe | Percent of Sample Surface Covered with Dye Post Wiping | | Sample Orientation |
|---|---|---|---|---|
| | | 1 Minute | 3 Minutes | |
| Example 1 | Paper Towel | 96.7 | 97.6 | parallel |
| Example 1 | Paper Towel | 98.2 | 98.4 | perpendicular |
| Example 20 | Paper Towel | 96.8 | 97.7 | not applicable |
| Example 27a | Paper Towel | 98.1 | 97.9 | not applicable |
| Comparative Example A | Paper Towel | 19.0 | 13.2 | not applicable |

Example 28. Surface Coverage of a Liquid Disinfectant

The same procedure as reported in Example 27 was followed with the exception that a different disinfectant solution was used to prepare the wetted wipes. The disinfectant solution was an aqueous diluted solution (1:256) of 3M Disinfectant Cleaner RCT Concentrate 40A (quaternary ammonium based cleaner) containing 0.025% crystal violet dye. The first wetted wipe was a SONTARA 8000 nonwoven (5.1 cm by 12.7 cm) that was soaked in the disinfectant solution. The second wetted wipe was a paper towel (5.1 cm by 12.7 cm section of a WypALL L30 General Purpose Wiper) that was soaked in the disinfectant solution. Excess liquid was removed from all wipes by hand squeezing liquid from each wipe. The results are reported in Tables 15 and 16.

TABLE 15

| Sample | Wipe | Percent of Sample Surface Covered with Dye Post Wiping | | Sample Orientation |
|---|---|---|---|---|
| | | 1 Minute | 3 Minutes | |
| Example 1 | SONTARA 8000 | 98.6 | 97.6 | parallel |
| Example 1 | SONTARA 8000 | 98.5 | 98.4 | perpendicular |
| Example 20 | SONTARA 8000 | 97.4 | 97.0 | not applicable |
| Example 27a | SONTARA 8000 | 97.9 | 96.0 | not applicable |
| Comparative Example A | SONTARA 8000 | 40.7 | 36.2 | not applicable |

TABLE 16

| Sample | Wipe | Percent of Sample Surface Covered with Dye Post Wiping | | Sample Orientation |
|---|---|---|---|---|
| | | 1 Minute | 3 Minutes | |
| Example 1 | Paper Towel | 96.6 | 96.8 | parallel |
| Example 1 | Paper Towel | 97.6 | 98.6 | perpendicular |
| Example 20 | Paper Towel | 97.4 | 97.0 | not applicable |
| Example 27a | Paper Towel | 98.3 | 97.6 | not applicable |
| Comparative Example A | Paper Towel | 27.4 | 33.9 | not applicable |

Example 29

Three different linear prism microstructured films with varying dimensions were prepared according to the procedure described for Example 1. The dimensions of the three films are reported in Table 17. Samples of the three films along with samples of Example 1 and Comparative Example A were evaluated according to the procedure described in Example 9. All of the microstructured films showed $\log_{10}$ cfu count reductions that were about 1.5 log greater than observed for Comparative Example A.

TABLE 17

| Peak Height (microns) | Maximum Valley Width (microns) | Apex Angle (degrees) | Valley Angle (degrees) | Side Wall Angle (degrees) | Apex (Radius of Curvature) |
|---|---|---|---|---|---|
| 5.0 | 8.0 | 90 | 90 | 45 | sharp |
| 13.0 | 6.4 | 30 | 30 | 15 | sharp |
| 4.0 | 4.6 | 60 | 60 | 30 | sharp |

Example 30

Discs (12.7 mm) of Example 1, Example 2, and Comparative Example A inoculated with *P. aeruginosa* were prepared as described in the method 'Sample Disc Inoculation, Incubation and Washing Method Modified with a Final Drying Step (described above). The discs were cleaned according to the 'Sample Disc Cleaning Procedure A' (described above) using SONTARA 8000 as the nonwoven sheet. The cleaned discs were analyzed according to 'Sample Disc Colony Count Method A' (described above). The mean $\log_{10}$ cfu counts are reported in Table 18 together with the calculated $\log_{10}$ cfu reduction achieved by cleaning the disc.

TABLE 18

| Sample Disc | Mean $\log_{10}$ CFU Recovered (*P. aeruginosa*) from a Disc (n = 3), SD = Standard Deviation | | $\log_{10}$ CFU Reduction from Cleaning |
|---|---|---|---|
| | Not Cleaned | Cleaned | |
| Example 1 | 7.23 (SD = 0.14) | 1.37 (SD = 1.22) | 5.86 |
| Example 2 | 7.19 (SD = 0.16) | 2.39 (SD = 0.37) | 4.80 |
| Comparative Example A | 6.48 (SD = 0.48) | 3.10 (SD = 0.16) | 3.38 |

Example 31 and Comparative Example G

A polyvinylidene fluoride (PVDF) film with microstructured linear prisms was prepared as follows. PVDF polymer was obtained under the trade designation "3M DYNEON PVDF 6008" from the 3M Corporation. An extrusion replication casting roll was created by a diamond turning machine (DTM) method. The PVDF polymer was extruded onto the extrusion replication casting roll having a surface temperature of 82.2° C. at an extrusion rate of 40.8 kg/hour and a casting roll speed of 12.2 meters/minute. A nip force of 4136.9 kPa (600 psi) was applied to the polymer as it contacted the extrusion replication casting roll to produce the PVDF linear prism microstructured film (3 mil thick). The features of the microstructured film are reported in Table 19. A release liner backed adhesive layer (8 mil thick, obtained as 3M 8188 Optically Clear Adhesive from the 3M Corporation) was applied to the back surface (i.e. non-microstructured surface) of the microstructured film using a hand roller.

An adhesive backed PVDF film (1.3 mil thick) that did not have a patterned, microstructured surface (i.e. the film had a smooth surface) was used as Comparative Example G.

TABLE 19

| Peak Height (microns) | Maximum Valley Width (microns) | Apex Angle (degrees) | Valley Angle (degrees) | Side Wall Angle (degrees) | Apex (Radius of Curvature) |
|---|---|---|---|---|---|
| 37.7 | 50.0 | 53 | 53 | 26.5 | Rounded (5 microns) |

Example 32

Discs (12.7 mm) of the microstructured film of Example 31 and the film of Comparative Example G were inoculated with *P. aeruginosa* and prepared as described in the 'Sample Disc Inoculation, Incubation and Washing Method' (described above). The discs were cleaned according to the 'Sample Disc Cleaning Procedure A' (described above) using SONTARA 8000 as the nonwoven sheet. The cleaned discs were analyzed according to 'Sample Disc Colony Count Method A' (described above). The mean $\log_{10}$ cfu counts are reported in Table 20 together with the calculated $\log_{10}$ cfu reduction achieved by cleaning the disc.

TABLE 20

| Sample Disc | Mean Log$_{10}$ CFU Recovered (P. aeruginosa) from a Disc (n = 3), SD = Standard Deviation | | Log$_{10}$ CFU Reduction from Cleaning |
|---|---|---|---|
| | Not Cleaned | Cleaned | |
| Example 31 | 8.60 (SD = 0.08) | 6.39 (SD = 0.40) | 2.21 |
| Comparative Example G | 8.58 (SD = 0.05) | 7.01 (SD = 0.38) | 1.57 |

Example 33. Reduction of Microbial Touch Transfer

Reduction of microbial touch transfer was determined according to the procedure described in Example 23 using microstructured film samples of Example 31. Samples of Comparative Example G film served as the control samples. The inoculation solution was *S. aureus*. Samples were tested in triplicate with the mean count value reported. The mean cfu count for each sample was converted to the log$_{10}$ scale. The log$_{10}$ reduction in cfu count by touch transfer was determined by subtracting the log$_{10}$ count value obtained for the microstructured sample from the log$_{10}$ count value obtained for the corresponding control sample The mean % reduction (n=3) in touch transfer was calculated by Equation A. The results are reported in Table 21.

$$\text{\% Reduction in Touch Transfer} = (1 - 10^{(-log10 \text{ reduction value})}) * 100. \quad \text{Equation A:}$$

TABLE 21

| Microstructured Sample | Inoculation Organism | Mean log$_{10}$ cfu Count using the Microstructured Sample | Mean log$_{10}$ cfu Count using the Control Sample | % Reduction in Touch Transfer |
|---|---|---|---|---|
| Example 31 | S. aureus | 0.65 | 1.65 | 90 |

Example 34. Surface Coverage of a Liquid Disinfectant

The same procedure as described in Example 27 was followed using samples of the microstructured film of Example 31 and the film of Comparative Example G. The wetted wipe was a paper towel (5.1 cm by 12.7 cm section of a WypALL L30 General Purpose Wiper obtained from the Kimberly-Clark Corporation) that was soaked in a solution of isopropyl alcohol (70%) containing 0.025% crystal violet dye. The results are reported in Table 22 as the percentage of the test sample surface covered with dye, where 100% represents dye completely covering the test sample surface. The reported value is the mean value calculated from the three analyzed regions

TABLE 22

| Sample | Wipe | Percent of Sample Surface Covered with Dye Post Wiping, (SD = Standard Deviation) | | Sample Orientation |
|---|---|---|---|---|
| | | 1 Minute | 3 Minutes | |
| Example 31 | Paper Towel | 97.8 (SD = 0.7) | 97.0 (SD = 4.2) | parallel |
| Comparative Example G | Paper Towel | 26.4 (SD = 6.7) | 16.6 (SD = 9.6) | not applicable |

Example 35. Reduction of Microbial Touch Transfer for Phi6 Bacteriophage

Tryptic Soy Agar was prepared by dissolving 30 g of BACTO Tryptic Soy Broth (from Becton, Dickinson and Company, Franklin Lakes, NJ) and 15 g of BACTO Agar (from Becton Dickinson and Company) in 1 L of purified water. The agar was sequentially mixed, autoclaved at 121° C. for 15 minutes, and then poured into a 150 mm diameter Petri dish once it was cool enough to handle.

Lysogeny broth (LB) was prepared by mixing NaCl (10 g), BACTO tryptone (10 g, from Thermo Fisher Scientific), and BACTO yeast extract (5 g, from Thermo Fisher Scientific) in 1 L of water at pH 7. PEG/NaCl (5×) stock solution was prepared by mixing PEG-8000 (100 g, from Thermo Fisher Scientific) and NaCl (75 g) in doubly distilled water to a final volume of 500 mL The PEG/NaCl (5×) stock solution was autoclaved before use.

*Pseudomonas* phage Phi6 (DSM 21518) and its host strain *Pseudomonas syringae* (DSM 21482) were purchased from DSMZ-German Collection of Microorganisms and Cell Cultures GmbH (Braunschweig, Germany). A streak plate of *P. syringae* was prepared from a frozen stock on tryptic soy agar and incubated overnight at 25° C. All phages and bacteria were propagated in lysogeny broth at pH 7. *Pseudomonas syringae* cultures were initiated by transferring a single colony from the streak plate into 10 mL of LB in a sterile 50 mL culture flask. Culture flasks of *P. syringae* were incubated with shaking (250 rpm) at 25° C. for 18 hours, allowing the bacteria to attain stationary phase density (about 6×10$^8$ cells/mL). The Phi6 phage were harvested from a liquid LB culture of its host strain cultured until the host cells were lysed for 12 hours. For phage purification, cultures were centrifuged at 5000 rpm for 10 minutes to remove bacteria cells. The resulting supernatant containing the phage was precipitated by adding 500 mL of the PEG/NaCl (5×) stock solution and then mixed thoroughly by inversion, followed by chilling on ice for two hours. The Phi6 phage were pelleted by microcentrifugation for 30 minutes at 13,000 g. Post centrifugation, the supernatant was removed and the pellet containing the Phi6 phage was resuspended in PBS or stored for further use at 4° C.

Microstructured film samples (50 mm×50 mm) of Example 1 were prepared and individually adhered to the internal, bottom surface of sterile 100 mm Petri dishes using double sided tape. Each Petri dish contained a single sample and the sample was attached so that the microstructured surface was exposed. Samples of the film of Comparative Example A were also tested and served as control samples. The exposed surface of each microstructured and control sample was wiped three times using a KIMWIPE wiper (Kimberly-Clark Corporation) that had been wetted with a 95% isopropyl alcohol solution. The samples were air dried for 15 minutes in a biosafety cabinet with the fan turned on. The samples were then sterilized by for 30 minutes using irradiation from the UV light in the cabinet.

An inoculation solution of *Pseudomonas* phage Phi6 was prepared by diluting a stock solution containing about $1\times10^9$ plaque forming units (PFU)/mL in PBS to a concentration of about $1\times10^4$ PFU/mL. The inoculation solution (25 mL) was poured into a sterile Petri dish (100 mm). For each sample, an autoclave-sterilized circular disc of Whatman Filter Paper (Grade 2, 42.5 mm diameter; GE Healthcare) was grasped using flame-sterilized tweezers and immersed in the Petri dish containing the inoculation solution for 5 seconds. The paper was removed and held over the dish for 25 seconds to allow excess inoculum to drain from the paper. The inoculated paper disc was placed on the surface of the microstructured sample (or surface of the control sample) and a new autoclave-sterilized piece of Whatman Filter paper (Grade 2, 60×60 mm) was placed over the inoculated paper disc. A sterile cell spreader was pressed on the top paper surface of the stack and moved across the surface twice in perpendicular directions. The stack was maintained for two minutes. Both pieces of filter paper were then removed from the microstructured (or control) sample using sterile tweezers. The sample was allowed to air dry at room temperature for 5 minutes. Touch transfer of bacteria from the surface of each sample was determined by pressing a RODAC plate (Trypticase Soy Agar with Lecithin and Polysorbate 80; from Thermo Fisher Scientific) evenly onto the film sample for 5 seconds using uniform pressure (about 300 g).

A 100 microliter aliquot of the overnight culture of *P. syringae* was transferred to a sterile tube containing 5 mL of 0.5% agar (warmed to about 55° C.). The tube was capped and gently swirled to mix the components. Three 1 mL aliquots of the 0.5% agar containing *P. syringae* were transferred onto the top of each RODAC plate. The plate was gently shaken using a circular motion to ensure that the agar spread over the entire plate and then the RODAC plate was capped. Each RODAC plate was maintained at room temperature for one hour to allow the agar to set, inverted, and then placed in an incubator (25° C.) overnight. Following incubation, the number of plaque forming units (PFU) that cleared a zone on the lawn of *P. syringae* were counted on each RODAC plate. Samples were tested in triplicate with the mean count value reported.

The mean PFU count for each sample was converted to the $\log_{10}$ scale. The $\log_{10}$ reduction in PFU count by touch transfer was determined by subtracting the $\log_{to}$ count value obtained for the microstructured sample from the $\log_{10}$ count value obtained for the corresponding control sample (sample with a smooth surface). The mean % reduction (n=3) in touch transfer was calculated by Equation A. The results are reported in Table 23.

% Reduction in Touch Transfer=
$(1-10^{(-\log 10(reduction\ value))})*100.$  Equation A:

TABLE 23

| Microstructured Sample | Inoculation Organism | Mean $\log_{10}$ cfu Count using the Microstructured Sample | Mean $\log_{10}$ cfu Count using the Control Sample | % Reduction in Touch Transfer |
|---|---|---|---|---|
| Example 1 | *Pseudomonas* phage Phi6 | 1.23 | 2.82 | 97 |

Example 36 and Comparative Example H

A sheet of an architectural finish for exteriors film (3M DI-NOC Architectural Finish for Exteriors WG-657EX, obtained from the 3M Corporation) having a linear prism microstructured surface with the same dimensions as reported for Example 3 (Table 1) was prepared using compression molding with a nickel tool. 3M DI-NOC Architectural Finish for Exteriors WG-675EX film was obtained as a laminate (8 mil thick) film having a polyvinylidene fluoride (PVDF) film top layer, a vinyl based wood grain decorative film as the middle layer, and a pressure sensitive adhesive backing. The pressure sensitive adhesive backing was covered with a release liner.

The release liner was removed from a section (12.7 cm×12.7 cm) of the architectural finish film and the film was adhesively laminated to a 3 mil PET film. The nickel tool (15.2 cm×15.2 cm) was placed on a Teflon sheet. The film was centered on the tool and oriented so the architectural film surface faced the tool. A flat, smooth sheet of silicone (about 1.27 cm thick) was placed to cover the graphic film and a flat stainless-steel plate (2.54 cm thick) was placed on top of the silicone sheet. The completed stack was placed on the lower platen of a hydraulic press. The upper and lower platens of the press were heated at 350° F. (176.7° C.) and the stack was placed under 2000 pounds of pressure (80 pounds of pressure per square inch) for 10 minutes, followed by cooling of the platens to 70° F. (21.1° C.) while maintaining pressure on the stack. Upon cooling, the applied pressure was removed. The resulting microstructured sheet was released from the tool and silicone spacer.

Samples of the microstructured, architectural finish film were evaluated for reduction in microbial touch transfer according to the procedure described in Example 23. Samples of 3M DINOC WG-657EX Architectural Finish for Exteriors film that were not submitted to the compression molding procedure served as Comparative Example H (control samples). The inoculation solution was *S. aureus*. The mean % reduction (n=3) in touch transfer was calculated by Equation A (described above). The results are reported in Table 24.

Discs (12.7 mm) of the microstructured, architectural finish film and the film of Comparative Example H were inoculated with *P. aeruginosa* and prepared as described in the 'Sample Disc Inoculation, Incubation and Washing Method' (described above). The discs were cleaned according to the 'Sample Disc Cleaning Procedure A' (described above) using SONTARA 8000 as the nonwoven sheet. The cleaned discs were analyzed according to 'Sample Disc Colony Count Method A' (described above). The mean $\log_{10}$ cfu counts are reported in Table 25 together with the calculated $\log_{10}$ cfu reduction achieved by cleaning the disc.

TABLE 24

| Microstructured Sample | Inoculation Organism | Mean $\log_{10}$ cfu Count using the Microstructured Sample | Mean $\log_{10}$ cfu Count using the Control Sample | % Reduction in Touch Transfer |
|---|---|---|---|---|
| Example 36 | *S. aureus* | 1.25 | 2.25 | 89 |

TABLE 25

| Sample | Mean Log$_{10}$ CFU Recovered (*P. aeruginosa*) from a Disc (n = 3), SD = Standard Deviation | | Log$_{10}$ CFU Reduction from |
|---|---|---|---|
| Disc | Not Cleaned | Cleaned | Cleaning |
| Example 36 | 8.42 (SD = 0.27) | 6.05 (SD = 0.31) | 2.37 |
| Comparative Example H | 7.82 (SD = 0.22) | 7.73 (SD = 0.48) | 1.08 |

What is claimed is:

1. A method of providing an article having a surface with increased microorganism removal when cleaned comprising:
   providing a microstructured surface on an article wherein the microstructured surface comprises an array of peak structures and adjacent valleys wherein the valleys have a maximum width ranging from 5 microns to 250 microns and the peak structures have a side wall angle of greater than 10 degrees and the microstructured surface comprises less than 30% of flat surface area that is parallel to a planar base layer, wherein the microstructured surface can provide a mean log 10 reduction of bacteria of at least 2 after cleaning.

2. The method of claim 1 wherein the peak structures comprise two or more facets and the facets form continuous or semi-continuous surfaces in the same direction.

3. The method of claim 1 wherein the microstructured surface comprises a linear array of prisms or an array of cube-corners elements including preferred geometry cube corner elements.

4. The method of claim 1 wherein peak structures have an apex that is sharp, rounded or truncated.

5. The method of claim 1 wherein the peak structures have an apex angle ranging from 20 to 120 degrees.

6. The method of claim 1 wherein the peak structures and valleys are free of flat surface area that is parallel to the planar base layer.

7. The method of claim 1 wherein the valleys lack intersecting walls.

8. The method of claim 1 wherein the article is not a sterile implantable medical article, an orthodontic appliance or orthodontic brackets.

9. The method of claim 1 wherein the article is an interior component of a vehicle housing or case of an electronic device; a handle; food preparation article; food preparation container; utensil; furniture; desktop, flooring, countertop, window sill; component of a lavatory; toothbrush; protective athletic equipment; or playground equipment.

10. The method of claim 1 wherein the microstructured surface is provided on the article by
   providing a film comprising the microstructured surface disposed on a planar base layer; and a pressure sensitive adhesive on the opposing surface of the film; and
   bonding the film to the article with the pressure sensitive adhesive.

11. The method of claim 1 wherein the microstructured surface is provided on the article by
   providing a base member comprising the microstructured surface wherein the peak structures have a melt temperature greater than the base member;
   thermoforming the base member into an article at a temperature below the melt temperature of the peak structures.

12. The method of claim 1 wherein the microstructured surface can provide a mean log 10 reduction of bacteria of at least 3 after cleaning.

13. The method of claim 1 wherein the microstructured surface can provides a reduction in bacteria touch transfer in a range of 50% to 99%.

14. A method of cleaning an article comprising:
   providing an article of claim 1;
   cleaning the microstructured surface.

15. The method of claim 14 wherein cleaning comprises
   a) wiping the microstructured surface with a woven or non-woven material;
   b) scrubbing the microstructured surface with a brush;
   c) applying an antimicrobial solution to the microstructured surface; or
   a combination thereof.

16. The method of claim 1 wherein the microstructured surface is exposed to the environment and is subject to be touched or otherwise coming in contact with people and/or animals.

17. The method of claim 1 wherein at least 90% of the microstructured surface comprises cleaning solution 1-3 minutes after applying the cleaning solution to the microstructured surface.

18. The method of claim 1 wherein the microstructured surface has a Sbi/Svi of greater than 3 and less than 90.

19. The method of claim 1 wherein the microstructured surface can provide a mean log 10 reduction of a bacteriophage or virus of at least 2 after cleaning.

20. The method of claim 1 wherein the microstructured surface does not comprise a material selected from the group consisting of a low surface energy material, a fluorinated material, and a polydimethylsiloxane material.

21. The method of claim 1 wherein the peaks have a height of at least 2 microns.

22. The method of claim 1 wherein the microstructured surface is present on a macrostructured surface.

23. The method of claim 1 wherein the microstructured surface lacks a significant number of structures with smaller valleys and/or valleys with insufficient side wall angles that can impede bacteria cleanability.

24. The method of claim 1 wherein the microstructured surface lacks a significant number of structures with smaller valleys and/or valleys with insufficient side wall angles that can impede dirt removal.

25. The method of claim 1 wherein the microstructured surface can provide a mean log 10 reduction of bacteria of at least 4 after cleaning.

26. The method of claim 1 wherein the microstructured surface can provide a mean log 10 reduction of bacteria of at least 6 after cleaning.

27. The method of claim 1 wherein the microstructured surface can provide a mean log 10 reduction of bacteria of at least 8 after cleaning.

28. The method of claim 1 wherein the peaks have a height of at least 3 microns.

29. The method of claim 1 wherein the peaks have a height of at least 4 microns.

30. The method of claim 1 wherein the peaks have a height of at least 5 microns.

* * * * *

UNITED STATES PATENT AND TRADEMARK OFFICE
CERTIFICATE OF CORRECTION

PATENT NO. : 11,766,822 B2
APPLICATION NO. : 17/182507
DATED : September 26, 2023
INVENTOR(S) : Jodi Lynn Connell It is certified that error appears in the above-identified patent and that said Letters Patent is hereby corrected as shown below:

In the Claims

<u>Column 57</u>
Line 47, Claim 9, delete "vehicle housing" and insert -- vehicle; housing- --, therefor.

<u>Column 58</u>
Line 8, Claim 13, delete "surface can provides" and insert -- surface can provide --, therefor.

Signed and Sealed this
Twenty-sixth Day of March, 2024

Katherine Kelly Vidal
*Director of the United States Patent and Trademark Office*